United States Patent [19]

Letcher, Jr.

[11] Patent Number: 5,627,949
[45] Date of Patent: May 6, 1997

[54] SYSTEM OF RELATIONAL ENTITIES FOR OBJECT-ORIENTED COMPUTER-AIDED GEOMETRIC DESIGN

[76] Inventor: John S. Letcher, Jr., P.O. Box 684, Southwest Harbor, Me. 04679

[21] Appl. No.: 405,739

[22] Filed: Mar. 17, 1995

Related U.S. Application Data

[63] Continuation of Ser. No. 70,023, May 28, 1993, abandoned, which is a continuation-in-part of Ser. No. 810,960, Dec. 19, 1991, abandoned.

[51] Int. Cl.$^6$ .............................. G06F 15/00; G06F 19/00
[52] U.S. Cl. .......................... 395/120; 395/141; 395/919; 364/474.24
[58] Field of Search ..................... 364/474.24, 474.36, 364/474.26, 488; 395/119, 120, 135, 139, 141, 919–923

[56] References Cited

U.S. PATENT DOCUMENTS

| | | | |
|---|---|---|---|
| 4,479,196 | 10/1984 | Ferrer et al. | 364/917.5 |
| 4,635,208 | 1/1987 | Coleby et al. | 364/491 |
| 4,663,616 | 5/1987 | Himelstein | 345/121 |
| 4,829,446 | 5/1989 | Draney | 395/133 |
| 4,864,497 | 9/1989 | Lowry et al. | 395/650 |
| 4,868,766 | 9/1989 | Oosterholt | 395/120 |
| 4,912,657 | 3/1990 | Saxton et al. | 395/155 |
| 4,953,106 | 8/1990 | Gansner et al. | 395/160 |
| 5,003,498 | 3/1991 | Ota et al. | 395/120 |
| 5,253,189 | 10/1993 | Kramer et al. | 364/578 |
| 5,257,365 | 10/1993 | Powers et al. | 395/600 |
| 5,265,197 | 11/1993 | Kondo | 395/120 |

OTHER PUBLICATIONS

Sigplan, "ACM Sigplan History of Programming Languages Conference," Sigplan Notices, vol. 13:59–80 (1978).
Brown, "PADL–2: A Technical Summary," IEEE, 72–84 (1982).
Armit, "TAG–A High Performance Interactive 3D Graphics System," Computers in Industry, 3:117–123 (1982).
Gossard, et al., "Representing Dimensions, Tolerances, and Features in MCAE Systems," IEEE, 51–59 (1988).
Wilson, "Numerical Control in Manufacturing," McGraw-Hill, 354–361 (1963).
Sutherland, "Sketchpad, A Man–Machine Graphical Communication System," MIT, (1963) (Submitted in Partial Fulfillment of the Requirement sof the Degreeof Doctor of Philosophy).

(List continued on next page.)

*Primary Examiner*—Mark R. Powell
*Assistant Examiner*—Ba Huynh
*Attorney, Agent, or Firm*—Fish & Richardson, P.C.

[57] ABSTRACT

A method of computer aided design of geometric models including the steps of: defining a set of geometric entities for use in constructing the geometric models, each of the geometric entities being an abstract geometric object type that is adapted to be actualized into one or more geometric objects, the geometric entities including point class entities, curve class entities, and surface class entities; identifying some of the geometric objects by corresponding unique object identifiers; defining a plurality of relational entities along the set of geometric entities, each of which is adapted to be actualized into corresponding relational objects having having a dependency relationship upon one or more other geometric objects whose object identifiers are specified within the relational objects; wherein the relational entities include a curve class entity having a dependency relationship on a point class object; wherein at least one of the relational entities is a surface class entity having a dependency relationship on a point class object or a curve class object; and defining a set of subroutines for evaluating the plurality of geometric objects, there being a corresponding subroutine for each of the abstract geometric object types, wherein those subroutines which evaluate relational objects are programmed to make calls to an appropriate one or more subroutines to evaluate the geometric objects on which that relational object depends.

5 Claims, 16 Drawing Sheets

Organization of Program Modules

OTHER PUBLICATIONS

LaBozzetta, et al., "AIAA-84-2389 Interactive Graphics for Geometry Generation—A Program With a Contemporary Design," AIAA/AHS/ASEE Aircraft Design Systems & Operations Meeting, (Oct. 31-Nov 2, 1984).

MacKrell, "Making Sense of a Revolution," Computer Graphics World, 26-38 (1993).

Piegel, "Fundamental Developments of Computer-Aided Geometric Modeling," Academic Press, 321-346 (1993).

AIAA-87-2902 D.K. Sneep, et al., "A Geometry System for Aerodynamic Design" (1987).

AIAA-91-0800 W.K. Capron, et al., "Advanced Aerodynamic Applications of an Interactive Geometry and Visualization System," (1991).

NASA-CP-3143 A.E. Gentry, "Requirements for a Geometry Programming Language for CFD Applications," (1992).

Mortenson, "Geometric Modeling," 552-571 (1985).

Faux, "Computationa Geometry for Design and Manufacture," 156-231 (1979).

Tiler, "Ratioanl B-Splines for Curve and Surface Representation," IEEE, 61-69 (1983).

FL/2B Documentation, Fairline Sytem Hull Design Program, Version 2.8, (1990).

FIG. 1 Computer system
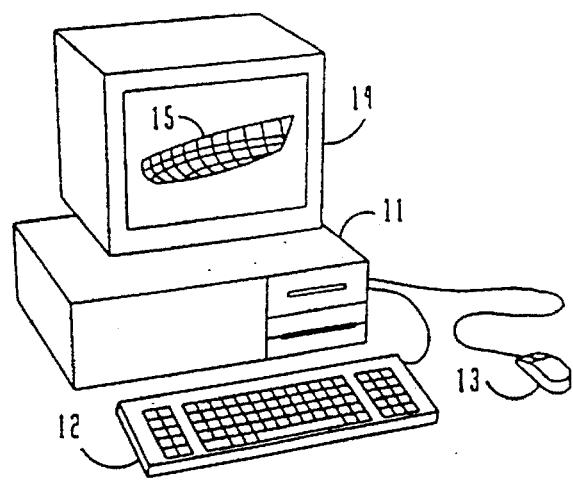
FIG. 2 Absolute and Relative Points
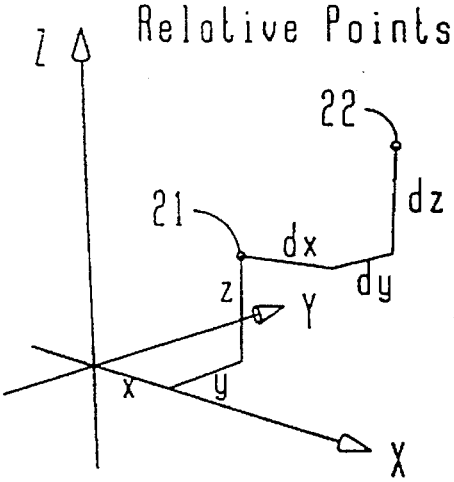
FIG. 3 Absolute and Relative Beads
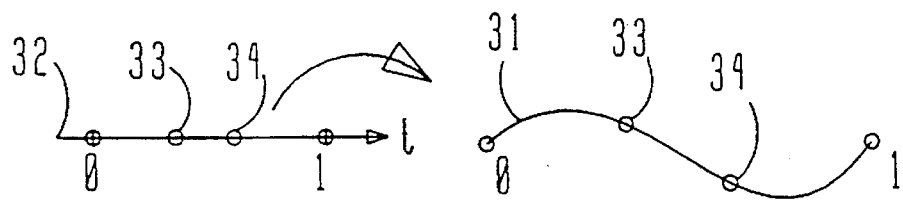
FIG. 4 Absolute and Relative Magnets
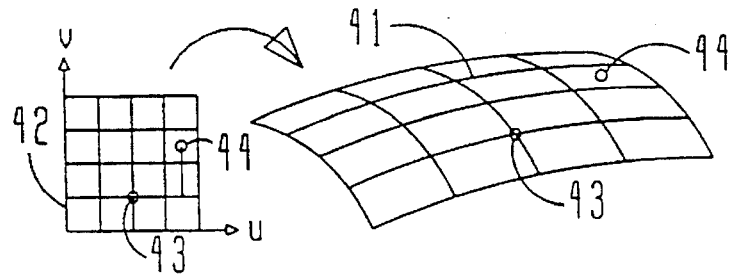
FIG. 5 Absolute and Relative Rings
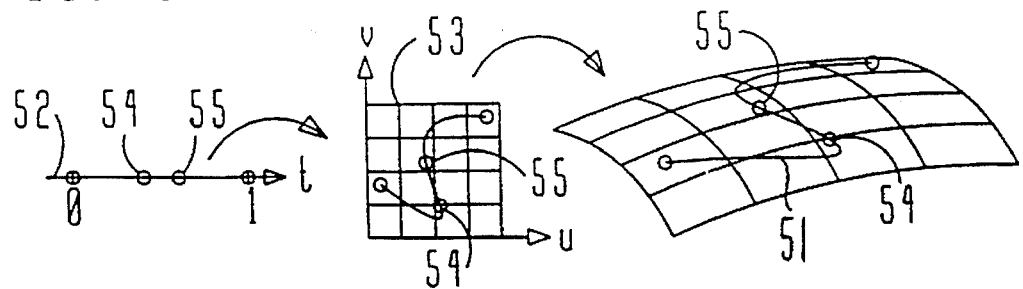

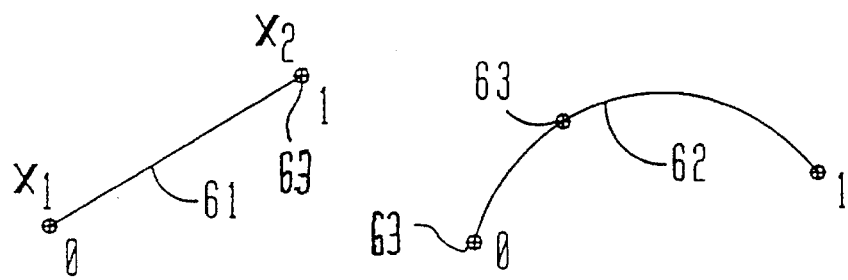
FIG. 6  Arc and Line Curves
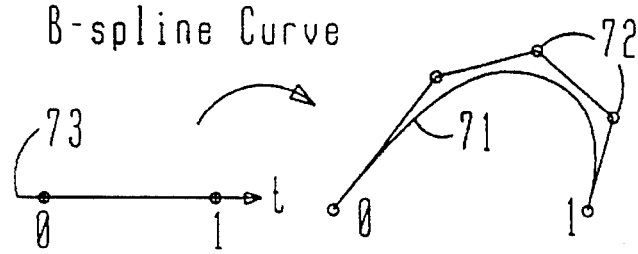
FIG. 7  B-spline Curve
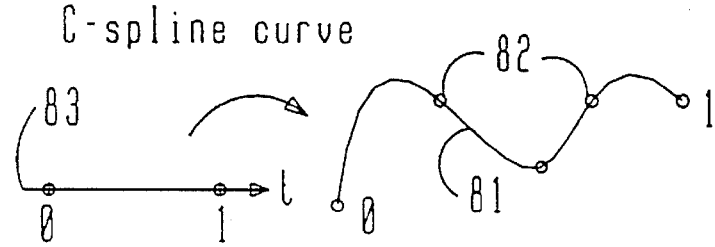
FIG. 8  C-spline curve
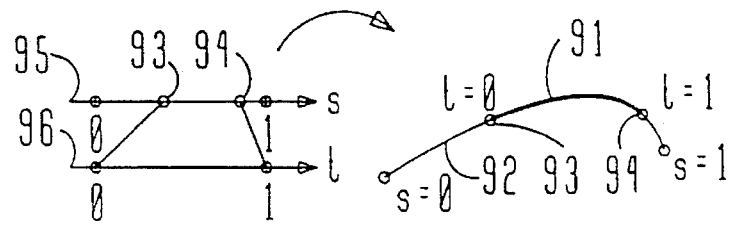
FIG. 9  Sub-curve
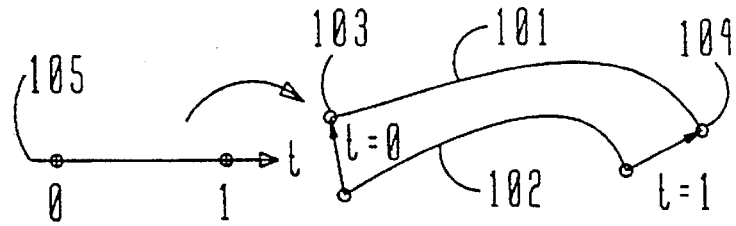
FIG. 10  Relative Curve

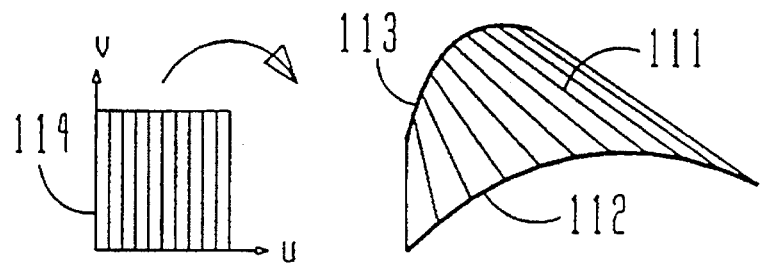
FIG. 11 Ruled Surface
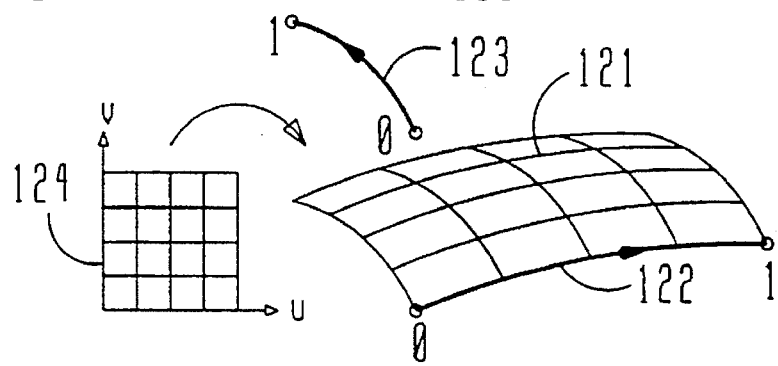
FIG. 12 Translation Surface
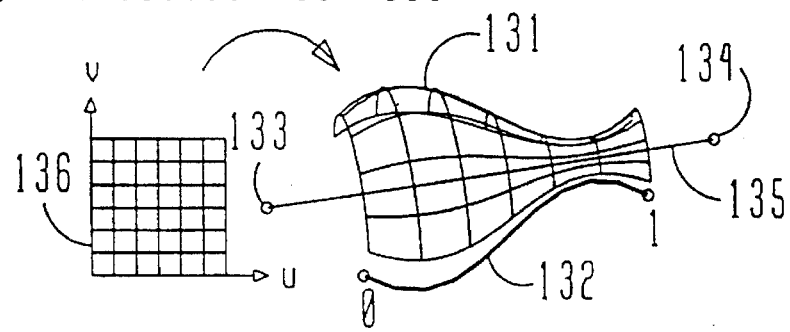
FIG. 13 Revolution Surface
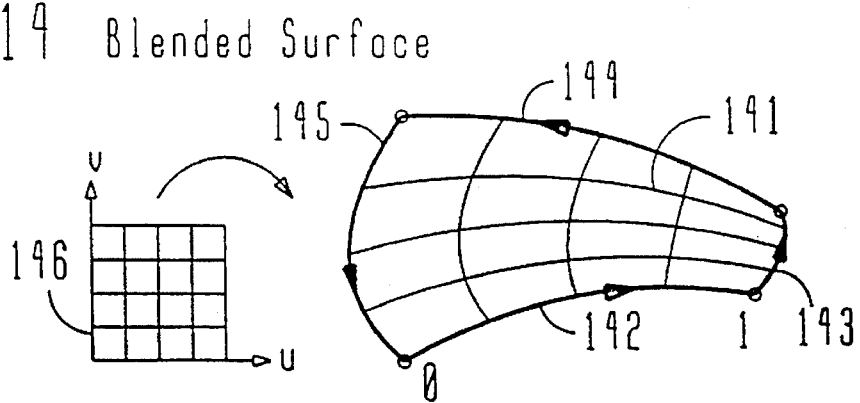
FIG. 14 Blended Surface FIG. 15  C-lofted Surface
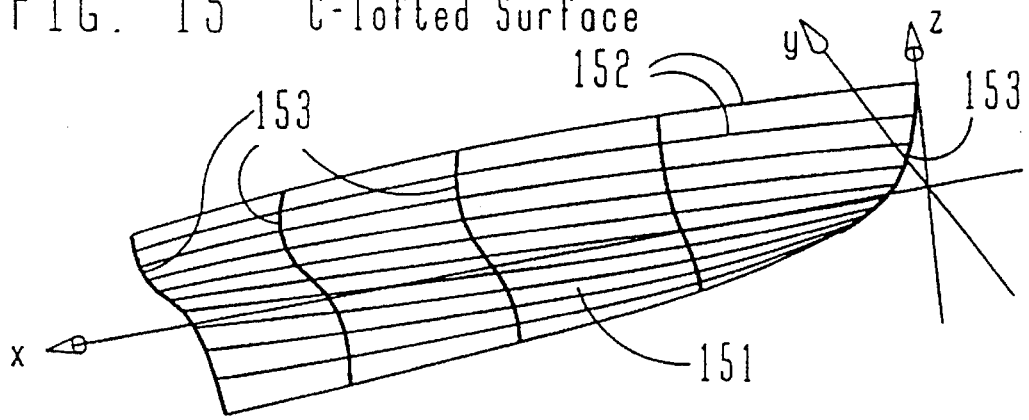
FIG. 16  B-spline Surface
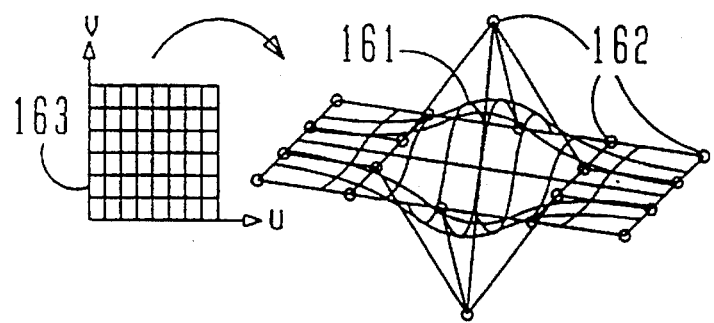
FIG. 17  Sub-surface
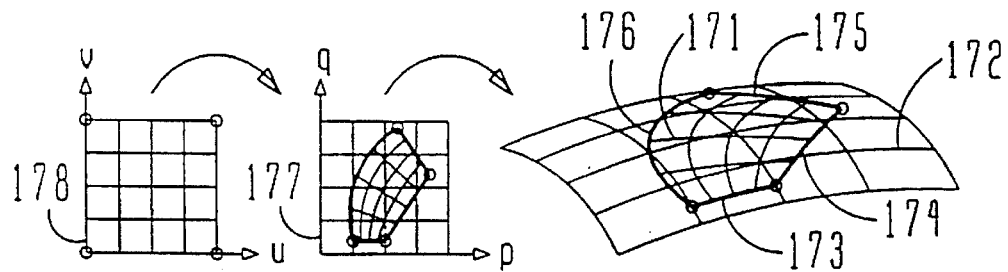
FIG. 18  Relative Surface
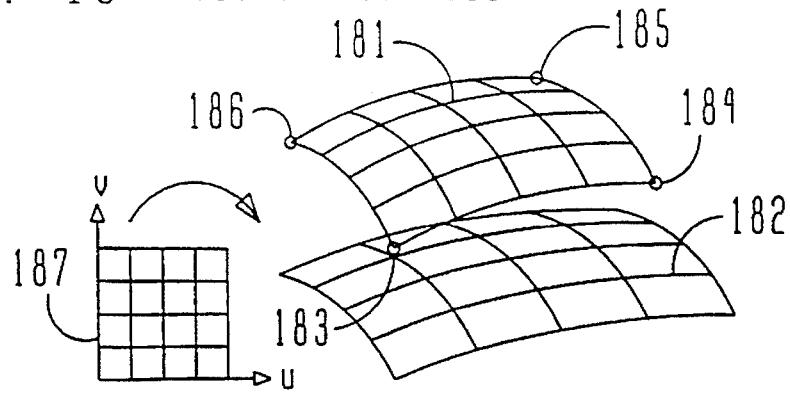

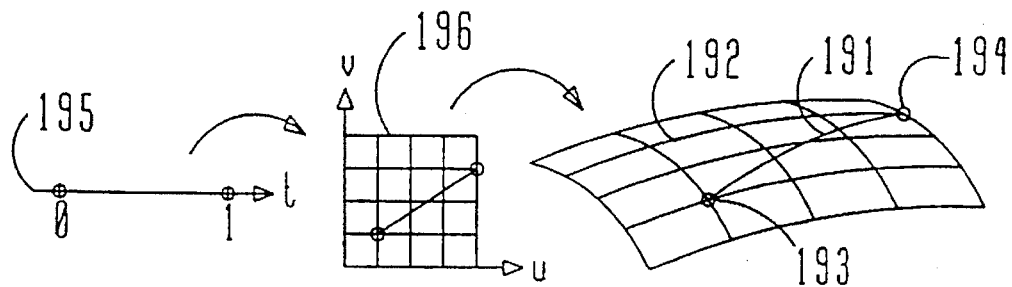
FIG. 19 Line Snake
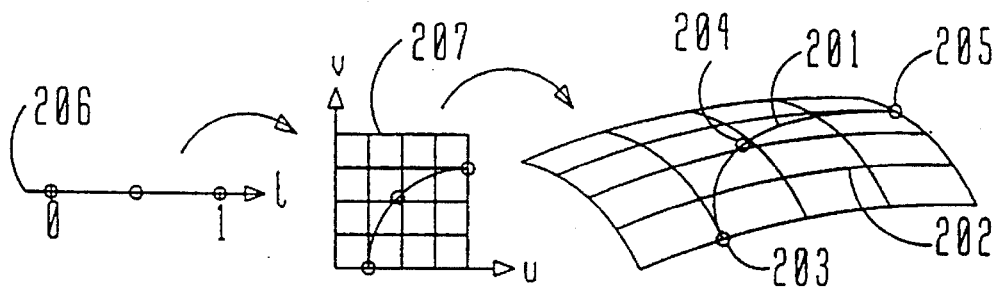
FIG. 20 Arc Snake
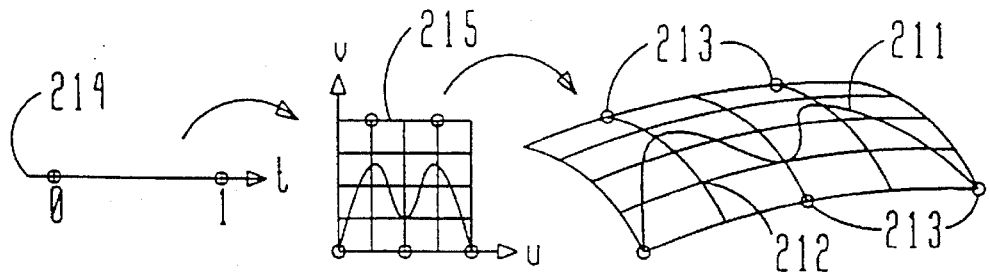
FIG. 21 B-spline Snake
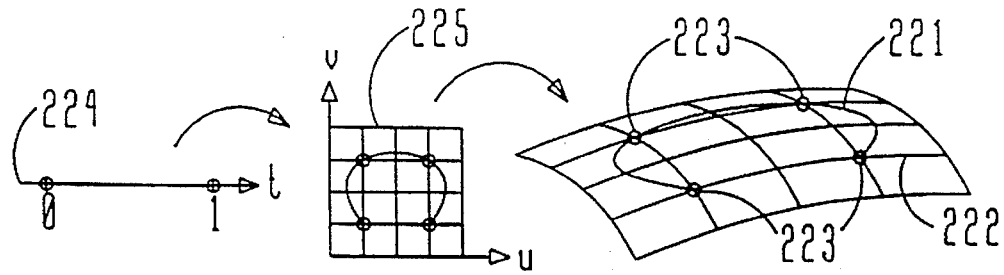
FIG. 22 C-spline Snake FIG. 23 Sub-snake
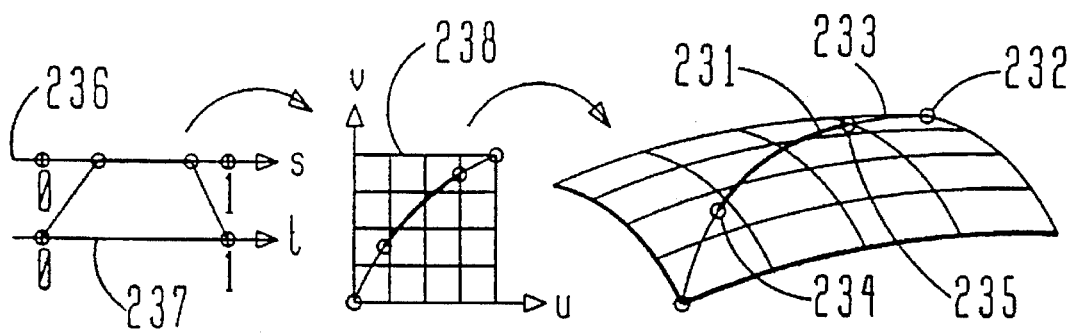
FIG. 24 Relative Snake
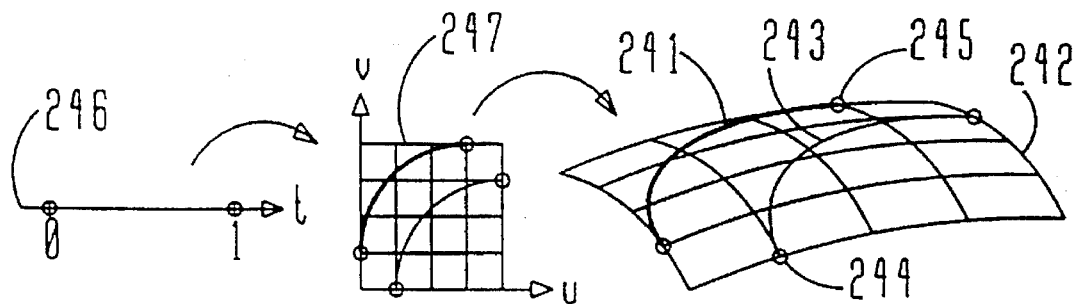
FIG. 25 Example digraph
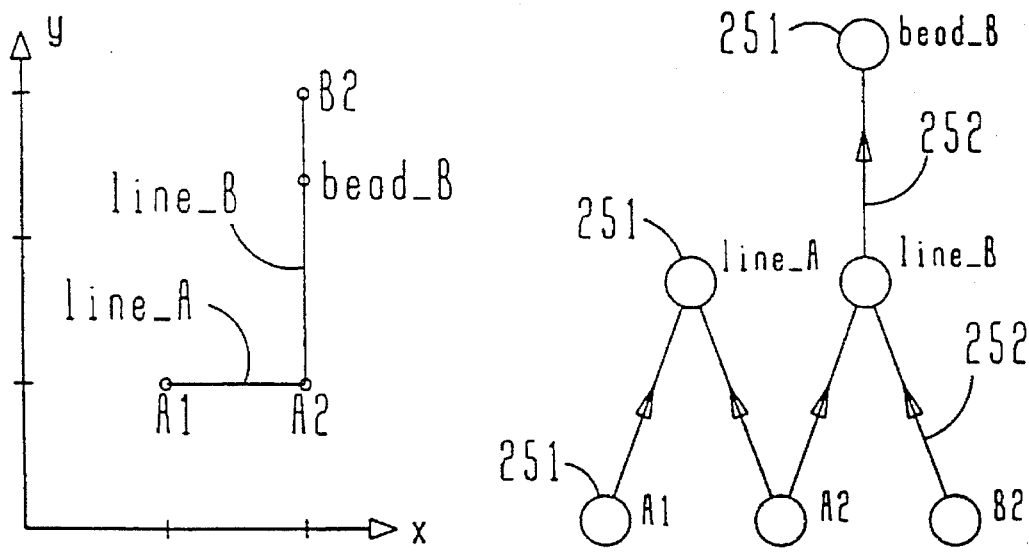

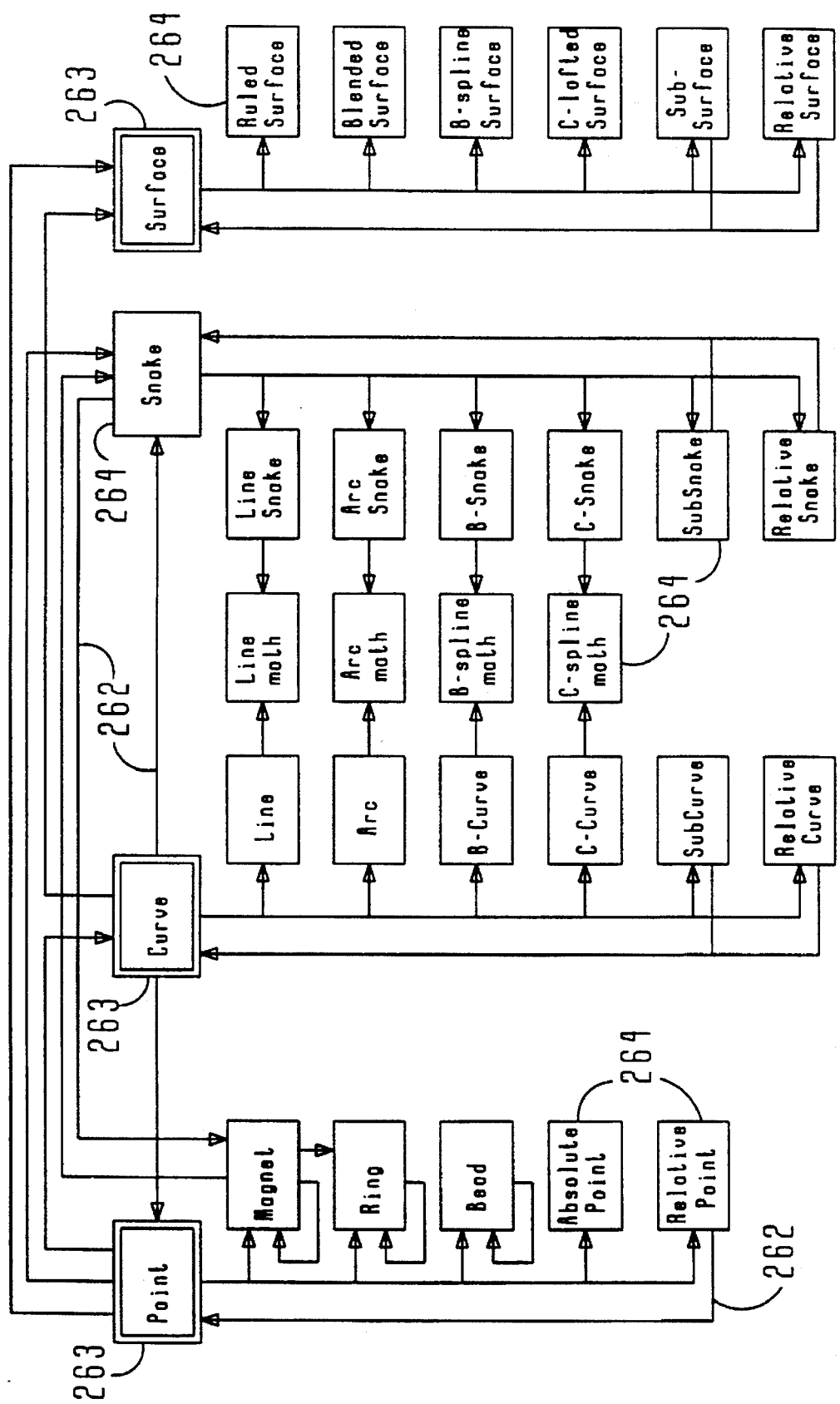
FIG. 26 Organization of Program Modules

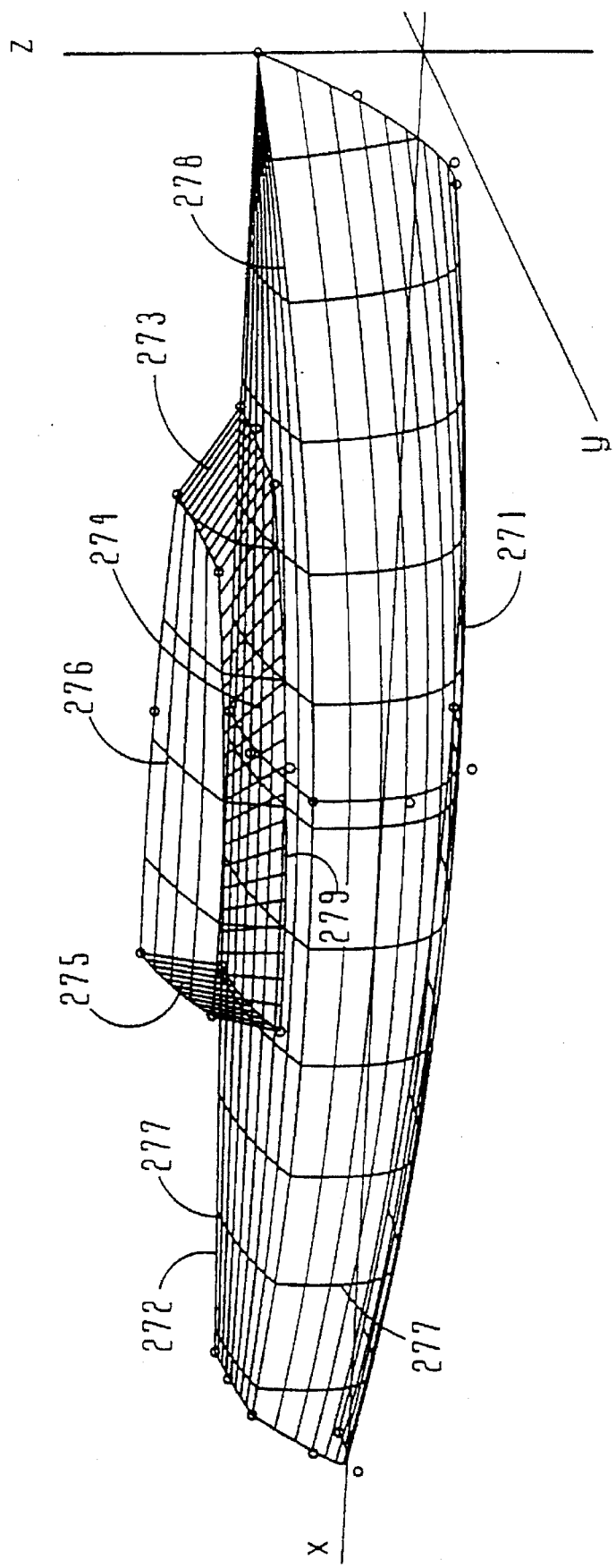
FIG. 27 Example Application

SYSTEM OF RELATIONAL ENTITIES FOR OBJECT-ORIENTED COMPUTER-AIDED GEOMETRIC DESIGN

CROSS REFERENCE TO RELATED PATENT APPLICATION

This patent application is a continuation of U.S. Ser. No. 08/070,023 filed May 28, 1993, now abandoned, which is a continuation-in-part of the John S. Letcher, Jr. U.S. patent application Ser. No. 07/810,960, abandoned, for SYSTEM OF RELATIONAL ENTITIES FOR OBJECT ORIENTED COMPUTER AIDED GEOMETRIC DESIGN filed Dec. 19, 1991.

FIELD OF THE INVENTION

The invention relates to a method of representing two- and three-dimensional geometric objects in a data structure. The method is particularly useful in the field of computer-aided design and numerical-control manufacturing of complex geometric objects made up of curves, surfaces, and solids.

BACKGROUND OF THE INVENTION

Geometric definition is an essential element in the design of practically any object to be manufactured. Until recently, geometric definition was performed primarily by drafting scale drawings of the object. In the last two decades, computer-aided geometric design (CAGD) has largely supplanted drafting. In CAGD, mathematical representations of an object's geometry are stored in computer memory and manipulated by the computer user. Sometimes the product of a CAGD design is scale drawings produced on a plotting device; in other cases a CAGD representation of the object is transmitted to numerical-control (NC) machinery for automated production of the object. The CAGD representation may also serve as a basis for analysis and evaluation of the design aside from visual aspects, e.g. finite-element stress analysis.

One well-known example of a CAGD program is AutoCAD (R), produced by AutoDesk, Inc. of Sausalito, Calif. Initially a two-dimensional environment simulating the drafting process on paper, AutoCAD now provides a three-dimensional environment in which many types of geometric entities including points, lines, curves, surfaces and solids can be defined, positioned, and edited to build up extremely precise definitions of highly complex objects. There are other CAGD programs which are much less general than AutoCAD, but are better adapted to specialized purposes; e.g. FAIRLINE (R) by AeroHydro, Inc., which is adapted to the special task of creating fair surfaces for ship hull design. CAGD programs for workstation and mainframe computers, for example IGDS (R) by Intergraph Corp., Huntsville, Ala., provide more flexible surface and solid modeling entities, such as nonuniform rational B-spline (NURBS) surfaces.

In a CAGD program, each object springs into existence at the time when it is created, either by execution of a user command, or as a result of reading data from a file. In most circumstances the new object is positioned, oriented or constructed in some deliberate relationship to one or more objects already in existence. For example, line B may be created in such a way that one of its endpoints is one end of a previously existing line A. However, the relationship which was clearly in the mind of the user at the time line B was created is not retained by the CAGD program; so if in some later revision of the geometry line A is displaced, then line B will stay where it is and no longer join line A. A conventional CAGD representation of geometry therefore consists of a large number of essentially independent simple objects, whose relationships are incidental to the manner and order in which they were created, but are not known to the program.

If design always proceeded in a forward direction, the loss of relationship information would not be a problem. One would start a project, add objects until the design is complete, and save the results. However, it is well known that engineering design is only rarely a simple forward process. It is far more commonly an iterative process: design is carried forward to some stage, then analyzed and evaluated; problems are identified; then the designer has to back up to some earlier stage and work forward again. It is typical that many iterative cycles are required, depending on the skills of the designer, the difficulty of the design specifications, and any optimization objectives that may be present. In each forward stage, the designer will have to repeat many operations he previously performed (updating), in order to restore relationships that were disrupted by the revision of other design elements. For example, he may have to move the end of line B so it once more joins line A; he may have to do this many times in the course of the design. CAGD systems typically provide extensive editing functions to facilitate these updates.

Revision of a previously existing design to meet new requirements is a common situation where similar problems are encountered. A change that alters an early stage of the design process requires at least one forward pass through all the subsequent design stages to restore disrupted relationships. Particularly if the relationships, and the sequence of design stages to achieve them, have been lost (and they are not normally retained in a way accessible to the user), the updating process can be very difficult, error-prone and time-consuming.

Some partial solutions to this problem are known. In some CAGD programs including AutoCAD, lines A and B can be created together as part of a "polyline" entity; then their connectivity will be automatically maintained if any of their endpoints, including their common point, are moved. Christensen (U.S. Pat. No. 4,663,616) has disclosed the concept of a "sticky" attribute which causes selected lines to remain connected to objects they are deliberately attached to. Draney (U.S. Pat. No. 4,829,446) has disclosed the concept of giving points in two dimensions serial numbers, and locating another point in two dimensions (a "Relative Point") by its relationship (x,y coordinate offsets) to a numbered point. Oosterholt (U.S. Pat. No. 4,868,766) has disclosed the concept of giving all geometric objects names, and locating each object in relationship to at most one other object, in a tree structure of dependency. Ota et al. (U.S. Pat. No. 5,003,498) have disclosed a CAGD system in which some objects have names, and are used by name in the construction of other more complex objects. Saxton (U.S. Pat. No. 4,912,657) discloses a system of "modular parametric design" in which design elements can be stored and conveniently recreated with different leading dimensions.

As mentioned above, many CAGD surface modeling systems support only a single type of surface, e.g. the FAIRLINE (R) surface, which is created from explicit cubic splines lofted through a set of B-spline "Master Curves". Although this surface can be molded into a wide variety of shapes useful in its own domain of ship hull design, there are many shapes it cannot make; e.g. it cannot form either an exact circular cross section or a completely round nose, both common features of submarine hulls. CAGD programs suited to mechanical design, such as AutoCAD, frequently support several simple surface types such as ruled surfaces and surfaces of revolution, but do not support more complex free-form surfaces such as B-spline parametric surfaces. Although it is widely appreciated that there would be large advantages in supporting a broader set of curve and surface types within a single CAGD environment, this has heretofore been possible only in workstation and mainframe CAGD systems, presumably because of the complexity of the programming required.

One known partial solution to this problem is to support only a single surface type, which has sufficient degrees of flexibility to encompass a useful set of simpler surfaces as special cases. Nonuniform rational B-spline (NURBS) surfaces have been proposed to fill this role, since by special choice of knots and coefficients the NURBS curve can accurately represent arcs of circles, ellipses, and other useful conic section curves. Disadvantages of this approach include the obscure relationship between the selection of knots and coefficients to achieve a desired curve; the large quantity of data required to define even a simple surface such as a circular cylinder; nonuniformity of resulting parameterizations; and the general unsuitability of NURBS surfaces for interactive design of surfaces having special requirements such as fairness or developability.

In CAGD surface modeling systems, intersections between surfaces often account for much of the complexity in both the program and the user interface. In a typical application, surface Y is constructed, then surface Z is constructed in such a way that it intersects surface Y. The next step is often to find the curve of intersection of Y and Z; then portions of Y and/or Z which extend beyond that curve may be discarded (trimmed). The problem of intersection of two surfaces is inherently difficult, for several reasons. The two surfaces may not intersect at all. Finding any single point of intersection requires solution of three simultaneous, usually nonlinear, equations. These equations will be ill-conditioned if the intersection is at a low angle. The intersection may be a single point, a simple arc, a closed curve, a self-intersecting curve, or multiple combinations of these elements. The surfaces might actually coincide over some finite area. Once a curve of intersection is found, it is often difficult to indicate correctly which portion of which surface is to be discarded. After trimming, a parametric surface patch may no longer be topologically quadrilateral, so it can no longer be conveniently parameterized.

OBJECTS OF THE INVENTION

It is an object of the present invention to provide a CAGD environment which minimizes the effort required to revise and update geometric models, by capturing, storing and utilizing essential dependencies between the model's geometric objects. A second object of the invention is to provide a CAGD surface modeling environment in which a wide variety of curve and surface types are supported for convenience and flexibility. A third object of the invention is to provide a CAGD surface modeling environment in which the difficulties of intersecting and trimming surfaces are largely avoided by providing convenient ways to construct surfaces which contact and join one another accurately in the first place, with contacts and joins that are automatically maintained during updates of the model.

SUMMARY OF THE INVENTION

In this summary, a three-dimensional design space is contemplated, utilizing Cartesian coordinates (x, y, z) for the location of points. Some principles of the invention could also be advantageously applied in a design space of two dimensions, or of more than three dimensions, or with non-Cartesian coordinates. Definition: An entity is a type of geometric object defined within the system, and requiring a specific set of data for its actualization. Common CAGD entities are the point, the line, the arc, the Bezier patch. Definition: An object is an actualization of an entity; for example, a point located at (1., 2., 3.). Definition: A logical model is any valid collection of objects, i.e., a set of valid objects in which all dependencies are satisfied. Definition: An absolute model is a geometric representation computed from a logical model, in which all points are located by their absolute coordinates.

The first objective just mentioned (utilizing dependencies) is achieved by associating with each object in the model a unique name (or number), and defining and implementing a series of entity types whose actualizations depend on, by referencing the names (or numbers) of, other objects in the model. According to the invention, the dependency relationship between objects has the logical form of a directed graph (digraph). This data structure is known to the program, is available to be manipulated by the user, is stored along with specific numerical data to form the complete internal representation of the model, and is used to selectively update the model following alteration of any component object. Those qualitative properties of the model which are automatically maintained by utilizing the data structure of dependencies are referred to below as "durable" properties.

Each node of the dependency digraph represents an object; each directed edge indicates the dependency of one object on another. The dependency can take many forms. For example, a Relative Point depends on another point object for its location. A B-spline Curve depends on each of the point objects which are its vertices. A Lofted Surface depends on each of the curve objects through which it is lofted, and it also depends, in turn, on each point object used in the definition of those curves. Dependency can extend to many levels. An object can depend on many other objects, and can have many other objects dependent on it.

Some objects may be defined in an absolute sense, having no dependency on any others. For example, an Absolute Point is specified solely by its coordinates x, y, z.

It is useful to classify and define entities first in terms of their dimensionality, and second in terms of their primary dependencies: Points are zero-dimensional objects.

An Absolute Point depends on nothing.

A Relative Point depends on another point.

A Bead is a point constrained to lie on a curve.

A Magnet is a point constrained to lie on a surface.

A Ring is a point constrained to lie on a snake.

Curves are one-dimensional objects.

A Line depends on two points.

An Arc depends on three points.

A B-spline Curve depends on two or more points.

A C-spline Curve depends on two or more points.

Surfaces are two-dimensional objects.

A Translation Surface depends on two curves.

A Ruled Surface depends on two curves.

A Revolution Surface depends on one curve and two points.

A C-Lofted Surface depends on two or more curves.

A Blended Surface depends on three or more curves.

A B-spline Surface depends on an array of points.

Snakes are one-dimensional objects, parametric curves constrained to lie on a parametric surface. Any snake depends on its surface.

A Line Snake depends on two magnets or rings.
A Geodesic Snake depends on two magnets or rings.
An Arc Snake depends on three magnets or rings.
A B-Spline Snake depends on two or more magnets or rings.
A C-Spline Snake depends on two or more magnets or rings.

The above list of entities is intended to be illustrative, but not necessarily complete. Extension of this system of entities in a now obvious way to include parametric solids (three-dimensional objects with parameters u, v, w), and point, curve and surface entities located relative to a solid by use of the solid's parametric coordinate system, is specifically contemplated.

A different useful classification may be made in terms of the dependency role each entity class can fulfill: When a point called for, any point entity may be used. When a bead is called for, only a bead may be used. When a magnet is called for, a magnet or ring may be used. When a ring is called for, only a ring may be used. When a curve is called for, any point, curve or snake entity may be used. When a snake is called for, a snake, magnet or ring may be used. When a surface is called for, only a surface may be used.

Use is made of parametric coordinates as part of the data for some of these entities. For example, a curve may be parameterized with a parameter t which varies from 0 at one end to 1 at the other. An Absolute Bead can then be located by specifying the curve and a specific value for t. A surface may be parameterized with parameters u, v each of which varies independently from 0 to 1. An Absolute Magnet can then be located by specifying the surface and a specific pair of parameter values for u, v. A snake is a parametric curve in the two-dimensional u, v parameter space of its supporting surface.

One useful form of representation of a logical model is a text description having one record for each object. The object record includes the entity type, the object name, various object attributes such as color and visibility, and any variable data required to actualize the object, presented in a predefined order peculiar to the entity. For example, the following set of five records is the solution to the "line A–line B" problem discussed above, according to the invention: AbsPoint A1 14 1 1. 1. 3.; AbsPoint A2 14 1 2. 1. 3.; Line line_A 13 1 A1 A2; AbsPoint B2 14 1 2. 3. 3.; Line line_B 13 1 A2 B2;

This model contains 5 objects: 3 Absolute Points (named 'A1', '2', 'B2') and 2 Lines (named 'line_A', 'line_B'). The numbers 14 and 13 are color specifiers, and the 1's that follow them specify visibility. This data clearly records the intention that 'line_B' start where 'line_A' ends, viz. at point 'A2'. The dependency of 'line_B' on point 'A2' creates the durable connection.

The following record adds one more object to this example: AbsBead bead_B 12 1 line_B 0.7; This creates a visible point, of color 12, constrained to remain on 'line_B' at a parameter value of 0.7, i.e., 70% of the way from point 'A2' to point 'B2'. Following any change in 'line_A', 'bead_B' will still lie on 'line_B', in the same relative location. The dependency of 'bead_B' on 'line_B' creates the durable relationship.

For purposes of output or display, an absolute model will be computed from the logical model. For this example, the absolute model would consist of:
a point, color 14 at (1., 1., 3.)
a point, color 14, at (2., 1., 3.)
a line, color 13, from (1., 1., 3.) to (2., 1., 3.)
a point, color 14, at (2., 3., 3.)
a line, color 13, from (2., 1., 3.) to (2., 3., 3.)
a point, color 12, at (2., 2.4, 3.)

Now suppose that the example model is changed by moving point 'A2' to a new position (2., 1., 4.). This is accomplished by changing one element in one record of the logical model: AbsPoint A2 14 1 2. 1.4.; Following this change, the updated absolute model would consist of:
a point, color 14 at (1., 1., 3.)
a point, color 14, at (2., 1., 4.)
a line, color 13, from (1., 1., 3.) to (2., 1., 4.)
a point, color 14, at (2., 3., 3.)
a line, color 13, from (2., 1., 4.) to (2., 1., 3.)
a point, color 12, at (2., 2.4, 3.3)

The connection of 'line_A' and 'line_B' has been automatically maintained; 'bead_B' is still located on 'line_B', and in the same relative position, i.e at 70% of the length of 'line_B'. This brief example illustrates the automatic updating of the model that is made possible by utilization of the digraph data structure of dependencies.

The internal or external representation of the data structure may well be different from this text representation, but will nevertheless encode the dependency information in a manner that is logically equivalent to a digraph.

The second objective (supporting a variety of curve and surface types) is achieved by a special organization of the program instructions. According to the invention, all point objects may be accessed through a single routine "Point", whose input parameter is the name or index of a point object, and which returns the x, y, z coordinates of the object. Within "Point", a case statement branches to separate routines for evaluating each specific point entity. It is essential that "Point" be programmed in a recursire fashion, so that it can call itself, or be called by routines that have been called by it.

Similarly, all curve and snake objects may be accessed through a single routine "Curve" whose arguments are the name or index of a particular curve, and a list of t parameter values, and whose return parameters include a tabulation of x, y, z coordinates. Within "Curve", a case statement branches to separate routines for evaluating each specific curve entity. It is likewise essential that "Curve" be programmed in a recursive fashion, since the data for any curve may depend on another curve. To the program module that calls "Curve", all types of curves and snakes are interchangeable; you give it a t, it gives you back a point x, y, z. To support a new curve entity, it is only necessary to define the data required for that entity; add one case to the "Curve" routine; and add one routine that evaluates the new entity.

In like fashion, there can be a single recursive routine "Snake" whose arguments are the name or index of a particular snake object, and a list of t parameter values, and whose return parameters include a tabulation of u, v parameter value pairs. If snakes are treated as curves in the two-dimensional u, v parameter space of a surface, then addition of a new curve entity automatically adds a new snake entity of the same type. Maintaining this correspondence of curve and snake types is advantageous since the user then need not learn and remember separate properties for curves and snakes.

In like fashion, there can be a single recursive routine "Surface" whose arguments are the name or index of a particular surface object, and lists of u and v parameter values, and whose return parameters include a tabulation of x, y, z coordinates. To support N surface types, the programming effort is only proportional to N, rather than N squared.

The third objective (avoidance of surface-surface intersection and trimming) is achieved by utilizing the dependency relationships disclosed above, and providing certain generally useful snake and surface entities. Two distinct problems are addressed here: (1) forcing two surface objects Y and Z to accurately share a common edge, and (2) forcing one surface object Z to end accurately on another surface object Y, along a curve which is not necessarily an edge of Y.

According to the invention, durable common edges between surfaces may be achieved by using common data to define the adjoining edges. For example, if the two surfaces are blended surfaces, whose data includes boundary curves, all that is required is to use the same curve object for the corresponding edges of the two surfaces. Two lofted surfaces will accurately join in the loft direction if their corresponding Master Curves have common endpoints along the edges where they adjoin. The SubCurve entity, which creates a new curve identical to the portion of a specified existing curve between two specified beads, allows construction of common edges even where commonality does not extend along a complete edge of one or both surfaces.

According to the invention, a surface Z having an edge which accurately and durably lies on another surface Y can be achieved by defining a snake S on Y, then using S for an edge curve in the subsequent specification of Z. This arrangement also provides an alternative solution for common edges, when S is specified to be a Line Snake lying along part or all of one edge of Y.

BRIEF DESCRIPTION OF THE DRAWINGS

FIG. 1 is a diagrammatic perspective view that shows a computer system having a central processing unit and disk memory, keyboard, mouse, and monitor, on which is displayed a 3-dimensional geometric model as a wireframe.

FIGS. 2 to 5 are graphical diagrams that illustrate point objects: FIG. 2, Absolute Point and Relative Point; FIG. 3, Absolute Bead and Relative Bead; FIG. 4, Absolute Magnet and Relative Magnet; FIG. 5, Absolute Ring and Relative Ring.

FIGS. 6 to 10 are graphical diagrams that illustrate curve objects: FIG. 6, Line and Arc curves; FIG. 7, B-Spline Curve; FIG. 8, C-Spline Curve; FIG. 9, Sub-curve; FIG. 10, Relative Curve.

FIGS. 11 to 18 are graphical diagrams that illustrate surface objects: FIG. 11, Ruled Surface; FIG. 12, Translation Surface; FIG. 13, Revolution Surface; FIG. 14, Blended Surface; FIG. 15, C-Lofted Surface; FIG. 16, B-spline Surface; FIG. 17, Sub-surface; FIG. 18, Relative Surface.

FIGS. 19 to 24 are graphical diagrams that illustrate snake objects: FIG. 19, Line Snake; FIG. 20, Arc Snake; FIG. 21, B-spline Snake; FIG. 22, C-spline Snake; FIG. 23, Sub-snake; FIG. 24, Relative Snake.

FIG. 25 is an example of the dependency digraph for a simple model.

FIG. 26 is a block diagram that illustrates an example organization of program modules which implements the present invention. FIG. 27 is a graphical diagram that shows an example application.

DETAILED DESCRIPTION OF THE PREFERRED EMBODIMENT

Figure 28:
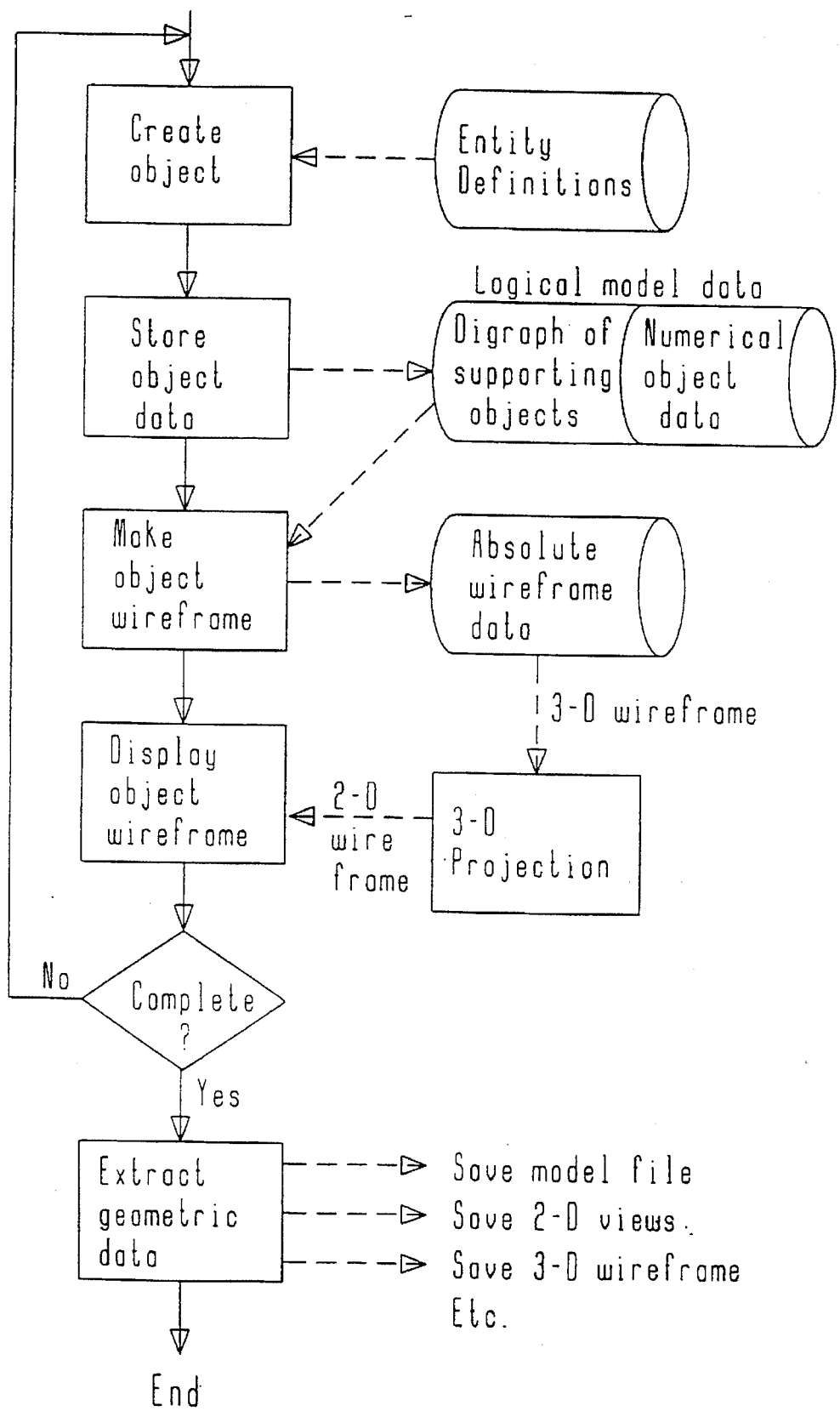
FIGS. 28–32 are flow chart diagrams that illustrate example sequences of process steps for creating and modifying a three dimensional geometric model according to the invention.
Figure 29:
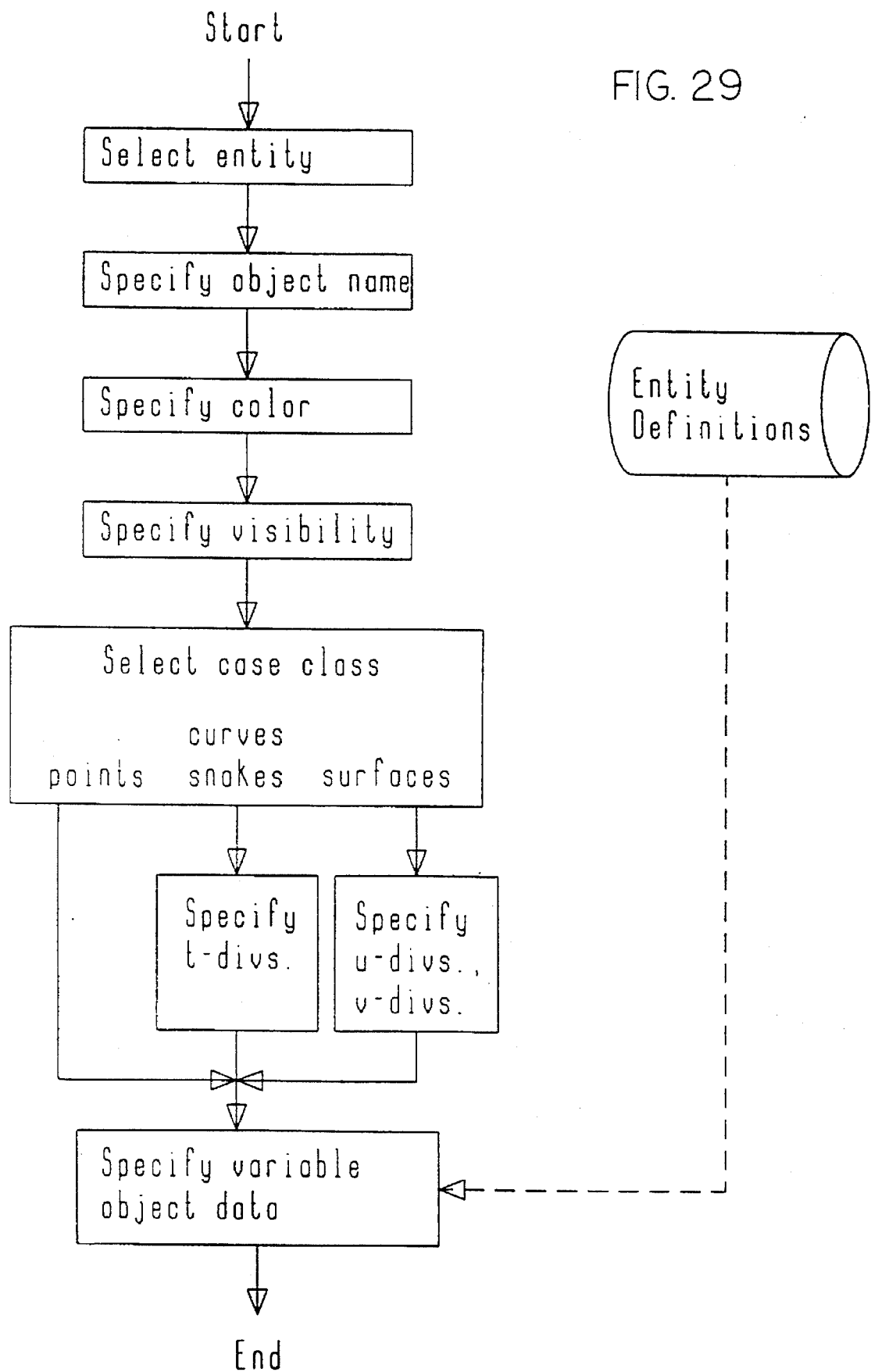

One preferred embodiment of the invention is a computer program operating on a suitable computer system such as an IBM-PC compatible or engineering workstation with a high-resolution color graphics display. The input device can be either a keyboard or a mouse. The graphics display is used primarily to display wireframe images of the model in perspective and/or orthogonal views. Controls are provided so the user can freely rotate, zoom or pan to select appropriate views. Alternative screen windows can show the u, v parameter space of a surface; outline-form listings of objects and their dependencies; and the text form of the logical model. FIG. 1 shows a computer system having a central processing unit and disk memory 11, keyboard 12, mouse 13, and monitor 14, on which is displayed a 3-dimensional object as a wireframe 15.

In the graphics display, a visible point object is displayed as a small circle. A visible line, curve, or snake object is represented as a polyline with a user-selectable number of subdivisions. A visible surface object is displayed as a mesh of parameter lines having a user-selectable number of subdivisions in each parameter direction. With more advanced graphic display hardware, surface objects may be rendered as solids with hidden lines and surfaces removed.

All objects have a color attribute; this can select one color from a palette of 16. All objects have a visibility attribute; this is a 16-bit integer in which the bits have different significance for different classes of entities, as follows:

points:
bit 1: point is visible
curves, snakes:
bit 1: polyline is visible
bit 2: polygon is visible
bit 3: tick-marks displayed at uniform parameter intervals
surfaces:
bit 1: parameter lines in u-direction are visible
bit 2: parameter lines in v-direction are visible
bit 4: boundary is visible The following is a list of entities supported in the preferred embodiment:

Point Class

Absolute Point (AbsPoint): x, y, z x, y, z are the absolute coordinates of the point.

Relative Point (RelPoint): point, dx, dy, dz dx, dy, dz are the coordinate offsets from 'point' FIG. 2 shows an Absolute Point 21 and a Relative Point 22 located in a Cartesian coordinate system.

Absolute Bead (AbsBead): curve, t t is an absolute parameter value on 'curve'

Relative Bead (RelBead): bead, dt dt is the parameter offset from 'bead' FIG. 3 shows a curve 31 in 3-space mapped from a 1-D parameter space 32, an Absolute Bead 33, and a Relative Bead located in both spaces.

Absolute Magnet (AbsMagnet): surface, u, v u, v are the absolute parameters on 'surface'

Relative Magnet (RelMagnet): magnet, u, v du, dv are the parameter offsets from 'magnet' FIG. 4 shows a surface 41 in 3-space mapped from a 2-D parameter space 42, an Absolute Magnet 43, and a Relative Magnet 44 located in both spaces.

Absolute Ring (AbsRing): snake, t t is an absolute parameter value on 'snake'

Relative Ring (RelRing): ring, dt dt is a parameter offset from 'ring' FIG. 5 shows a snake 51 in 3-space mapped from a 1-D parameter space 52 through a 2-D parameter space 53, and an Absolute Ring 54 and a Relative Ring 55 located in all three spaces.

Curve Class (All curves are parameterized from 0. to 1.)

Line (Line): point1, point2

The Line is a straight line from 'point1' ($x_1$) to 'point2' ($x_2$):

$$x(t)=(1-t)\,x_1+t\,x_2$$

Arc (Arc): point1, point2, point3

The Arc is a circular arc interpolating the three points in sequence. FIG. 6 illustrates Line 61 and Arc 62 objects, dependent on 2 and 3 point objects 63 respectively.

D-spline curve (BCurve): type, point1, point2, ... pointN
type gives the B-spline order: 1=linear, 2=quadratic, etc.
The named points are the vertices in sequence.

$$x(t) = \sum_{i=1}^{N} x_i B_i(t)$$

FIG. 7 illustrates a B-Spline Curve object 71, dependent on a multiplicity of point objects 72; and its 1-D parameter space 73.

C-spline curve (CCurve): point1, point2, ... pointN

The named points are interpolated in sequence.

The curve is a parametric cubic spline with chord-length parameterization, knots at the data points, and not-a-knot end conditions. FIG. 8 illustrates a C-Spline Curve object 81, dependent on a multiplicity of point objects 82; and its 1-D parameter space 83.

Sub-curve (SubCurve): curve, bead1, bead2

The sub-curve y(t) is the portion of curve x(s) from 'bead1' (parameter $s_1$) to 'bead2' (parameter s2):

$$y(t)=x[(1-t)\,s_1+t\,s_2]$$

FIG. 9 illustrates a Sub-curve object 91, which is a portion of curve object 92 between two bead objects 93, 94; and the 1-D parameter spaces 95, 96 of the curve and the subcurve respectively.

Relative curve (CRelCurve): curve, point1, point2 The relative curve x(t) is formed from curve y(t) and the two points $x_1$, $x_2$ by the linear transformation:

$$x(t)=y(t)+(1-t)\,[x_1-y(0)]+t\,[x_2-y(1)]$$

FIG. 10 illustrates a Relative Curve object 101, dependent on a curve object 102 and two point objects 103, 104; and its 1-D parameter space 105.

Surface Class (All surfaces are parameterized from 0 to 1 in both u and v directions)

Ruled surface (RuledSurf): curve1, curve2 The surface is formed from the two curves y(t), z(t) by linear interpolation:

$$x(u,v)=(1-v)\,y(u)+v\,z(u)$$

FIG. 11 illustrates a Ruled Surface object 111, dependent on two curve objects 112, 113; and its 2-D parameter space 114.

Translation surface (TranSurf): curve1, curve2

The surface is formed from the two curves y(t), z(t) by addition:

$$x(u,v)=y(u)+z(v)-z(0)$$

FIG. 12 illustrates a Translation Surface object 121, dependent on two curve objects 122, 123, and its 2-D parameter space 124.

Revolution surface (RevSurf): curve, point1, point2, angle1, angle2

The surface point at u, v is constructed by taking a point y(v) from 'curve', then rotating it through an angle $\theta=(1-u)\,\theta_1+u\,\theta_2$ about the axis line from 'point1' to 'point2'. FIG. 13 illustrates a Revolution Surface object 131, dependent on one curve object 132 and two point objects 133, 134 which define an axis 135; and its 2-D parameter space 136.

Blended surface (BlendSurf): curve1, curve2, curve3, curve4

The surface is a bilinear Coons patch constructed from the four curves. If the four curves are oriented end-to-end as in FIG. 14, the equation for locating a surface point is:

$$\begin{aligned}x(u,v) = &\ (1-v)\,x_1(u)+v\,x_3(1-u)+\\ &\ (1-u)\,x_4(1-v)+u\,x_2(v)-\\ &\ (1-u)(1-v)\,[x_1(0)+x_4(1)]/2-\\ &\ u(1-v)\,[x_1(1)+x_2(0)]/2-\\ &\ u\,v\,[x_2(1)+x_3(0)]/2-\\ &\ (1-u)\,v\,[x_3(1)+x_4(0)]/2\end{aligned}$$

FIG. 14 illustrates a Blended Surface object 141, dependent on four curve objects 142, 143, 144, 145; and its 2-D parameter space 146.

C-lofted surface (CLoftSurf): curve1, curve2, ... curveN

A surface point x(u,v) is obtained in three stages: (1) from each curve i take the point $x_i(u)$; (2) form the C-spline curve which interpolates the $x_i(u)$ in sequence; (3) evaluate the C-spline at parameter v.

FIG. 15 illustrates a C-Lofted Surface object 151, consisting of an infinitude of C-splines 152 interpolating several curve objects 153.

B-spline tensor-product surface (BSurf): typeU, typeV, N, M, point11, point12, ... pointNM typeU, typeV give the B-spline orders for u and v directions. N, M are numbers of vertices in u, v directions. point11, point12, ... pointNM are a rectangular net of control points.

$$x(u,v) = \sum_{i=1}^{N}\sum_{j=1}^{M} x_{ij}\,B_i(u)\,B_j(v)$$

FIG. 16 illustrates a B-spline Surface object 161, dependent on an array of point objects 162; and its 2-D parameter space 163.

Sub-surface (SubSurf): surface, snake1, snake2, snake3, snake4

The sub-surface is a portion of surface Y(P,q) bounded by the four snakes w1, w2, w3, w4 in end-to-end sequence.

$$x(u,v) = y(w) \text{ where}$$

-continued $$w = \{p,q\} = (1-v)\,w_1(u) + v\,w_3(1-u) +$$
$$(1-u)\,w_4(1-v) + u\,w_2(v) -$$
$$(1-u)(1-v)\,[w_1(0) + w_4(1)]/2 -$$
$$u\,(1-v)\,[w_1(1) + w_2(0)]/2 -$$
$$u\,v\,[w_2(1) + w_3(0)]/2 -$$
$$(1-u)\,v\,[w_3(1) + w_4(0)]/2$$

FIG. 17 illustrates a Sub-surface object 171, dependent on a surface object 172, four snake objects 173, 174, 175, 176; and the 2-D parameter spaces 177, 178 of the surface and the sub-surface respectively.

Relative surface (RelSurf): surface, point1, point2, point3, point4

The relative surface x(u,v) is formed from surface y(u,v) and the four corner points $x_1$, $x_2$, $x_3$, $x_4$ by the bilinear transformation:

$$x(u,v) = y(u,v) + (1-u)(1-v)\,[x_1 - y(0,0)] +$$
$$u\,(1-v)\,[x_2 - y(1,0)] +$$
$$v\,(1-u)\,[x_3 - y(1,1)] +$$
$$u\,v\,[x_4 - y(0,1)]$$

FIG. 18 illustrates a Relative Surface object 181, dependent on a surface object 182 and four point objects 183, 184, 185, 186; and its 2-D parameter space 187.

Snake class (All snakes are parameterized from 0 to 1. A snake is evaluated by first locating a point w={u,v} in the parameter space of the surface, then evaluating the surface with those parameter values.)

Line snake (LineSnake): magnet1, magnet2

The LineSnake is a straight line in u, v parameter space from 'magnet1' (w1={u1, v1}) to 'magnet2' (w2={u2, v2}):

$$w(t) = (1-t)\,w1 + t\,w2$$

FIG. 19 illustrates a Line Snake object 191, dependent on a surface object 192 and two magnet objects 193, 194; and the 1-D parameter space 195 of the snake; and the 2-D parameter space 196 of the surface.

Arc snake (ArcSnake): magnet1, magnet2, magnet3

The ArcSnake is a circular arc in u, v parameter space interpolating the three magnets. FIG. 20 illustrates an Arc Snake object 201, dependent on a surface object 202 and three magnet objects 203, 204, 205; and the 1-D parameter space 206 of the snake; and the 2-D parameter space 207 of the surface.

B-spline snake (BSnake): type, magnet1, magnet2, . . . magnetN type gives the B-spline order: 1=linear, 2=quadratic, etc. The named magnets are the vertices in sequence.

$$w(t) = \sum_{i=1}^{N} w_i B_i(t)$$

FIG. 21 illustrates a B-spline Snake object 211, dependent on a surface object 212 and multiple magnet objects 213; and the 1-D parameter space 214 of the snake; and the 2-D parameter space 215 of the surface.

C-spline snake (CSnake): magnet1, magnet2, . . . magnetN

The named magnets are interpolated in sequence.

The snake is a parametric cubic spline in the u, v parameter space with chord-length parameterization, knots at the data points, and not-a-knot end conditions.

FIG. 22 illustrates a C-spline Snake object 221, dependent on a surface object 222 and multiple magnet objects 223; and the 1-D parameter space 224 of the snake; and the 2-D parameter space 225 of the surface.

Sub-snake (SubSnake): snake, ring1, ring2

The sub-snake w(t) is the portion of 'snake' p(s) from 'ring1' (parameter $s_1$) to 'ring2' (parameter $s_2$):

$$w(t) = p[(1-t)\,s_1 + t\,s_2]$$

FIG. 23 illustrates a Sub-snake object 231, dependent on a surface object 232, a snake object 233, and two ring objects 234, 235; and the 1-D parameter spaces 236, 237 of the snake and sub-snake respectively; and the 2-D parameter space 238 of the surface.

Relative snake (RelSnake): snake, magnet1, magnet2

The relative snake w(t) is formed from 'snake' p(t) and the two magnets $m_1$, $m_2$ by the linear transformation:

$$w(t) = p(t) + (1-t)\,[m_1 - p(0)] + t\,[m_2 - p(1)]$$

FIG. 24 illustrates a Relative Snake object 241, dependent on a surface object 242, a snake object 243, and two magnet objects 244, 245; and the 1-D parameter space 246 of the relative snake; and the 2-D parameter space 247 of the surface.

TABLE III is a summary of the data items required to actualize each of the entities into an object.

Figure 35:
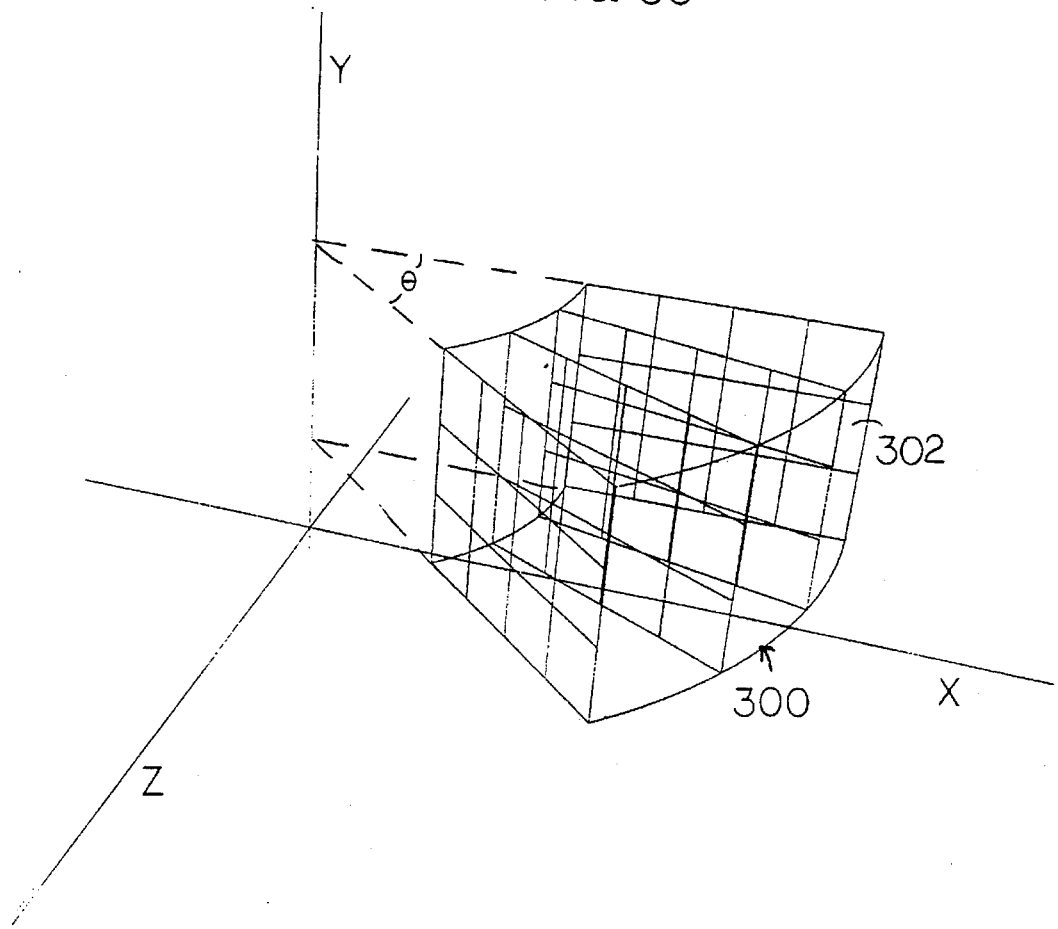
FIG. 35 is a graphical diagram of a parametric solid object.

Further entities which may be added to those described in detail above include the following:

Infinite (non-parametric) Planes specified in several ways, e.g. at specified x, y, or z coordinates; through three point objects; normal to a curve at a specified bead; tangent to a surface at a specified magnet;

Contour objects formed by intersection of surfaces with families of non-parametric planes, cylinders or spheres;

Mirrored Points, Curves, and Surfaces formed by reflecting any object of the specified class through a Plane, Line or Point object;

Projected Points, Curves, and Surfaces formed by projection of any object of the specified class onto a Plane or Line object;

Rotated Points, Curves and Surfaces formed by rotation of any object of the specified class about an axis Line object through a specified angle;

Foil Curves, Snakes and Foil-Lofted Surfaces utilizing standard airfoil curves;

Helix, conic, Catenary and Spiral curves;

NURBS Curves, Snakes and Surfaces;

PolyCurves, made by joining two or more specified curve objects end-to-end and reparameterizing from 0 to 1;

PolySnakes, made by joining two or more specified snake objects end-to-end and reparameterizing from 0 to 1;

Developable Surfaces, specified by two edge curves;

Fillet Surface, specified by two or more snakes on two different surfaces;

Swept Surfaces, formed by sweeping a parametrically varied cross-section curve along a specified curve object;

Projected Snake, formed by projecting a specified curve object onto a specified surface object;

Contour Bead, a Point object located at the intersection of a specified Curve object with a specified Plane object;

Contour Ring, a Point object located at the intersection of a specified Snake object with a specified Plane object;

Contour Snake, a Snake object located at the intersection of a specified Surface object with a specified Plane object;

BeadMagnet, a Point object at the intersection of a specified Curve object with a specified Surface object, and. serving as a bead on the curve and as a magnet on the surface;

RingMagnet, a Point object at the intersection of a specified Snake object with a specified Surface object, and serving as a ring on the snake and as a magnet on the surface;

BiSnake, a one-dimensional object located at the intersection of two specified Surface objects, and serving as a snake on either surface;

BiRing, a Point object located at the intersection of two specified Snake objects, and serving as a ring on either snake;

Parametric Solids such as Ruled Solid, Translation Solid, Revolution Solid, Blended Solid, B-spline Solid, C-lofted Solid, and NURBS Solid. FIG. 35 illustrates a Revolution Solid 300 formed by revolving a specified Surface object 302 through a specified angle θ, about a specified axis Line Y.

Logical models are stored as files in disk memory, in a text format similar to that previously outlined, but with some additional numerical parameters specifying polyline subdivisions for display. Each object is represented by a single text record beginning with the entity keyword indicated in parentheses in each of the above entity definitions. The keyword is followed by the object name, and color and visibility indices. Any curve or snake object will then have an integer telling the number of subdivisions desired for the polyline representing it in the display; any surface object will have two integers specifying the number of subdivisions in the u and v directions for the polyline mesh representing it in the display. Beyond this point, the required data for most entities is different, as indicated in the entity definitions above. The text file is terminated by the keyword "End". Remarks can be included in the text file by use of the keyword "Rem".

Internal to the program, objects are referenced by serial numbers corresponding to their sequence in the input data file, or sequence of creation. Requiring that all references be to previously defined objects is a simple way to eliminate the possibility of circular dependencies (digraph cycles). The organization of internal storage of the logical model includes a linked-list data structure representing the dependency digraph, to be used during updates of the absolute model. FIG. 25 is a digraph representing the dependencies in the "line A–line B" example developed in a previous section. The nodes 251 represent objects, and the edges 252 represent their dependencies.

The program has user-controlled capabilities for reading and writing logical-model data files in the appropriate text format, and for detecting and reporting errors and inconsistencies in a data file during read operations. The program can also read and display, simultaneous with displaying a model, one or more files representing 3-dimensional wireframes. The program can also write a 3-dimensional wireframe file of the absolute model currently displayed, or a 2-dimensional wireframe file of the current view.

Interactive capabilities are provided for creating, editing and deleting objects. Limited capabilities are provided for appropriate transmutations of objects to a different entity type; for example, any point object can be transmuted into an absolute point. In all these activities the program performs consistency checks and enforces rules ensuring the integrity of the digraph data structure. For example: all required dependencies have to be fulfilled before a newly created object is accepted into the logical model; an object cannot be deleted until all of its dependents have been deleted; circular dependencies are not permitted.

FIG. 26 shows an example organization of program modules which implements the invention. Each box 263, 264 represents a subroutine; each arrow 262 represents a subroutine call, with the arrow directed from the calling module to the called module.

The three special modules ("primary modules", 263) labeled "Point", "Curve" and "Surface" are the interface to any application program requiring absolute geometric information from the model. These have input and output arguments as follows:

Point—in: name (or index) of a point object out: absolute coordinates x, y, z

Curve—in: name (or index) of a curve object list of t parameter values out: list of point coordinates x, y, z Surface—in: name (or index) of a surface object list of u parameter values list of v parameter values (or, list of u, v parameter pairs)

out: array of point coordinates x, y, z (An input list of parameter values may have only a single entry, if only one point needs to be evaluated.)

The other modules ("secondary modules", 264) illustrated are not intended to be called from an application, being called only by the primary modules, as indicated by arrows, or in some cases by other secondary modules. These have input and output arguments as follows:

Bead—in: name (or index) of a bead object out: identity of supporting curve t parameter value Magnet—in: name (or index) of a magnet or ring object out: identity of supporting surface u, v parameter pair Ring—in: name (or index) of a ring object out: identity of supporting snake t parameter value Snake—in: name (or index) of a snake object list of t parameter values out: identity of supporting surface list of u, v parameter pairs The remaining secondary modules have the same arguments as the primary modules that call them.

Module "Point" determines what kind of point object it is evaluating and branches to the appropriate secondary routine, as indicated. Depending on the entity, "Point" may have to then call "Curve", "Snake", and/or "Surface" to complete its job. For example, if the object is any type of bead, "Point" calls "Bead", which returns the identity of the curve to which the bead belongs, and a single t parameter value. "Point" must then call "Curve" with this curve and parameter value, receiving back the x, y, z coordinates of the particular point occupied by the bead. Similarly, "Magnet" returns the identity of the surface which supports the magnet, and a u, v parameter pair. "Point" must then call "Surface" with this information, receiving back x, y, z coordinates. In the case of a ring, "Point" first calls "Ring", identifying the supporting snake and receiving a t parameter value; then it calls "Snake" with t and receives back identity of the surface and a u, v parameter pair; then it calls "Surface" with u, v and receives back x, y, z coordinates.

"Magnet" can be called with any object that can serve as a magnet, i.e. with a magnet or ring. If the object is a ring, "Magnet" first calls "Ring" to identify the snake, and a t parameter value; then calls "Snake" to identify the supporting surface and receive a u, v parameter pair.

"Curve", "Snake" and "Surface" are primarily branches to their constituent secondary routines. Since any point object can serve as a curve, "Curve" needs to be able to call "Point". Similarly, since any magnet or ring can serve as a snake, "Snake" needs to be able to call "Magnet". Also, since any snake object can serve as a curve, "Curve" must accept the index or name of a snake, call "Snake" to identify the supporting surface and receive back a list of u, v parameter pairs; then call "Surface" to evaluate x, y, z coordinates.

"Line" and "Line Snake" routines share a common "Line math" routine; similarly, the other curves and snakes share common math routines. The math routines are able to operate with either 2-D data (when called by a snake routine) or 3-D data (when called by a curve routine). It is obvious in FIG. 26 how easily a new parametric curve, snake, or surface entity can be added to the system; it requires only the addition of one secondary module implementing the new entity, and a small modification of one primary module, adding a branch to the new secondary module.

Some recursive calls are apparent as cycles in FIG. 26. The most obvious of these are the way "Magnet", "Bead" and "Ring" call themselves when they are evaluating a Relative Magnet, Bead or Ring. For another example, to locate a Relative Point, the program first needs to locate the basis point, no matter what kind of point object the basis point is. Thus, "Relative Point" must be able to call "Point". Similarly, "SubCurve" and "Relative Curve" must be able to call "Curve"; "SubSnake" and "Relative Snake" must be able to call "Snake"; and "SubSurface" and "Relative Surface" must be able to call "Surface".

Other potentially recursive calls to the primary routines are needed, which are not indicated by arrows in FIG. 26, because the arrows showing all such possibilities would be too numerous. For example, "Line", "Arc", "B-Curve" and "C-Curve" all need to evaluate their supporting points, by a series of calls to "Point". "Line Snake", "Arc Snake", "B-Snake" and "C-Snake" need to evaluate the u, v parameters of each of their supporting magnet objects, by a series of calls to "Magnet". The several surface routines need to evaluate various point, curve or snake objects, according to their individual constitutions; these are all done through calls to the primary modules.

Further levels of recursion occur when, for example, one curve supporting the surface being evaluated is a snake on another surface. In this case the sequence of calls passes through "Surface" twice. It is easy to think up cases with arbitrarily long chains of dependency. All such recursive possibilities are accommodated by the program structure indicated in FIG. 26. Without recursion, the program complexity and size would grow extremely rapidly with the allowable depth of dependency; with recursion, only stack space is required to indefinitely extend the permitted depth of dependency.

EXAMPLE APPLICATION OF THE PREFERRED EMBODIMENT

Table 1 is a text representation of an example logical model utilizing a variety of point, curve and snake objects, and six interconnected surface objects of various types, as defined and outlined above. FIG. 27 is a wireframe representation of the resulting absolute model. The example comprises hull, deck and cabin surfaces for a 30-foot sailing yacht design.

The example model has six surface objects: 'hull' 271 and 'deck' 272 are C-lofted surfaces; 'cabin_fwd' 273, 'cabin_side' 274, and 'cabin_aft' 275 are ruled surfaces; and 'cabin_top' 276 is a blended surface. The surfaces all have visibility 2, which causes only the parameter lines in the v-direction to be displayed. Eleven transverse sections 277 through the model are also displayed for purposes of visualizing the shapes.

'hull' is a C-lofted surface with three B-spline master curves 'MCA', 'MCB', 'MCC', each having four absolute points as vertices. 'deck' also has three master curves; the first is the single point 'MCAV1', the other two are 3-vertex B-spline curves 'deck_beam' and 'transom'. The join 278 between 'hull' and 'deck' is accurate and durable because the C-splines at the adjoining edges on each surface use the same data points, viz. 'MCAV1', 'MCBV1', 'MCCV1', and therefore are identical curves.

The three ruled surfaces 'cabin_fwd', 'cabin_side', 'cabin_aft' are constructed in a similar fashion to one another; each uses a snake on 'deck' as one edge, providing an accurate and durable join 279 to the 'deck' surface, and a relative curve dependent on that snake as the second (upper) edge. The three snakes on 'deck' join each other accurately and durably because they share common endpoint data, viz. magnets 'dm3' and 'dm5'. The three relative curves 'top_fwd', 'top_side', 'top_aft' also join each other accurately and durably because they are constructed using common end points, viz. relative points 'rp3' and 'rp5'. 'cabin_side' joins the other two surfaces accurately because its end rulings are the lines 'dm3'-'rp3' and 'dm5'-'rp5', which are identical to end rulings on the adjoining surfaces.

The blended surface 'cabin_top' joins the three ruled surfaces accurately because it uses their upper edge curves 'top_fwd', 'top_side', 'top_aft' as data. Its fourth side is a three-vertex C-spline 'top_ctr', which lies accurately in the centerplane because each of its vertices has a zero y coordinate.

The example model as now defined can easily be transformed into an extremely wide variety of alternative shapes by changing the coordinates of absolute points, the offsets of relative points, and the parameters of magnets. An example modification which affects all six surfaces is to increase the y coordinate of 'MCBV1'. Following any such change, the connectivity and relative positioning of the several surfaces is automatically preserved as the absolute model is updated.

FIGS. 28–32 illustrate possible sequences of process steps for creating and modifying a three-dimensional geometric model in accordance with the invention. In these flowcharts, solid arrows represent the temporal sequence of execution, while dashed arrows represent the flow of data between program modules and computer memory. The memory elements, depicted as cylinders, can be any form of computer memory including but not limited to disk files and random-access memory (RAM).

FIG. 28 shows a possible sequence of steps for creating a model. The "Create object" step is elaborated in FIG. 29. An object is created by first selecting an entity, then filling in the data fields required to actualize that particular entity. All entities require an object name, color, and visibility. Curves and snakes require specification of t-divisions; surfaces require specification of u- and v-divisions. Each object requires further data, its quantity, character and sequence depending on the entity definition. To obtain the specification for this variable object data, the program accesses stored data coding the entity definitions. The data entered during the "Create object" step may come from user interaction, or may be read in from a data file.

In FIG. 28, following the "Create object" step, the resulting logical object data is stored in memory. In the next step, a wireframe representation of the object is made and stored in memory. During this "Make object wireframe" step, calls will be made to Point, Curve, or Surface routines as required by the class of entity. Next, the object wireframe is displayed; this will require a projection transformation if the display device is two-dimensional, as is usual.

While further objects need to be created, the program loops back to the "Create object" step. When the model is complete, both logical and absolute model data may be accessed to create output files, or for other evaluation purposes.

Figure 30:
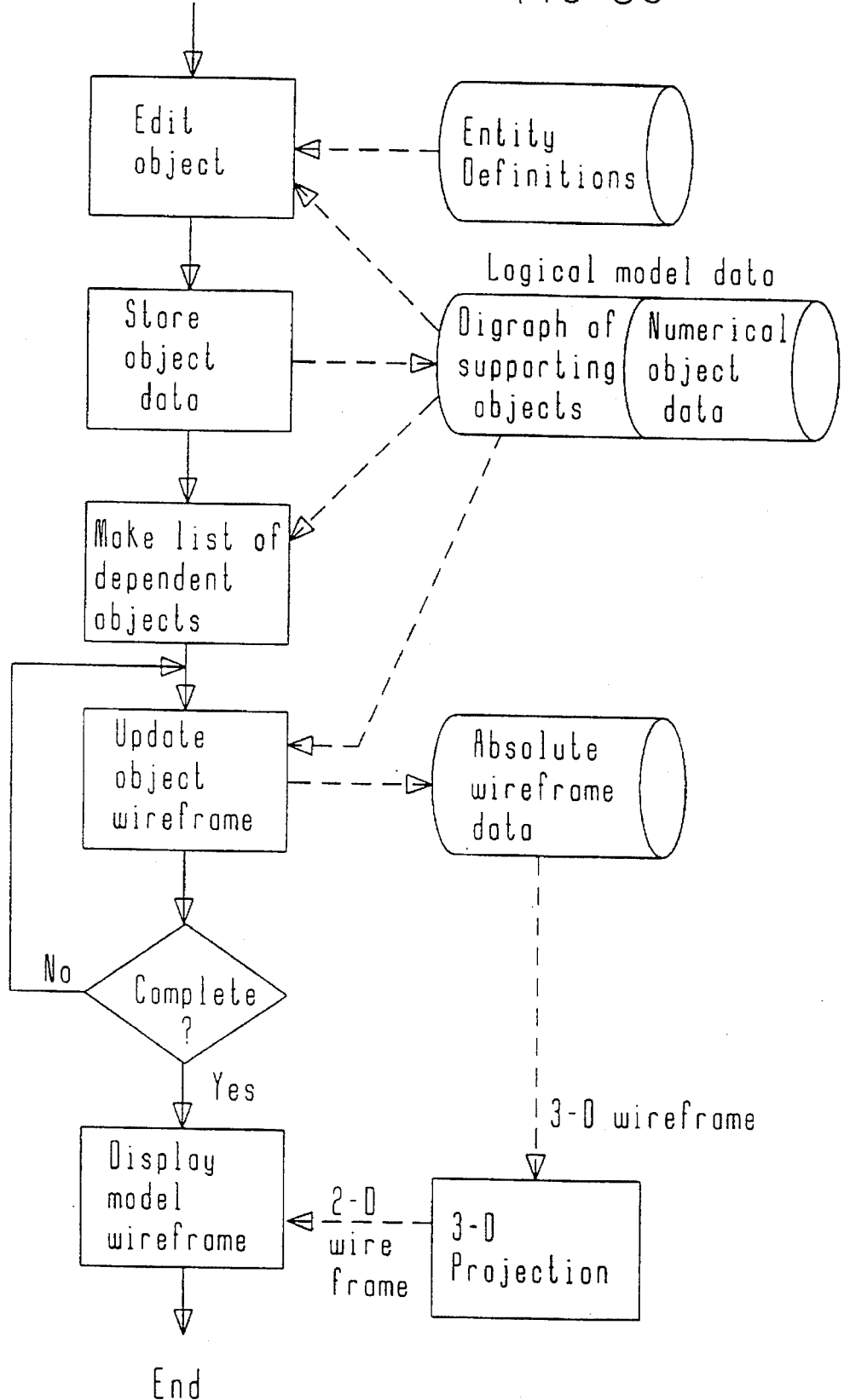

FIG. 30 illustrates a possible sequence of process steps for modifying a model in accordance with the invention. Editing can take place following completion of the steps of FIG. 28, or editing and creation steps may be interspersed. The first step in editing a model is to edit the logical data of a particular selected object. In this process the existing logical data for the object may be offered as defaults. The editing process is controlled by reference to the stored data which codes entity definitions and specifies what kind of data the entity requires. When the appropriate fields of object data have been altered, the logical object data representing this object in memory is updated. Making use of the stored dependency digraph, an "update list" is compiled of all objects affected by the change, i.e., first-generation dependents of the altered object, their dependents, etc. This list is headed by the altered object, is purged of duplicates, and is ordered so as to assure that all affected objects are updated in appropriate sequence, i.e. supports before dependents in every case.

The program next cycles automatically through the update list, creating an updated wireframe for each affected object. The "Update object wireframe" step during editing is essentially the same as the "Make object wireframe" step in FIG. 28, except that wireframe data of other objects may have to be moved if the new object wireframe is of different size from the existing one. When all affected objects have been processed, the entire model is up-to-date, and may be displayed, evaluated, and further modified.

LOOKUP TABLE DATA STRUCTURES AND PROCEDURES AS AN ALTERNATIVE TO DIRECT RECURSIVE EVALUATION

Lookup tables may be advantageously employed to improve the response of the program during initial evaluation and subsequent modification of a model. A portion of computer memory or disk memory (the "lookup table") is organized suitably for the storage of absolute object data. As each object is evaluated in sequence, its absolute coordinates and/or parameter values are recorded in the table. When and if this object is referenced during evaluation of later objects, the tabulated values can be used (usually by means of interpolation), rather than following the recursive evaluation procedure.

The lookup table is envisaged as being organized into "records", each record consisting of a variable number of real numbers, depending on the entity. A lookup table record will always contain x, y, and z values. For a bead, the record can additionally include t; for a magnet or snake, each record can include u and v; for a ring, each record can include t, u, and v.

A point object requires only a single record. A curve or snake object requires a sequence of records representing points distributed along the object. A surface object requires a sequence of records representing points distributed over the object in some orderly specified fashion.

For point objects, which require only one record and no interpolation, there is no loss of accuracy in using the lookup table.

For curve, snake, and surface objects, some loss of accuracy usually will result from the substitution of lookup table interpolation in place of direct recursive evaluation. This error depends in a complicated way on the number and distribution of the tabulated data points; the curvatures and higher derivatives of the tabulated object; the method of interpolation; and the specific parameter values for which the tabulated object needs to be evaluated. Because the interpolation error is difficult to predict or to bound, and because it accumulates from object to object as evaluation proceeds, the accuracy of the resulting absolute model is uncertain. However, it is known that even with the simplest interpolation scheme (linear interpolation for curves and snakes, bilinear interpolation for surfaces) and relatively coarse tabulations (such as 16 to 32 uniform divisions) the resulting accuracy is usually entirely adequate for visual evaluation and interactive editing. When greater accuracy is required, for example for N/C machining data, more accurate interpolation schemes can be employed; tabulated objects can be more finely subdivided; or direct recursive evaluation can be invoked.

The tabulated data need not be limited to points on the tabulated object. In a spline- or NURBS-based program, the tabulated data could be control points. If an interpolation scheme requiring derivative information is to be employed, the tabulated data would include first or higher derivative data.

Using lookup table interpolation, program structure can be substantially the same as FIG. 26, with one significant modification of each of the four primary modules. Each primary module will begin by accessing the index information in the table data and ascertaining whether the current object has been tabulated, and whether its tabulated data is up-to-date. If the table index data indicates that an up-to-date tabulation exists, the primary routine will branch to an appropriate interpolation routine (or, in the case of Point, will simply read the tabulated data); otherwise, it will follow the usual recursive path. In the second case it is apparent that the recursion will never be more than one level deep, since all supporting objects will have already been tabulated.

Figure 33:
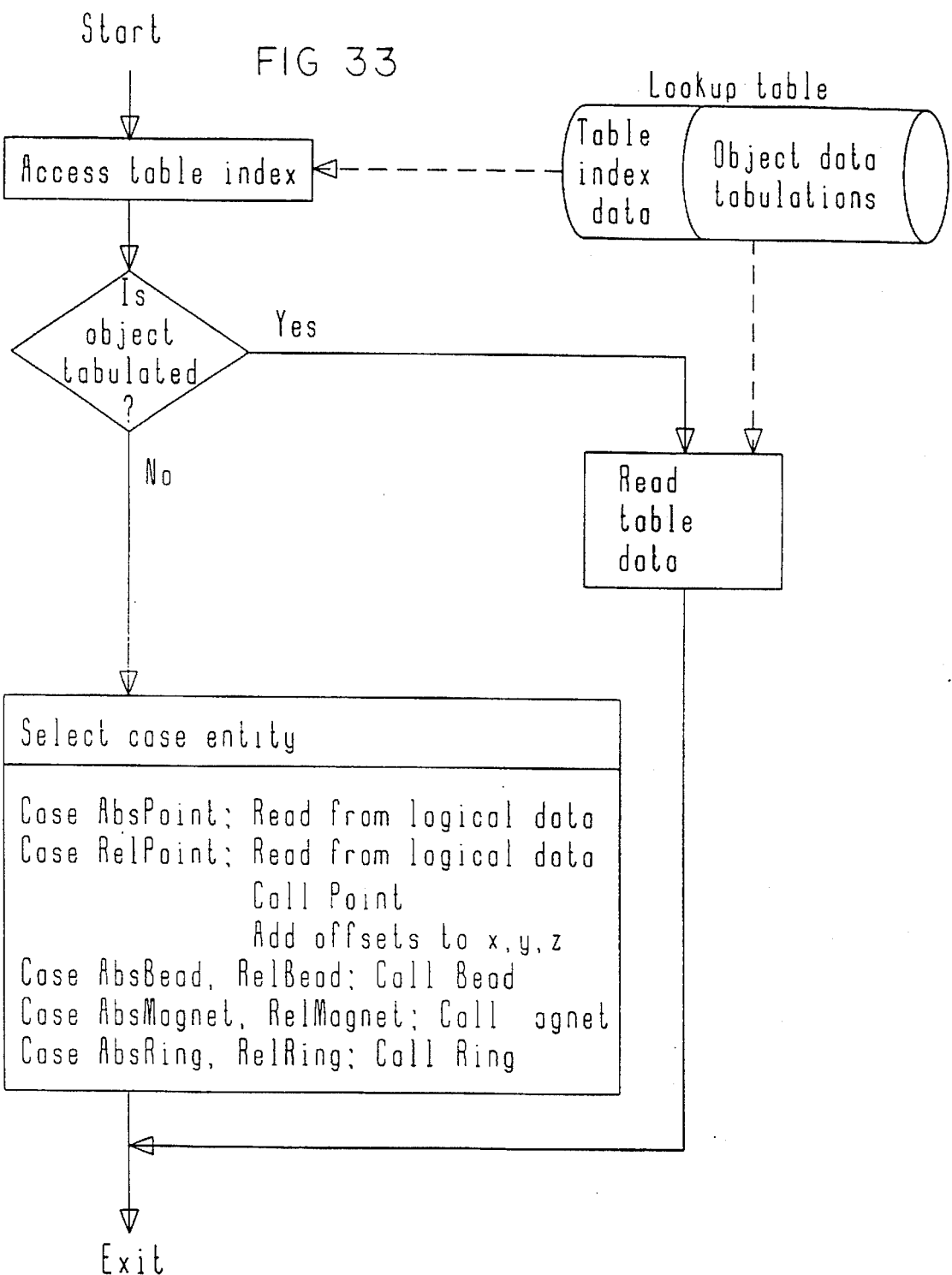
FIGS. 33 and 34 are flow chart diagrams that illustrate the organization of Point and Curve primary program modules and an example strategy for Point object and Curve object evaluations using a lookup table.
Figure 34:
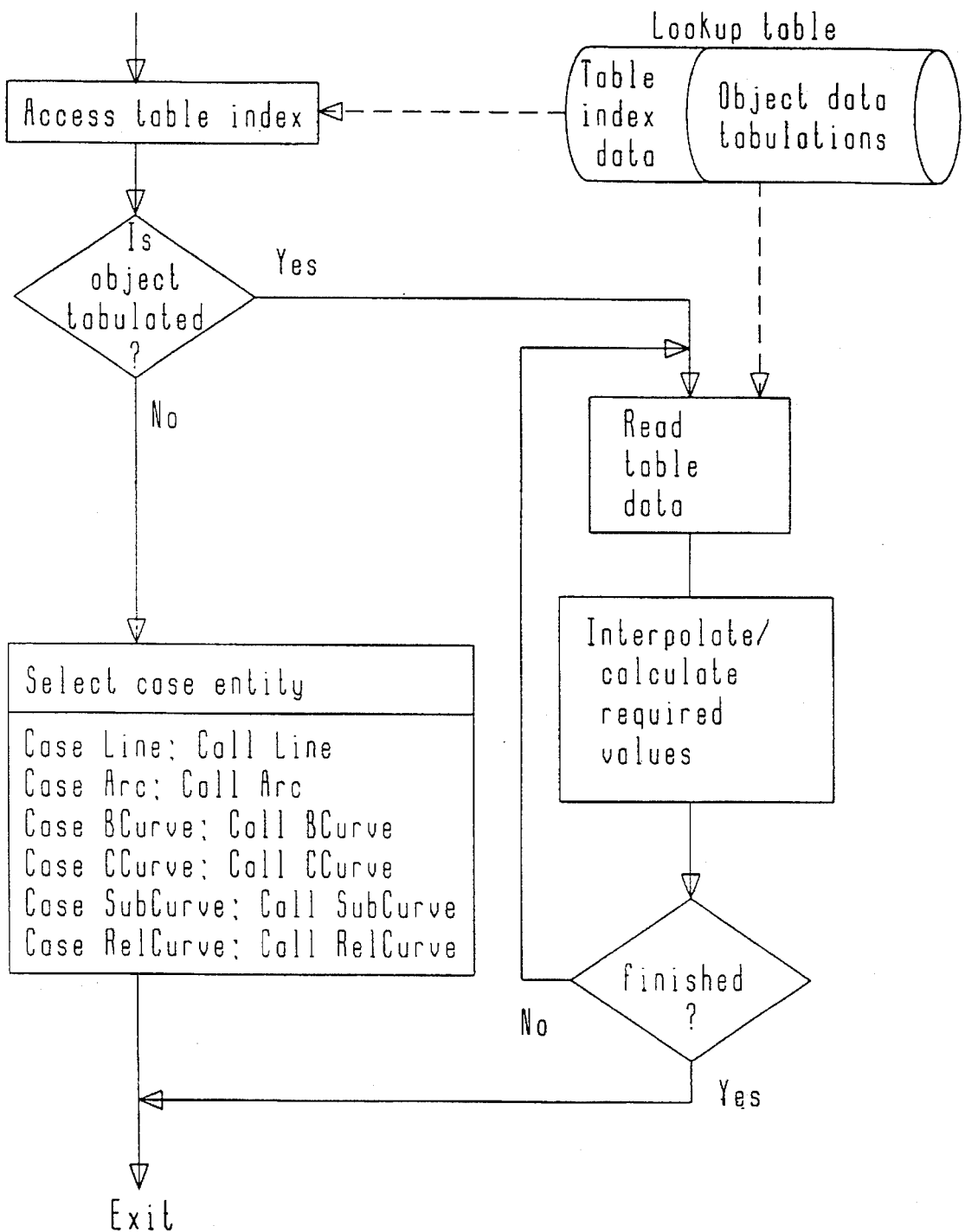

FIGS. 33 and 34 illustrate the organization of Point and Curve primary modules, respectively, for object evaluations using the lookup table. In all cases, if the object is found to be tabulated, then the usual recursive calls are avoided. The Curve primary module contains a loop which cycles through the evaluation of all requested points before exiting. Snake and Surface primary modules may be organized similar to Curve, except that surfaces require bidirectional interpolation.

Figure 31:
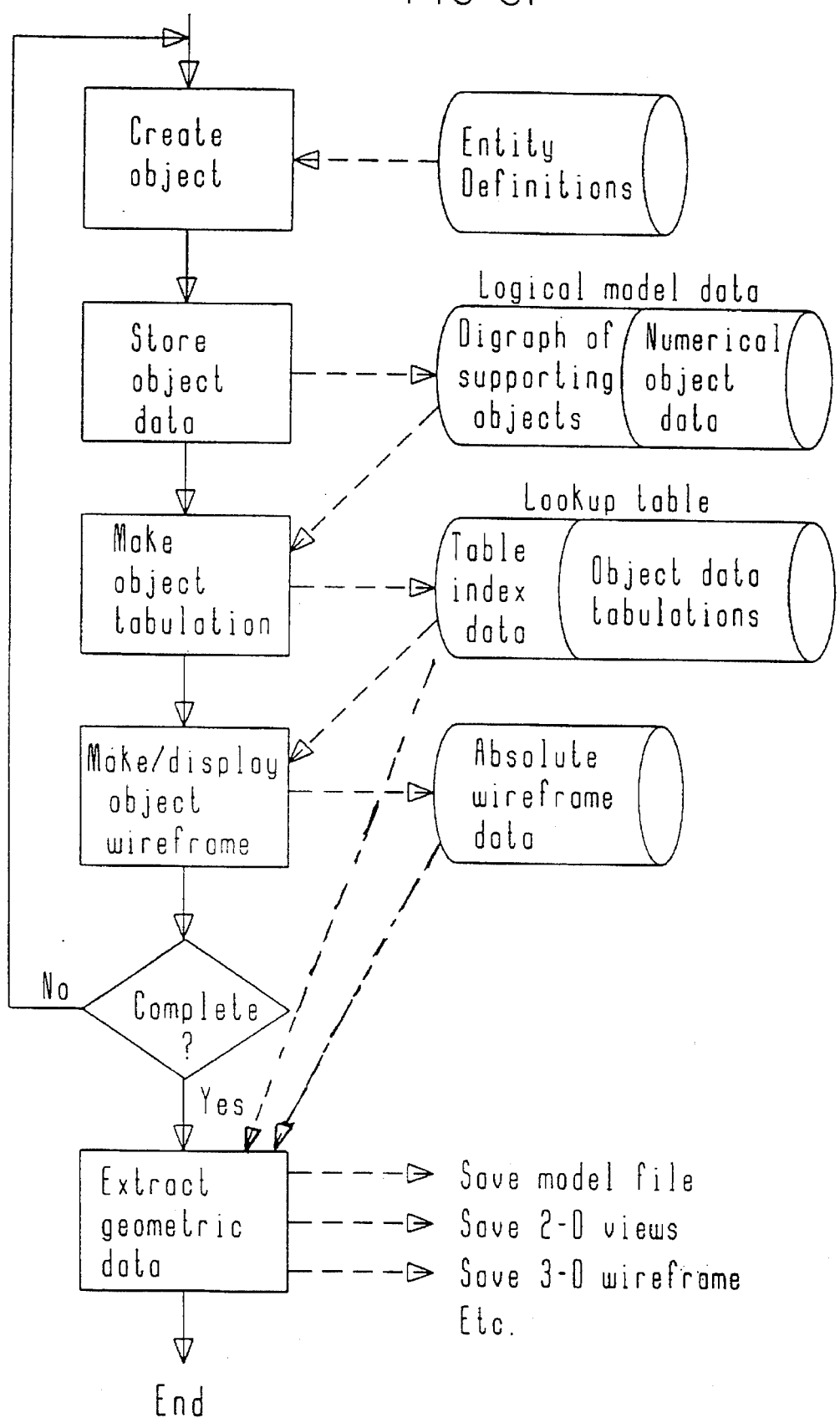
Figure 32:
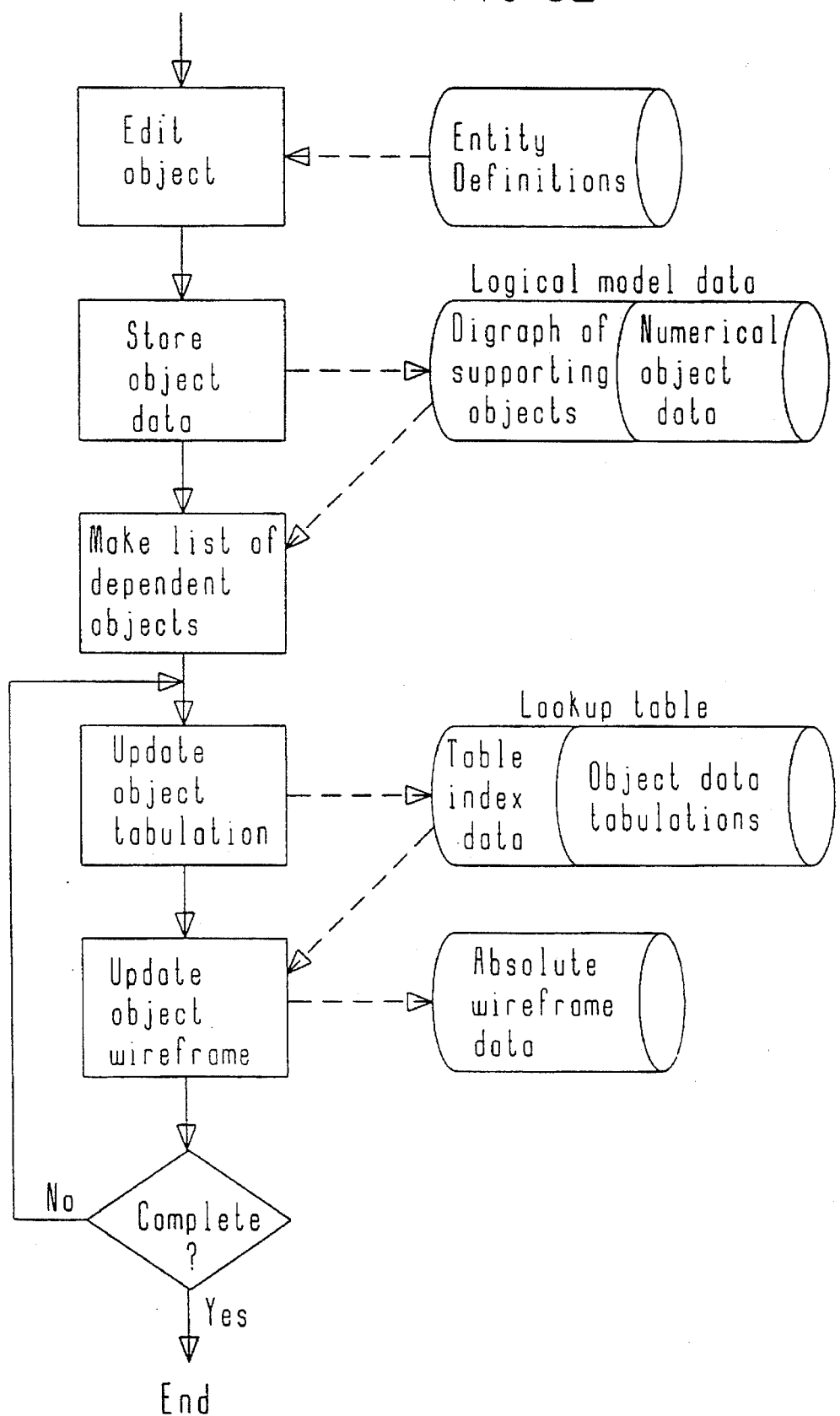

FIGS. 31 and 32 illustrate possible sequences of steps for utilizing lookup tables during model creation and editing respectively. The essential differences from FIGS. 28 and 30 are the presence of the lookup table data structures, and the addition of a "Make object tabulation" or "Update object tabulation" step which stores data in these structures, using calls to primary modules to generate table data. Not apparent in these flowcharts is the advantage that the primary modules can use interpolation rather than regenerating object data recursively. The "Make object wireframe" and "Update object wireframe" steps utilize data from the lookup table. The "Extract geometric data" step also can access data from the lookup table when appropriate.

Parametric solids are disclosed in the Summary of the Invention above and an example is illustrated in FIG. 35. In this example, a Revolution Solid 300 is formed by moving a specified Surface object 302 through a specified angle θ about the axis Line Y.

TABLE II is a program listing of a program entitled RGS.BAS, written in the computer language QuickBasic 4.5, which implements the disclosed method of computer aided design of geometric models, including automatic updating of the entire model following a change in a supporting geometric object. RGS.BAS is organized in accordance with the block diagram of FIG. 26. Each block in the diagram is implemented as a separate QuickBasic subroutine. Each arrow in the diagram of FIG. 26 is identifiable as a CALL Statement in the program. To illustrate a useful application of the primary routines, RGS.BAS includes routines that compute a 3-dimensional wireframe such as the ones illustrated in FIGS. 2–25 and 27. The routines that compute the wireframe call the primary routines Point, Curve, and Surface in order to receive all required geometric information about the absolute model.

RGS.BAS reads lines from an ASCII text file containing the description of an arbitrary logical model as disclosed and defined in this patent specification. The example set forth in TABLE 1 of this specification is a valid input file. Each geometric object is specified with a geometric object record of one or more lines in the input file, terminated by a semicolon. The order of data in a geometric object record is: entity keyword; object name; color; visibility; and variable entity data. Data items in a geometric object record are separated by one or more spaces. Variable length lists of supporting geometric object names are enclosed in braces{ }. Remarks are permitted using the keyword "Rem". The input file is terminated by the keyword "End".

RGS.BAS reads the input file and stores an internal representation of the logical model in arrays, including a representation of the directed graph data structure of multiple dependencies. It computes from this stored internal representation a 3-dimensional wireframe representation of the implied absolute model, using recursion as required to support multiple levels of dependency. RGS supports by computer implemented steps all 28 of the geometric entities disclosed in this patent specification.

RGS.BAS outputs 3-dimensional wireframe data to an ASCII text file in a prescribed format (3DA). The output file can easily be translated to a variety of CAD formats including 3-dimensional DXF files for AutoCAD. It can be directly displayed in 3 dimensions with off-the-shelf software such as AeroHydro's C3D.

RGS.BAS provides user interaction allowing the user to alter any of the numerical values in any point object. Using the stored digraph data structure, RGS.BAS selectively updates all geometric objects affected by the change, and writes a new wireframe file for the updated absolute model.

TABLE 1

Text representation of logical model for the example application.
(Entity keyword; name; color; visibility; variable entity data)
Rem 3×4 cloft hull with deck and cabin for patent example
AbsPoint MCAV1 14 1 0.00 0.00 3.60;
AbsPoint MCAV2 14 1 1.00 0.00 1.41;
AbsPoint MCAV3 14 1 2.50 0.00 −0.84;
AbsPoint MCAV4 14 1 3.00 0.00 −0.90;
BCurve MCA 12 1 20 2
   { MCAV1 MCAV2 MCAV3 MCAV4 };
AbsPoint MCBV1 14 1 15.00 5.84 2.64;
AbsPoint MCBV2 14 1 15.00 6.00 0.54;
AbsPoint MCBV3 14 1 15.00 3.90 −1.20;
AbsPoint MCBV4 14 1 15.00 0.00 −1.44;
BCurve MCB 12 1 20 2
   { MCBV1 MCBV2 MCBV3 MCBV4 };
AbsPoint MCCV1 14 1 30.00 3.50 2.76;
AbsPoint MCCV2 14 1 30.90 3.50 1.41;
AbsPoint MCCV3 14 1 31.70 2.50 0.22;
AbsPoint MCCV4 14 1 31.70 0.00 0.22;
BCurve MCC 12 1 20 2
   { MCCV1 MCCV2 MCCV3 MCCV4 };
CLoftSurf hull 10 2 20 30 0 1 MCA MCB MCC
AbsPoint transom0 14 1 29.80 0.00 3.00;
AbsPoint transom1 14 1 29.80 1.75 3.00;
BCurve transom 10 1 10 2
   { MCCV1 transom1 transom0 };
AbsPoint deck_ctr 14 1 15.00 0.00 3.45;
AbsPoint deck_mid 14 1 15.00 2.70 3.45;
BCurve deck_beam 10 1 10 2
   { MCBVL deck_mid deck_ctr };
CLoftSurf deck 7 2 8 10

TABLE 1-continued

{ MCAV1 deck_beam transom };
AbsMagnet dm1 11 1 deck 1.00 0.27;
AbsMagnet dm2 11 1 deck 0.63 0.27;
AbsMagnet dm3 11 1 deck 0.35 0.30;
AbsMagnet dm4 11 1 deck 0.20 0.50;
AbsMagnet dm5 11 1 deck 0.20 0.70;
AbsMagnet dm6 11 1 deck 1.00 0.70;
BSnake footprint_fwd 11 1 10 2
   { dm1 dm2 dm3 };
BSnake footprint_side 11 1 20 2
   { dm3 dm4 dm5 };
LineSnake footprint_aft 11 1 10 dm5 dm6;
RelPoint rp1 11 1 dm1 2.00 0.00 1.30;
RelPoint rp3 11 1 dm3 2.00 0.00 1.10;
RelPoint rp5 11 1 dm5 −0.20 −0.50 1.40;
RelPoint rp6 11 1 dm6 −0.30 0.00 1.80;
RelPoint rp7 11 1 deck_ctr 0.00 0.00 1.65;
RelCurve top_fwd 11 1 10 footprint_fwd rp1 rp3;
RelCurve top_side 11 1 20 footprint_side rp3 rp5;
RelCurve top_aft 11 1 10 footprint_aft rp5 rp6;
RuledSurf cabin_fwd 11 2 10 1
   footprint_fwd top_fwd ;
RuledSurf cabin_side 11 2 20 1
   footprint_side top_side ;
RuledSurf cabin_aft 11 2 10 1
   footprint_aft top_aft ;
CCurve top_ctr 11 1 10 2
   { rp1 rp7 rp6 };
BlendSurf cabin_top 14 2 4 5
   { top_fwd top_side top_aft top_ctr }; End

TABLE II

Re⸺.BAS Program Listing --

```
    DECLARE SUB UpdChain (upd%())
    DECLARE SUB PointX (o%, xyz!())
    DECLARE SUB FillParamList (lborder%, t1!, t2!, tlist!())
    DECLARE SUB Curve (o%, tt!(), xyzc!())
 5  DECLARE SUB Surface (o%, ulist!(), vlist!(), xyz!())
    DECLARE SUB GetVertices (o%, nv%, txyz!())
    DECLARE SUB Snake (o%, tt!(), surf%, uv!())
    DECLARE SUB BSurfVertices (o%, ncu%, ncv%, xyzp!())
    DECLARE SUB KillFile (fil$, er%)
10  DECLARE SUB StrSurf (o%, c%, ivis%, lnet%, ft%, np%)
    DECLARE SUB StrCurv (o%, nt%, c%, ivis%, ft%, np%)
    DECLARE SUB MakeObj3D (f3d%, ft%, iwf%(), o%, lac%)
    DECLARE SUB StoreSup (ec$, a$, d$, er%)
    DECLARE SUB GetToken (f%, lline%, t$, ncr%)
15  DECLARE SUB Service (a$, v$, n$)
    DECLARE SUB OpenFile (ftyp$, f%, fil$, reclen%, er%)
    DECLARE SUB ReadRep (fspec$, er$, ncr%)
    DECLARE SUB EntData (nent%, ecas%())
    DECLARE SUB ObjEntName (o%, cas$, oname$)
20  DECLARE SUB LineMsg (a$)
    DECLARE SUB Make3D (utd%(), endd%, lac%, iwf%())
    DECLARE SUB ArcSnake (o%, tlist!(), surf%, uv!())
    DECLARE SUB LineSnake (o%, tlist!(), surf%, uv!())
    DECLARE SUB BSnake (o%, tlist!(), surf%, uv!())
25  DECLARE SUB CSnake (o%, tlist!(), surf%, uv!())
    DECLARE SUB SubSnake (o%, tlist!(), surf%, uv!())
    DECLARE SUB RelSnake (o%, tlist!(), surf%, uv!())
    DECLARE SUB Cox (ko%, nv%, t1!, tk!(), b!())
    DECLARE SUB FillParamList (lborder%, t1!, t2!, tlist!())
30  DECLARE SUB CSplineSetup (ko%, nv%, k1%, k9%, tk!(),
    cbs!())
    DECLARE SUB Gauss1 (n2%, n3%, h!(), lsing%)
    DECLARE SUB ArcSetup (k9%, txyz!(), ca!())
    DECLARE SUB ArcEval (k1%, k9%, ca!(), tlist!(), xyzc!())
35  DECLARE SUB Ring (o%, sn%, t!)
    DECLARE SUB LineCurve (o%, tlist!(), xyzc!())
    DECLARE SUB GetVertices (o%, nv%, txyz!())
    DECLARE SUB BSplineEval (ko%, nv%, k1%, k9%, tk!(), c!(),
    tl!(), xyzc!())
40  DECLARE SUB Bead (o%, cv%, t!)
    DECLARE SUB SplineCurve (o%, tlist!(), xyzc!())
    DECLARE SUB Magnet (o%, sf%, u!, v!)
    DECLARE SUB TranslSurf (o%, ulist!(), vlist!(), xyz!())
    DECLARE SUB ArcCurve (o%, tlist!(), xyzc!())
45  DECLARE SUB LoftSurf (o%, ulist!(), vlist!(), xyz!())
    DECLARE SUB RelCurve (o%, tlist!(), xyzc!())
    DECLARE SUB BSurfVertices (o%, ncu%, ncv%, xyzp!())
    DECLARE SUB Knots (k%, nv%, tk!())
    DECLARE SUB RelSurf (o%, ulist!(), vlist!(), xyz!())
50  DECLARE SUB SubSurf (o%, plist!(), qlist!(), sf%, uv!())
    DECLARE SUB RevSurf (o%, ulist!(), vlist!(), xyz!())
    DECLARE SUB SubCurve (o%, tlist!(), xyzc!())
    DECLARE SUB BSplineSurf (o%, ulist!(), vlist!(), xyz!())
    DECLARE SUB BlendSurf (o%, ulist!(), vlist!(), xyz!())
55  DECLARE FUNCTION ObjNo% (a$, entyp%)
    DECLARE FUNCTION CVis% (o%, c%, ivis%)
    DECLARE FUNCTION EntSubClass$ (e%)
    DECLARE FUNCTION ErrMsg$ ()
```

-- RGS.BAS Program Listing --

```
       DECLARE FUNCTION EntClass% (entyp%)
       DECLARE FUNCTION STR16$ (a$)
       DECLARE FUNCTION ATAN2! (dy!, dx!)

5  REM Language is MicroSoft QBasic

DEFINT I-N
       CONST pi = 3.141593
       CLEAR , , 6000
   10
       CLS
       PRINT " RGS.BAS - Relational Geometric Synthesis demo
       program"
       PRINT " Copyright (C) 1992-1993 AeroHydro, Inc. All rights
   15  reserved."
       PRINT " P. O. Box 684, Southwest Harbor, Maine 04679 USA";
       PRINT " tel. 207-244-7347"
       PRINT STRING$(79, "=")

20  'cmd$ = COMMAND$
       'IF cmd$ <> "" THEN
       '    rep$ = UCASE$(cmd$)
       'ELSE
       '    PRINT " Usage:   rgs filename"
   25  '    PRINT "          filename is the name of an .RGS file; "
       '    PRINT "          (.RGS extension is assumed.)"
       '    END
       'END IF 30  VIEW PRINT 5 TO 25
       INPUT "filename"; a$
       rep$ = UCASE$(a$)

MaxObj = 100
   35  DIM objnam(1 TO MaxObj) AS STRING * 16
       DIM obj$(1 TO MaxObj), dep$(1 TO MaxObj)
       DIM obj%(1 TO MaxObj, 0 TO 8), objf(1 TO MaxObj, 1 TO 3)
       DIM iwf(0 TO MaxObj, 0 TO 1), utd%(1 TO MaxObj)
       n = 32: DIM ent$(1 TO n)
   40  DIM ecas%(1 TO n), entnam(1 TO n) AS STRING * 10
       CALL EntData(nent, ecas%())

fspec$ = rep$ + ".RGS"
       a$ = "Loading model " + fspec$ + " ..."
   45  LineMsg a$
       CALL ReadRep(fspec$, er$, ncr)
       IF er$ <> "" THEN LineMsg er$: END DIM of(1 TO 3)
   50  FOR i = 1 TO nobj: utd%(i) = 0: NEXT i
       DO
          CALL Make3D(utd%(), nobj, lacc, iwf())
          LineMsg ErrMsg$
          GOSUB Write3DA:
   55     GOSUB MovePoint: IF o% = 0 THEN EXIT DO
          REDIM upd%(0 TO 1)
          upd%(1) = o%: CALL UpdChain(upd%())
          PRINT "update chain:";
```

RGB.BAS Program Listing --

```
         FOR i = 1 TO upd%(0)
             j = upd%(i)
             utd%(j) = 0
             PRINT j;
 5       NEXT i: PRINT
     LOOP
     END FilErr:
10   ferr% = ERR
     RESUME NEXT Write3DA:
     PRINT "filename for output (" + rep$ + ") ";
15   INPUT a$
     IF a$ = "" THEN
         outfil$ = rep$ + ".3DA"
     ELSE
         outfil$ = UCASE$(a$) + ".3DA"
20   END IF
     PRINT "saving file..."
     OPEN "o", 1, outfil$
     OPEN "r", 2, "%f3d.bin", 14
     FIELD #2, 2 AS p$, 4 AS x$, 4 AS y$, 4 AS z$
25   f$ = "### ###.### ###.### ###.###"
     FOR i = 1 TO iwf(0, 0)
         GET #2, i
         PRINT #1, USING f$; CVI(p$); CVS(x$); CVS(y$); CVS(z$)
     NEXT i
30   CLOSE #2
     CLOSE #1
     PRINT "file saved: "; outfil$
     RETURN 35   MovePoint:
     f$ = "### \              \"
     PRINT "Point objects:"
     FOR i = 1 TO nobj
         cas% = obj%(i, 0)
40       IF (cas% > 0) AND (cas% < 32) THEN
             PRINT USING f$; i; objnam(i);
         END IF
     NEXT i
     PRINT
45   DO
         INPUT ; "select point to move, by index ( 0 ) "; a$
         o% = VAL(a$)
         IF o% = 0 THEN RETURN
         PRINT " "; objnam(o%)
50       cas% = obj%(o%, 0)
         lokay = (cas% > 0) AND (cas% < 32)
     LOOP WHILE NOT lokay
     SELECT CASE cas%
         CASE 1: n = 3: e$ = "   X [###.###]   Y [###.###]   Z
55  [###.###]"
         CASE 2: n = 3: e$ = "  dX [###.###]  dY [###.###]  dZ
    [###.###]"
         CASE 3, 7: n = 1: e$ = "   t [###.###]"
```

RGR.BAS Program Listing --

```
         CASE 4, 8: n = 1: e$ = "   dt [###.###]"
         CASE 5: n = 2: e$ = "   u [###.###]  v [###.###]"
         CASE 6: n = 2: e$ = "  du [###.###] dv [###.###]"
      END SELECT
 5    FOR k = 1 TO n: of(k) = objf(o%, k): NEXT k
      SELECT CASE n
         CASE 1: PRINT USING e$; of(1);
         CASE 2: PRINT USING e$; of(1); of(2);
         CASE 3: PRINT USING e$; of(1); of(2); of(3);
10    END SELECT
      j = 0
      cr$ = CHR$(13): tb$ = CHR$(9): bs$ = CHR$(6)
      lin = CSRLIN
      LOCATE lin, 6, 1, 14, 15
15    DO
         a$ = INKEY$
         SELECT CASE a$
            CASE cr$: EXIT DO
            CASE "0" TO "9", ".", "-", " "
20             PRINT a$;
               col% = POS(0)
               IF col% > 12 + 13 * j THEN LOCATE lin, col% - 1
            CASE tb$: j = (j + 1) MOD n: LOCATE lin, 6 + 13 * j
            CASE bs$
25             col% = POS(0)
               IF col% > 6 + 13 * j THEN LOCATE lin, POS(0) - 1
            CASE ELSE
         END SELECT
      LOOP
30    FOR j = 0 TO n - 1
         a$ = ""
         FOR k = 1 TO 7: a$ = a$ + CHR$(SCREEN(lin, 5 + 13 * j + k, 0)): NEXT k
         objf(o%, j + 1) = VAL(a$)
35    NEXT j
      PRINT
      RETURN EntityData:
40    DATA 0., Rem
      DATA 1.fff, AbsPoint
      DATA 2.pfff, RelPoint
      DATA 3.cf, AbsBead
      DATA 4.ef, RelBead
45    DATA 5.sff, AbsMagnet
      DATA 6.mff, RelMagnet
      DATA 7.nf, AbsRing
      DATA 8.rf, RelRing
      DATA 32.bpp, Line
50    DATA 33.bppp, Arc
      DATA 36.bb(p), BCurve
      DATA 37.bb(p), CCurve
      DATA 40.bcpp, RelCurve
      DATA 41.bee, SubCurve
55    DATA 64.bmm, LineSnake
      DATA 66.bmmm, ArcSnake
      DATA 67.bb(m), BSnake
      DATA 68.bb(m), CSnake
```

-- R\*\*.BAS Program Listing --

```
    DATA 71.bnmm, RelSnake
    DATA 73.brr, SubSnake
    DATA 96.bbcppff, RevSurf
    DATA 97.bbcc, TranSurf
 5  DATA 98.bbcc, RuledSurf
    DATA 102.bbb(c), CLoftSurf
    DATA 110.bbcccc, BlendSurf
    DATA 114.bbbbbb(p), BSurf
    DATA 120.bbspppp, RelSurf
10  DATA 122.bbnnnn, SubSurf
    DATA -1, 0

SUB AParse (txt$, nt, tok$())
    ' break a$ at spaces
15  b$ = LTRIM$(RTRIM$(txt$))
    nt = 0
    lenb = LEN(b$): IF lenb = 0 THEN EXIT SUB
    l0 = 0
    FOR i = 1 TO lenb
20      a$ = MID$(b$, i, 1)
        l1 = (a$ <> " ")
        IF l1 AND NOT l0 THEN t$ = t$ + MKI$(i)
        l0 = l1
    NEXT i
25  nt = LEN(t$) \ 2
    REDIM ist(0 TO nt), tok$(1 TO nt)
    FOR i = 0 TO nt - 1: ist(i) = CVI(MID$(t$, 1 + 2 * i, 2)):
    NEXT i
    ist(nt) = lenb + 1
30  FOR i = 1 TO nt
        tok$(i) = RTRIM$(MID$(b$, ist(i - 1), ist(i) - ist(i - 1)))
    NEXT i
    END SUB
35
    SUB ArcCurve (o%, tlist(), xyzc())
    ' tabulate nt points along circular arc curve
    ' o% is object no. of an Arc
    ' t1, t2 = parameter range
40  ' see Faux & Pratt p. 67
    SHARED obj$(), merr, erro%
    nv = 3
    DIM ca(0 TO nv, 1 TO 3)
    REDIM txyz(0, 0)
45  CALL GetVertices(o%, nv, txyz()): IF merr THEN EXIT SUB
    CALL ArcSetup(3, txyz(), ca())
    IF merr THEN erro% = o%: EXIT SUB
    CALL ArcEval(1, 3, ca(), tlist(), xyzc())

50  END SUB

SUB ArcEval (k1, k9, ca(), tlist(), xyzc())
    ' Evaluate an arc that has been set up by call ArcSetup
    i1 = LBOUND(tlist): i9 = UBOUND(tlist)
55  cv = ca(3, 1)
    arclen = ca(3, 2)
    th3 = cv * arclen
    FOR i = i1 TO i9
```

-- RGS.BAS Program Listing --

```
            t = tlist(i)
            dd = 1
            IF th3 < .001 THEN
                s = t * arclen
 5              dd = dd * arclen
                a0 = s
                b0 = s * s / 2
                a1 = dd
                b1 = dd * s
10          ELSE
                th = th3 * t
                dd = dd * th3
                ct = COS(th)
                st = SIN(th)
15              a0 = st / cv
                b0 = (1 - ct) / cv ^ 2
                a1 = ct / cv * dd
                b1 = st / cv ^ 2 * dd
            END IF
20          FOR k = 1 TO k9
                xyzc(i, k) = ca(0, k) + ca(1, k) * a0 + ca(2, k) * b0
            NEXT k
        NEXT i

25    END SUB

SUB ArcSetup (k9, txyz(), ca())
      ' Setup for arc evaluation
      ' in- k9 = range of k
30    '     txyz() = vertices
      'out- ca(1,k) l=0 is x-start; l=1 is xs-start; l=2 is xss-start
      '     l=3 is 1/r, arclength
      DIM a(1 TO 3), b(1 TO 3), c(1 TO 3), d(1 TO 3)
35    DIM p(1 TO 3), q(1 TO 3), ctr(1 TO 3)
      SHARED merr
      eps = .00001 a2 = 0
40    b2 = 0
      c2 = 0
      ab = 0
      FOR k = 1 TO k9
          ca(0, k) = txyz(1, k)
45        a(k) = txyz(2, k) - txyz(1, k)
          a2 = a2 + a(k) ^ 2
          b(k) = txyz(3, k) - txyz(1, k)
          b2 = b2 + b(k) ^ 2
          c(k) = b(k) - a(k)
50        c2 = c2 + c(k) ^ 2
          ab = ab + a(k) * b(k)
          d(k) = 0
      NEXT k
      IF k9 = 3 THEN
55        d2 = 0
          FOR k = 1 TO k9
              k1 = k MOD 3 + 1
              k2 = k1 MOD 3 + 1
```

RGN.BAS Program Listing --

```
            d(k) = a(k1) * c(k2) - a(k2) * c(k1)
            d2 = d2 + d(k) ^ 2
         NEXT k
      ELSE
5        d(3) = a(2) * b(1) - a(1) * b(2)
         d2 = d(3) ^ 2
      END IF
      IF a2 + b2 + c2 < eps THEN GOTO AS10:
      IF (a2 = 0) OR (b2 = 0) OR (c2 = 0) THEN merr = 2: EXIT SUB
10    cvb = 2 * SQR(d2) / SQR(a2 * c2)   ' b/r
      cv = cvb / SQR(b2)   ' 1/r
      IF cv = 0 THEN
         arclen = SQR(b2)
         FOR k = 1 TO k9
15          ca(1, k) = b(k) / arclen
            ca(2, k) = 0
         NEXT k
      ELSE
         FOR k = 1 TO 3: d(k) = d(k) / SQR(d2): NEXT k
20       FOR k = 1 TO k9
            ctr(k) = (b2 * (a2 - ab) * a(k) + a2 * (b2 - ab) *
      b(k)) / (2 * d2)
            q(k) = ctr(k) * cv
            ca(2, k) = q(k) * cv
25          ctr(k) = ctr(k) + txyz(1, k)
         NEXT k
         'now d() is unit vector normal to plane
         '    q() is unit vector from pt. 1 toward the center
         IF k9 = 3 THEN
30          FOR k = 1 TO 3
               k1 = k MOD 3 + 1
               k2 = k1 MOD 3 + 1
               p(k) = -(d(k1) * q(k2) - d(k2) * q(k1))
            NEXT k
35       ELSE
            p(1) = -q(2) * d(3)
            p(2) = q(1) * d(3)
         END IF
         FOR k = 1 TO k9: ca(1, k) = p(k): NEXT k
40       ' ca(1, ) is unit vector tangent to arc at pt. 1
         ' ca(2, ) is the initial acceleration
         costh3 = 0
         sinth3 = 0
         FOR k = 1 TO k9
45          r3k = (txyz(3, k) - ctr(k)) * cv
            costh3 = costh3 - r3k * q(k)
            sinth3 = sinth3 + r3k * p(k)
         NEXT k
         th3 = ATAN2(sinth3, costh3)
50       IF th3 < 0 THEN th3 = th3 + 2 * pi
         arclen = th3 / cv
      END IF 55    ca(3, 1) = cv
      ca(3, 2) = arclen
      EXIT SUB
```

RG$_?$.bAS Program Listing --

```
    AS10: 'one pt.
    FOR k = 1 TO k9
        ca(0, k) = txyz(1, k)
        FOR l = 1 TO 3: ca(l, k) = 0: NEXT l
5   NEXT k

END SUB

SUB ArcSnake (o%, tlist(), surf%, uv())
10  SHARED dep$()
    d$ = dep$(o%)
    REDIM txyz(0, 0)
    CALL GetVertices(o%, nv, txyz()): IF merr THEN EXIT SUB
    mg% = CVI(MID$(d$, 1, 2))
15  CALL Magnet(mg%, surf%, u, v): IF merr THEN EXIT SUB
    DIM ca(0 TO nv, 1 TO 3)
    CALL ArcSetup(2, txyz(), ca())
    IF merr THEN erro% = o%: EXIT SUB
    CALL ArcEval(1, 2, ca(), tlist(), uv())
20  END SUB FUNCTION ATAN2 (dy, dx)
    ' cut along neg. dx axis
25  a = 0
    IF ABS(dy) > ABS(dx) THEN
        IF dy > 0 THEN
            a = pi / 2 - ATN(dx / dy)
        ELSE
30          a = -pi / 2 - ATN(dx / dy)
        END IF
    ELSE
        IF dx > 0 THEN
            a = ATN(dy / dx)
35      ELSEIF dx < 0 THEN
            IF dy > 0 THEN
                a = pi + ATN(dy / dx)
            ELSE
                a = -pi + ATN(dy / dx)
40          END IF
        END IF
    END IF
    ATAN2 = a
    END FUNCTION
45
    SUB Bead (o%, cv%, t)
    ' returns the index of the curve, and the parameter
    SHARED obj%(), objf(), dep$(), merr, erro%
    d$ = dep$(o%)
50  SELECT CASE obj%(o%, 0)
        CASE 3, 7
            cv% = CVI(MID$(d$, 1, 2))' identity of curve
            t = objf(o%, 1)
        CASE 4, 8
55          bd% = CVI(MID$(d$, 1, 2))
            entyp% = obj%(bd%, 0)
            SELECT CASE entyp%
                CASE 3, 4, 7, 8
```

RGS.BAS Program Listing --

```
              CASE ELSE: merr = 1: erro% = o%: EXIT SUB
         END SELECT
         CALL Bead(bd%, cv%, t): IF merr THEN EXIT SUB
         t = t + objf(o%, 1)
5    END SELECT

END SUB

SUB BlendSurf (o%, ulist(), vlist(), xyz())
10   ' fills a table for a linear blended surface
     ' Ref. Faux & Pratt p. 199 for linear Coons patch.
     ' o% - object no. for blended surface
     ' nu, nv = no. of segments.
     ' xyz(i,j,k): j= long. spline no., i = index along spline,
15   ' k = x,y,z
     SHARED dep$(), merr, erro%
     d$ = dep$(o%)
     DIM d(0 TO 1), p(1 TO 3)
     i1 = LBOUND(ulist): i9 = UBOUND(ulist)
20   j1 = LBOUND(vlist): j9 = UBOUND(vlist)
     IF i1 < j1 THEN ij1 = i1 ELSE ij1 = j1
     IF i9 > j9 THEN ij9 = i9 ELSE ij9 = j9

'lp = -1
25   ns = 4
     DIM side%(1 TO ns) ' object no.
     DIM ior(1 TO ns) 'orientation
     DIM xyzs(1 TO ns, ij1 TO ij9, 1 TO 3) 'sides
     DIM xyzk(1 TO ns, 1 TO 3) 'korners
30   nuv = 2: DIM xyzc(1 TO nuv, 1 TO 3), tlist(1 TO nuv)
     ' sort out side orientations
     jd = 1
     IF lp THEN PRINT "ior: ";
     FOR l = 1 TO ns
35      ior(l) = 0
        s% = CVI(MID$(d$, jd + 2 * (l - 1), 2))
        side%(l) = s%
        CALL FillParamList(0, 0, 1, tlist())
        CALL Curve(s%, tlist(), xyzc()): IF merr THEN EXIT SUB
40      IF l > 1 THEN
           FOR n = 0 TO 1
              d(n) = 0
              FOR k = 1 TO 3
                 d(n) = d(n) + (xyzc(n + 1, k) - p(k)) ^ 2
45            NEXT k
           NEXT n
           IF d(1) < d(0) THEN ior(l) = -1
        END IF
        FOR k = 1 TO 3: p(k) = xyzc(2 + ior(l), k): NEXT k
50      IF lp THEN PRINT ior(l);
     NEXT l
     IF lp THEN PRINT
     ' tabulate points along edge curves
     FOR k = 1 TO 3
55      FOR l = 1 TO ns: xyzk(l, k) = 0: NEXT l
     NEXT k
     FOR l = 1 TO ns
        lrev = 0
```

-- RGS.BAS Program Listing --

```
         IF ior(l) THEN lrev = NOT lrev
         IF l > 2 THEN lrev = NOT lrev
         IF (l AND 1) THEN
            REDIM xyzc(i1 TO i9, 1 TO 3), tlist(i1 TO i9)
5           ij1 = i1: ij9 = i9
            IF lrev THEN
               FOR i = i1 TO i9: tlist(i) = 1 - ulist(i): NEXT i
            ELSE
               FOR i = i1 TO i9: tlist(i) = ulist(i): NEXT i
10          END IF
         ELSE
            REDIM tlist(j1 TO j9)
            REDIM xyzc(j1 TO j9, 1 TO 3)
            ij1 = j1: ij9 = j9
15          IF lrev THEN
               FOR j = j1 TO j9: tlist(j) = 1 - vlist(j): NEXT j
            ELSE
               FOR j = j1 TO j9: tlist(j) = vlist(j): NEXT j
            END IF
20       END IF
         CALL Curve(side%(l), tlist(), xyzc()): IF merr THEN EXIT
   SUB
         FOR ij = ij1 TO ij9
            IF lp THEN PRINT USING "ij=### "; ij;
25          FOR k = 1 TO 3
               xyzs(l, ij, k) = xyzc(ij, k)
               IF lp THEN PRINT USING "  ###.###  "; xyzs(l, ij,
   k);
            NEXT k
30          IF lp THEN PRINT
         NEXT ij
         REDIM xyzc(1 TO 3, 1 TO 3), tlist(1 TO 3)
         CALL FillParamList(0, 0, 1, tlist())
         CALL Curve(side%(l), tlist(), xyzc()): IF merr THEN EXIT
35 SUB
         ' corners & midpoints
         FOR k = 1 TO 3
            xyzk(l, k) = xyzk(l, k) + xyzc(1 - 2 * ior(l), k) / 2
            l1 = l MOD ns + 1
40          xyzk(l1, k) = xyzk(l1, k) + xyzc(3 + 2 * ior(l), k) /
   2
         NEXT k
         IF lp THEN INPUT a$
      NEXT l
45    IF lp THEN
         PRINT "corners:"
         FOR l = 1 TO 4
            PRINT USING " ## "; l;
            FOR k = 1 TO 3: PRINT USING "   ###.###"; xyzk(l, k);
50    : NEXT k
            PRINT
         NEXT l
      END IF
      ' now tabulate surface
55    FOR i = i1 TO i9
         u = ulist(i)
         FOR j = j1 TO j9
            v = vlist(j)
```

-- RG$\underline{S}$.pAS Program Listing --

```
        IF lp THEN PRINT USING "u=##.###  v=##.### "; u; v;
        FOR k = 1 TO 3
            q = 0
            q = q + (1 - v) * xyzs(1, i, k) + v * xyzs(3, i,
5   k)
            q = q + (1 - u) * xyzs(4, j, k) + u * xyzs(2, j,
    k)
            q = q - (1 - v) * ((1 - u) * xyzk(1, k) + u *
    xyzk(2, k))
10          q = q - v * ((1 - u) * xyzk(4, k) + u * xyzk(3,
    k))
            xyz(i, j, k) = q
            IF lp THEN PRINT USING " ###.###"; q;
        NEXT k
15      IF lp THEN PRINT
    NEXT j
    IF lp THEN INPUT a$
    NEXT i
    '...
20  END SUB SUB BSnake (o%, tlist(), surf%, uv())
    SHARED obj%(), dep$()
    d$ = dep$(o%)
25  ko = obj%(o%, 4) + 1
    nv = obj%(o%, 5)
    IF ko > nv THEN ko = nv
    REDIM txyz(0, 0)
    CALL GetVertices(o%, nv, txyz()): IF merr THEN EXIT SUB
30  mg% = CVI(MID$(d$, 1, 2))
    CALL Magnet(mg%, surf%, u, v): IF merr THEN EXIT SUB
    DIM tk(1 TO nv + ko)
    DIM cbs(1 TO nv, 1 TO 2)
    FOR j = 1 TO nv
35      FOR k = 1 TO 2: cbs(j, k) = txyz(j, k): NEXT k
    NEXT j
    CALL Knots(ko, nv, tk())
    CALL BSplineEval(ko, nv, 1, 2, tk(), cbs(), tlist(), uv())

40  END SUB

SUB BSplineEval (ko, nv, k1, k9, tk(), cbs(), tlist(),
    xyzc())
    'Evaluate a spline with coeffs. in cbs()
45  DIM b(1 TO nv)
    i1 = LBOUND(tlist): i9 = UBOUND(tlist)
    FOR i = i1 TO i9
        t = tlist(i)
        CALL Cox(ko, nv, t, tk(), b())
50      FOR k = k1 TO k9
            q = 0
            FOR j = 1 TO nv
                q = q + cbs(j, k) * b(j)
            NEXT j
55          xyzc(i, k) = q
        NEXT k
    NEXT i
```

—— RGb.BAS Program Listing —— 50

```
        END SUB

SUB BSplineSurf (o%, ulist(), vlist(), xyz())
        ' fills a table for B-spline surface
 5      ' o% = index for BSurf
        DIM p(0 TO 3)
        SHARED obj%(), dep$(), merr, erro%
        d$ = dep$(o%)
        REDIM xyzp(0, 0, 3)
10      CALL BSurfVertices(o%, ncu, ncv, xyzp()): IF merr THEN EXIT SUB
        ku = obj%(o%, 5) + 1
        IF ku > ncu THEN ku = ncu    '****
        kv = obj%(o%, 6) + 1
15      IF kv > ncv THEN kv = ncv    '****
        DIM tku(1 TO ncu + ku), tkv(1 TO ncv + kv)
        CALL Knots(ku, ncu, tku())
        CALL Knots(kv, ncv, tkv())
        lp = 0
20      'fill tables of basis splines
        i1 = LBOUND(ulist): i9 = UBOUND(ulist)
        REDIM b(1 TO ncu)
        DIM bi(1 TO ncu, i1 TO i9)
        FOR iu = i1 TO i9
25          u = ulist(iu)
            IF lp THEN PRINT USING " ##.###   "; u;
            CALL Cox(ku, ncu, u, tku(), b())
            FOR i = 1 TO ncu
                bi(i, iu) = b(i)
30              IF lp THEN PRINT USING "##.### "; bi(i, iu);
            NEXT i
            IF lp THEN PRINT
        NEXT iu
        IF lp THEN INPUT a$
35      j1 = LBOUND(vlist): j9 = UBOUND(vlist)
        REDIM b(1 TO ncv)
        DIM bj(1 TO ncv, j1 TO j9)
        FOR jv = j1 TO j9
            v = vlist(jv)
40          IF lp THEN PRINT USING " ##.###   "; v;
            CALL Cox(kv, ncv, v, tkv(), b())
            FOR j = 1 TO ncv
                bj(j, jv) = b(j)
                IF lp THEN PRINT USING "##.### "; bj(j, jv);
45          NEXT j
            IF lp THEN PRINT
        NEXT jv
        IF lp THEN INPUT a$
        'tensor product
50      FOR iu = i1 TO i9
            FOR jv = j1 TO j9
                FOR k = 1 TO 3: p(k) = 0: NEXT k
                FOR i = 1 TO ncu
                    bi1 = bi(i, iu)
55                  FOR j = 1 TO ncv
                        bj1 = bj(j, jv)
                        a = bi1 * bj1
                        FOR k = 1 TO 3
```

RGB.BAS Program Listing --

```
                p(k) = p(k) + xyzp(i, j, k) * a
            NEXT k
         NEXT j
      NEXT i
5     FOR k = 1 TO 3: xyz(iu, jv, k) = p(k): NEXT k
   NEXT jv
   NEXT iu END SUB
10
   SUB BSurfVertices (o%, ncu, ncv, xyzp())
   DIM p(1 TO 3)
   SHARED obj%(), dep$(), merr, erro%
   lp = 0
15 d$ = dep$(o%)
   ncu = obj%(o%, 7)
   IF ncu = 0 THEN merr = 25: erro% = o%: EXIT SUB
   ncv = obj%(o%, 8)
   IF ncu = 0 THEN merr = 25: erro% = o%: EXIT SUB
20 REDIM xyzp(1 TO ncu, 1 TO ncv, 0 TO 3)
   'get control points from d$
   f$ = "i=##   j=##   ###.### ###.### ###.### "
   jd = -1
   FOR j = 1 TO ncv
25    FOR i = 1 TO ncu
         jd = jd + 2
         e% = CVI(MID$(d$, jd, 2))
         CALL PointX(e%, p())
         FOR k = 1 TO 3: xyzp(i, j, k) = p(k): NEXT k
30       IF lp THEN PRINT USING f$; i; j; p(1); p(2); p(3)
      NEXT i
   NEXT j
   IF lp THEN INPUT a$

35 END SUB

SUB Cox (ko, nv, tl, tk(), b())
   i1 = 0
   FOR i = ko + 1 TO nv
40    IF tk(i) > tl THEN i1 = i - 1: EXIT FOR
   NEXT i
   IF i1 = 0 THEN i1 = nv
   FOR i = 1 TO nv: b(i) = 0: NEXT i: b(i1) = 1
   FOR j = 2 TO ko
45    FOR i = i1 - j + 1 TO i1
         b1 = 0
         d = tk(i + j - 1) - tk(i)
         IF d <> 0 THEN b1 = (tl - tk(i)) * b(i) / d
         b2 = 0
50       d = tk(i + j) - tk(i + 1)
         IF d <> 0 THEN b2 = (tk(i + j) - tl) * b(i + 1) / d
         b(i) = b1 + b2
      NEXT i
   NEXT j
55 END SUB

SUB CSnake (o%, tlist(), surf%, uv())
   SHARED obj%(), dep$()
```

RGb.BAS Program Listing --

```
       d$ = dep$(o%)
       ko = obj%(o%, 4) + 1
       nv = obj%(o%, 5)
       IF ko > nv THEN ko = nv
 5     REDIM txyz(0, 0)
       CALL GetVertices(o%, nv, txyz()): IF merr THEN EXIT SUB
       mg% = CVI(MID$(d$, 1, 2))
       CALL Magnet(mg%, surf%, u, v): IF merr THEN EXIT SUB
       DIM tk(1 TO nv + ko)
10     DIM cbs(1 TO nv, 1 TO 2)
       FOR j = 1 TO nv
           FOR k = 1 TO 2: cbs(j, k) = txyz(j, k): NEXT k
       NEXT j
       CALL CSplineSetup(ko, nv, 1, 2, tk(), cbs())
15     IF merr THEN erro% = o%: EXIT SUB
       CALL BSplineEval(ko, nv, 1, 2, tk(), cbs(), tlist(), uv())

END SUB

20     SUB CSplineSetup (ko, nv, k1, k9, tk(), cbs())
       DIM arc(1 TO nv)
       SHARED merr
       eps = .00001
       IF ko > nv THEN ko = nv
25     'lp = -1 arc(1) = 0
       FOR j = 2 TO nv
           t = 0
30         FOR k = k1 TO k9
               t = t + (cbs(j, k) - cbs(j - 1, k)) ^ 2
           NEXT k
           t = SQR(t)
           IF t < eps THEN merr = 10: EXIT SUB
35         arc(j) = arc(j - 1) + t
       NEXT j
       DIM b(1 TO nv)

CALL Knots(ko, nv, tk())
40     FOR i = ko + 1 TO nv
           SELECT CASE ko
               CASE 2
                   tk(i) = arc(i - ko + 1)
               CASE 3
45                 tk(i) = .5 * (arc(i - ko + 1) + arc(i - ko + 2))
               CASE 4
                   tk(i) = arc(i - ko + 2)
           END SELECT
           IF arc(nv) > 0 THEN tk(i) = tk(i) / arc(nv)
50     NEXT i
       IF lp THEN
           PRINT "knots:"
           FOR i = 1 TO ko + nv: PRINT USING " #.####"; tk(i); :
       NEXT i
55         PRINT
       END IF nu = nv - 2
```

-- RG5.BAS Program Listing --

```
        IF nu > 0 THEN
            DIM h(1 TO nu, 1 TO nu + 1 + k9 - k1)
            IF lp THEN PRINT "matrix: "
            FOR i = 1 TO nu
 5              t = arc(i + 1): IF arc(nv) > 0 THEN t = t / arc(nv)
                CALL Cox(ko, nv, t, tk(), b())
                IF lp THEN
                    PRINT "B-splines: ";
                    FOR j = 1 TO nv
10                      PRINT USING " ###.###"; b(j);
                    NEXT j: PRINT
                END IF
                FOR j = 1 TO nu
                    h(i, j) = b(j + 1)
15                  IF lp THEN PRINT USING " ###.###"; h(i, j)
                NEXT j
                FOR k = k1 TO k9
                    rhs = cbs(i + 1, k)
                    rhs = rhs - b(1) * cbs(1, k) - b(nv) * cbs(nv, k)
20                  IF lp THEN PRINT USING " ###.###"; rhs;
                    h(i, nu + k - k1 + 1) = rhs
                NEXT k
                IF lp THEN PRINT
            NEXT i
25          CALL Gauss1(nu, k9 - k1 + 1, h(), lsing)
            IF lsing THEN merr = 11: EXIT SUB
        END IF
        DIM c(1 TO nv, 0 TO level)
        FOR k = k1 TO k9
30          FOR i = 1 TO nu: cbs(i + 1, k) = h(i, nu + k - k1 + 1):
        NEXT i
        NEXT k END SUB
35
        SUB Curve (o%, tt(), xyzc())
        ' tabulate points along any curve
        ' o% is a curve object no.
        ' tt() = parameter values
40      DIM p(1 TO 3), p0(1 TO 3), p1(1 TO 3)
        DIM xyz(0 TO 2, 0 TO 2, 1 TO 3)
        SHARED obj%(), dep$(), lusetbl, merr, erro%
        eps = .001

45      i1 = LBOUND(tt): i9 = UBOUND(tt)
        DIM tlist(i1 TO i9), dd(i1 TO i9)
        FOR i = i1 TO i9: tlist(i) = tt(i): dd(i) = 1: NEXT i cas% = obj%(o%, 0)
50      k9 = 3
        SELECT CASE cas%
            CASE -1, 1 TO 31 ' points
                CALL PointX(o%, p()): IF merr THEN EXIT SUB
                FOR i = i1 TO i9
55                  FOR k = 1 TO 3
                        xyzc(i, k) = p(k)
                    NEXT k
                NEXT i
```

-- R$\phi$S.BAS Program Listing --

```
        CASE 32: CALL LineCurve(o%, tlist(), xyzc())
        CASE 33: CALL ArcCurve(o%, tlist(), xyzc())
        CASE 36, 37: CALL SplineCurve(o%, tlist(), xyzc())
        CASE 40: CALL RelCurve(o%, tlist(), xyzc())
 5      CASE 41: CALL SubCurve(o%, tlist(), xyzc())

CASE 64 TO 95   'snakes
           k9 = 2
           DIM uv(i1 TO i9, 1 TO k9) ' u, v
10         DIM ulist(1 TO 1), vlist(1 TO 1)
           CALL Snake(o%, tlist(), surf%, uv()): IF merr THEN EXIT SUB
           ' now locate these points on the surface
           delt = .001
15         FOR i = i1 TO i9
              u = uv(i, 1)
              v = uv(i, 2)
              ulist(1) = u: vlist(1) = v
              CALL Surface(surf%, ulist(), vlist(), xyz())
20            IF merr THEN EXIT SUB
              FOR k = 1 TO 3: xyzc(i, k) = xyz(1, 1, k): NEXT k
           NEXT i
           '...
        CASE ELSE: merr = 1: erro% = o%: EXIT SUB
25      END SELECT

END SUB

FUNCTION CVis% (o%, c%, ivis)
30   SHARED obj%()
     ' returns visibility of object o$ (T/F); color in c%.
     c% = 0: ivis = 0: CVis = 0
     cas% = obj%(o%, 0)
     IF cas% > 0 THEN
35      c% = obj%(o%, 1)
        ivis = obj%(o%, 2)
        CVis% = ivis > 0
     END IF
     END FUNCTION
40
     FUNCTION EntClass% (entyp%)
     SELECT CASE entyp%
        CASE 1 TO 31: a% = 1
        CASE 32 TO 63: a% = 2
45      CASE 64 TO 95: a% = 2
        CASE 96 TO 127: a% = 3
        CASE ELSE: a% = 0
     END SELECT
     EntClass% = a%
50   END FUNCTION SUB EntData (nent, ecas%())
     SHARED entnam() AS STRING * 10
     RESTORE EntityData:
55   i = 0
     DO
        READ a$, b$
        IF VAL(a$) = -1 THEN EXIT DO
```

-- RG$.BAS Program Listing --

```
        i = i + 1: ecas%(i) = VAL(a$): entnam(i) = b$
    LOOP
    nent = i

5   END SUB

FUNCTION EntSubClass$ (e%)
    ' in- entity no.  out- single char.
    SELECT CASE e%
10      CASE 1, 2: w$ = "p" 'point
        CASE 3, 4: w$ = "e" 'bead
        CASE 5, 6: w$ = "m" 'magnet
        CASE 7, 8: w$ = "r" 'ring
        CASE 32 TO 63: w$ = "c" 'curve
15      CASE 64 TO 95: w$ = "n" 'snake
        CASE 96 TO 127: w$ = "s"
        CASE ELSE: w$ = "0"
    END SELECT
    EntSubClass$ = w$
20  END FUNCTION FUNCTION ErrMsg$
    SHARED er$, merr, erro%
    a$ = ""
25  IF er$ <> "" THEN
        a$ = er$
    ELSEIF merr > 0 THEN
        a$ = "Math error" + STR$(200 + merr)
        IF erro% > 0 THEN
30          CALL ObjEntName(erro%, cas$, oname$)
            a$ = a$ + " in " + cas$ + " " + oname$
        END IF
    END IF
    ErrMsg$ = a$
35  END FUNCTION SUB FillParamList (lborder, t1, t2, tlist())
    ' in- logical lborder; if nonzero, include border points
    '     t1, t2 - lower and upper parameter values
40  '     tlist() - used for bounds
    ' out- tlist() - filled with uniformly-spaced values
    i1 = LBOUND(tlist): i9 = UBOUND(tlist)
    IF lborder THEN nt = i9 - i1 - 2 ELSE nt = i9 - i1
    dt = (t2 - t1): IF nt <> 0 THEN dt = dt / nt
45  IF lborder THEN t0 = t1 - dt ELSE t0 = t1
    FOR i = i1 TO i9: tlist(i) = t0 + (i - i1) * dt: NEXT i
    END SUB SUB Gauss1 (n2, n3, h(), lsing)
50  ' n2 = no. of eqns.; n3 = no. of rhs's
    lsing = 0
    FOR k2 = 1 TO n2
        l2 = 0
        b2 = 0
55      FOR i2 = k2 TO n2
            IF ABS(h(i2, k2)) > ABS(b2) THEN l2 = i2: b2 = h(i2, k2)
        NEXT i2
```

-- RGb.pAS Program Listing --

```
         IF l2 = 0 THEN lsing = -1: EXIT SUB
         IF l2 <> k2 THEN
            FOR j2 = k2 TO n2 + n3: SWAP h(l2, j2), h(k2, j2):
   NEXT j2
5        END IF
         FOR j2 = k2 TO n2 + n3
            h(k2, j2) = h(k2, j2) / b2
         NEXT j2
         IF k2 <> n2 THEN
10          FOR i2 = k2 + 1 TO n2
               b2 = h(i2, k2)
               FOR j2 = k2 + 1 TO n2 + n3
                  h(i2, j2) = h(i2, j2) - b2 * h(k2, j2)
               NEXT j2
15          NEXT i2
         END IF
      NEXT k2
      FOR k2 = n2 - 1 TO 1 STEP -1
         FOR i2 = 1 TO n3
20          b2 = h(k2, n2 + i2)
            FOR j2 = k2 + 1 TO n2
               b2 = b2 - h(k2, j2) * h(j2, n2 + i2)
            NEXT j2
            h(k2, n2 + i2) = b2
25       NEXT i2
      NEXT k2
      END SUB SUB GetToken (f%, lline, t$, ncr)
30    ' Read from file #f% to next white space.
      ' If lline, read to next CR.
      ctrlz$ = CHR$(26)
      t$ = ""
      DO
35       IF EOF(f%) THEN EXIT DO
         a$ = INPUT$(1, f%)
         IF (a$ = "") OR (a$ = ctrlz$) THEN EXIT DO
         a% = ASC(a$)
         SELECT CASE a%
40          CASE 32, 9    'space, tab
               IF lline THEN
                  t$ = t$ + a$
               ELSE
                  IF t$ <> "" THEN EXIT DO
45             END IF
            CASE 13       'cr
               ncr = ncr + 1
               b$ = INPUT$(1, f%)' get the LF
               IF lline THEN EXIT DO
50          CASE 59, 123, 125  ' ; { }
               IF lline THEN
                  t$ = t$ + a$
               ELSE
                  IF t$ <> "" THEN SEEK f%, SEEK(f%) - 1 ELSE t$
55   = a$
               EXIT DO
               END IF
            CASE ELSE
```

-- RGb.BAS Program Listing --

```
            t$ = t$ + a$
        END SELECT
    LOOP
    t$ = LTRIM$(RTRIM$(t$))
5   '...
    END SUB

SUB GetVertices (o%, nv, txyz())
    ' get table of vertices for the curve or snake o%
10  ' in-  o%
    ' out- nv; txyz(i,k) is vertex i, the k component
    DIM xyz(1 TO 3)
    SHARED obj%(), dep$(), merr, erro%
    d$ = dep$(o%)
15  cas% = obj%(o%, 0)
    nj = 4 k9 = 3: IF cas% > 63 THEN k9 = 2
    jv = 1' location of first vertex in d$
20  SELECT CASE cas%
        CASE 32, 64: nv = 2
        CASE 33, 66: nv = 3
        CASE 36, 37, 67, 68: nv = obj%(o%, 5)
        CASE ELSE: merr = 1: erro% = o%: EXIT SUB
25  END SELECT
    REDIM txyz(1 TO nv, 1 TO k9)
    FOR j = 1 TO nv
        j1 = jv + 2 * (j - 1)
        e% = CVI(MID$(d$, j1, 2))
30      SELECT CASE k9
            CASE 2 'snakes
                CALL Magnet(e%, s%, u, v): IF merr THEN EXIT SUB
                IF j = 1 THEN
                    s1% = s%
35              ELSE
                    IF s% <> s1% THEN merr = 50: erro% = o%: EXIT SUB
                END IF
                txyz(j, 1) = u
40              txyz(j, 2) = v
            CASE 3 'curves
                CALL PointX(e%, xyz()): IF merr THEN EXIT SUB
                FOR k = 1 TO 3: txyz(j, k) = xyz(k): NEXT k
        END SELECT
45  NEXT j

END SUB

SUB KillFile (fil$, er%)
50  SHARED ferr%
    ON ERROR GOTO FilErr:
    KILL fil$
    ON ERROR GOTO 0
    er% = ferr%
55  END SUB SUB Knots (k, nv, tk())
```

-- RGL.BAS Program Listing --

```
    FOR i = 1 TO k: tk(i) = 0: NEXT i
    FOR i = k + 1 TO nv: tk(i) = (i - k) / (nv - k + 1): NEXT i
    FOR i = nv + 1 TO nv + k: tk(i) = 1: NEXT i
    END SUB
5
    SUB LineCurve (o%, tlist(), xyzc())
    SHARED merr
    nv = 2
    REDIM txyz(0, 0)
10  CALL GetVertices(o%, nv, txyz()): IF merr THEN EXIT SUB
    i1 = LBOUND(tlist): i9 = UBOUND(tlist)
    FOR i = i1 TO i9
        t = tlist(i)
        FOR k = 1 TO 3
15          xyzc(i, k) = (1 - t) * txyz(1, k) + t * txyz(2, k)
        NEXT k
    NEXT i
    END SUB 20  SUB LineMsg (a$)
    PRINT a$
    END SUB SUB LineSnake (o%, tlist(), surf%, uv())
    SHARED dep$()
25  d$ = dep$(o%)
    REDIM txyz(0, 0)
    CALL GetVertices(o%, nv, txyz()): IF merr THEN EXIT SUB
    mg% = CVI(MID$(d$, 1, 2))
30  CALL Magnet(mg%, surf%, u, v): IF merr THEN EXIT SUB
    i1 = LBOUND(tlist): i9 = UBOUND(tlist)
    FOR i = i1 TO i9
        t = tlist(i)
        FOR k = 1 TO 2
35          uv(i, k) = (1 - t) * txyz(1, k) + t * txyz(2, k)
        NEXT k
    NEXT i END SUB
40
    SUB LoftSurf (o%, ulist(), vlist(), xyz())
    ' fills a table for a lofted surface
    ' o% - object no. for lofted surface
    ' nu, nv = no. of segments. u= const are the splines.
45  ' xyz(i,j,k): j= long. spline no., i = index along spline,
    k = x,y,z
    SHARED nobj, obj%(), dep$(), merr, erro%
    d$ = dep$(o%)
    cas% = obj%(o%, 0)
50  jd = 1 ' location of first MC in d$
    SELECT CASE cas%
        CASE 98: ko = 2: nc = 2
        CASE 102
            ko = obj%(o%, 5) + 1: nc = obj%(o%, 6)
55          IF ko > nc THEN ko = nc
        CASE ELSE: merr = 1: erro% = o%: EXIT SUB
    END SELECT
```

RG?.BAS Program Listing --

```
    DIM xyzv(1 TO nc, 1 TO 3) ' tabulation of vertices for one
    spline
    ' get master curves out of o$
    i1 = LBOUND(ulist): i9 = UBOUND(ulist)
 5  DIM xyzc(i1 TO i9, 1 TO 3)' points along one MC
    DIM xyzp(0 TO nc, i1 TO i9, 1 TO 3)' tabulation of pts.
    along MCs
    FOR l = 1 TO nc
        e% = CVI(MID$(d$, jd + 2 * (l - 1), 2))
10      CALL Curve(e%, ulist(), xyzc()): IF merr THEN EXIT SUB
        FOR i = i1 TO i9
            FOR k = 1 TO 3: xyzp(l, i, k) = xyzc(i, k): NEXT k
        NEXT i
    NEXT l
15
    j1 = LBOUND(vlist): j9 = UBOUND(vlist)
    REDIM xyzc(j1 TO j9, 1 TO 3)' points along one spline SELECT CASE cas%
20  CASE 98  'ruled
        FOR i = i1 TO i9
            FOR j = j1 TO j9
                v = vlist(j)
                FOR k = 1 TO 3
25                  xyz(i, j, k) = (1 - v) * xyzp(1, i, k) + v *
    xyzp(2, i, k)
                NEXT k
            NEXT j
        NEXT i
30      '...

CASE 102  'c-loft
        DIM tk(1 TO nc + ko), cbs(1 TO nc, 1 TO 3)
        FOR i = i1 TO i9' cycle through splines
35          FOR l = 1 TO nc
                FOR k = 1 TO 3: cbs(l, k) = xyzp(l, i, k): NEXT k
            NEXT l
            CALL CSplineSetup(ko, nc, 1, 3, tk(), cbs())
            IF merr THEN erro% = o%: EXIT SUB
40          CALL BSplineEval(ko, nc, 1, 3, tk(), cbs(), vlist(),
    xyzc())
            FOR j = j1 TO j9
                FOR k = 1 TO 3: xyz(i, j, k) = xyzc(j, k): NEXT k
            NEXT j
45      NEXT i
        '...
    END SELECT END SUB
50
    SUB Magnet (o%, sf%, u, v)
    ' returns the location of the magnet/ring o%
    SHARED obj%(), objf(), dep$(), merr, erro%
    d$ = dep$(o%)
55  SELECT CASE obj%(o%, 0)
        CASE 5
            sf% = CVI(MID$(d$, 1, 2))' identity of surface
            u = objf(o%, 1)
```

-- R??.?AS Program Listing --

```
              v = objf(o%, 2)
         CASE 6
            mg% = CVI(MID$(d$, 1, 2))
            entyp% = obj%(mg%, 0)
 5          SELECT CASE entyp%
               CASE 5, 6, 7, 8
               CASE ELSE: merr = 1: erro% = o%: EXIT SUB
            END SELECT
            CALL Magnet(mg%, sf%, u, v): IF merr THEN EXIT SUB
10          u = u + objf(o%, 1)
            v = v + objf(o%, 2)
         CASE 7, 8 'ring
            CALL Ring(o%, sn%, t): IF merr THEN EXIT SUB
            DIM uv(1 TO 1, 1 TO 2)
15          DIM tlist(1 TO 1)
            tlist(1) = t
            CALL Snake(sn%, tlist(), sf%, uv()): IF merr THEN
   EXIT SUB
            u = uv(1, 1)
20          v = uv(1, 2)
      END SELECT
      END SUB SUB Make3D (utd%(), endd%, lac, iwf())
25    ' create wireframe file (ifff) for all objects from 1 to
      endd%
      SHARED merr, nobj
      binw$ = "%f3d.bin"
      bin0$ = "%ft.bin"
30    LineMsg "building wireframe.."
      IF merr THEN
         rec% = iwf(endd%, 0) + iwf(endd%, 1)
         IF rec% > 0 THEN iwf(0, 0) = rec%
         iwf(0, 1) = endd%
35    END IF
      f3d% = FREEFILE
      fil$ = binw$
      lall = -1
      FOR o% = 1 TO endd%
40       IF NOT utd%(o%) THEN lall = 0
      NEXT o%
      IF lall THEN
         CALL KillFile(fil$, er%)
         FOR o% = 0 TO nobj: iwf(o%, 0) = 0: iwf(o%, 1) = 0: NEXT
45    o%
      END IF
      OPEN "r", f3d%, fil$, 14 ft$ = bin0$
50    KillFile ft$, er%
      ft% = FREEFILE
      OPEN "b", ft%, ft$ f$ = "### \                   \"
55    FOR o% = 1 TO endd%
         IF NOT utd%(o%) THEN
            CALL ObjEntName(o%, cas$, oname$)
            PRINT USING f$; o%; oname$;
```

-- RGb.BAS Program Listing --

```
            CALL MakeObj3D(f3d%, ft%, iwf(), o%, lac)
            IF merr = 0 THEN utd%(o%) = -1
            PRINT USING "   #####  #####"; iwf(o%, 0); iwf(o%, 1)
         END IF
5     NEXT o%
      'INPUT a$
      CLOSE #ft%
      CLOSE #f3d%
      '...
10    END SUB SUB MakeObj3D (f3d%, ft%, iwf(), o%, lac)
      ' write wireframe file segment for object o%.
      ' then update file and iwf().
15    ' ft% is a scratch file, opened for "b".
      SHARED nobj, obj%(), merr
      DIM p(1 TO 3)
      FIELD #f3d%, 14 AS q$
      cas% = obj%(o%, 0)
20    t$ = ""
      ivy = CVis%(o%, c%, ivis)
      IF ivis = 0 THEN ivis = 1

SEEK #ft%, 1
25    SELECT CASE cas%
         CASE 1 TO 31 'point class
            CALL PointX(o%, p())
            i = -c%: PUT #ft%, , i
            FOR k = 1 TO 3
30             q = p(k): PUT #ft%, , q
            NEXT k
            np = 1

CASE 32 TO 95 'curves, snakes
35          nt = obj%(o%, 3)
            CALL StrCurv(o%, nt, c%, ivis, ft%, np)

CASE 96 TO 127 'surface
            lnet = (cas% >= 114) AND (cas% <= 115)
40          CALL StrSurf(o%, c%, ivis, lnet, ft%, np)

CASE ELSE
            np = 0
      END SELECT
45
      rec% = iwf(o%, 0): npprev = iwf(o%, 1)
      len3d = iwf(0, 0): top% = iwf(0, 1)
      nshift = np - npprev
      IF (o% > top%) THEN
50       rec% = len3d + 1: len3d = len3d + np
         top% = o%
      END IF
      iwf(o%, 0) = rec%: iwf(o%, 1) = np
      iwf(0, 0) = len3d: iwf(0, 1) = top%
55    SEEK #ft%, 1
      a$ = SPACE$(14)
      FOR j = 1 TO np
         GET #ft%, , a$
```

RGS.BAS Program Listing --

```
        LSET q$ = a$
        PUT #f3d%, rec% + j - 1
    NEXT j

5   END SUB

SUB ObjEntName (o%, cas$, oname$)
    ' given object no., returns the entity name and object name
    SHARED nent, ecas%(), entnam() AS STRING * 10, obj$()
10  SHARED obj%(), objnam() AS STRING * 16
    IF o% = -1 THEN
        cas$ = "AbsPoint": oname$ = "*"
    ELSE
        cas% = obj%(o%, 0)
15      FOR i = 1 TO nent
            IF ecas%(i) = cas% THEN cas$ = RTRIM$(entnam(i)):
    EXIT FOR
        NEXT i
        oname$ = RTRIM$(objnam(o%))
20  END IF
    END SUB FUNCTION ObjNo% (a$, cas%)
    ' Find the object number corresponding to the name a$;
25  Returns 0 if not found.
    ' cas% is the entity type
    SHARED nobj, obj%(), objnam() AS STRING * 16
    b$ = STR16$(a$)
    ObjNo% = 0
30  cas% = 0
    FOR i = 1 TO nobj
        IF (obj%(i, 0) > 0) AND (b$ = objnam(i)) THEN
            ObjNo% = i
            cas% = obj%(i, 0)
35          EXIT FOR
        END IF
    NEXT i
    END FUNCTION 40  SUB OpenFile (ftyp$, f%, fil$, reclen%, er%)
    SHARED ferr%
    ferr% = 0
    ON ERROR GOTO FilErr:
    OPEN ftyp$, f%, fil$, reclen%
45  ON ERROR GOTO 0
    er% = ferr%
    END SUB SUB PointX (o%, xyz())
50  ' Returns the x,y,z coords. of a point class entity
    SHARED obj%(), objf(), dep$(), merr
    DIM xyzc(0 TO 2, 1 TO 3)
    DIM xyzs(0 TO 1, 0 TO 1, 1 TO 3)
    DIM uv(0 TO 1, 1 TO 2)
55  DIM tlist(0 TO 0), ulist(0 TO 0), vlist(0 TO 0)
    d$ = dep$(o%)
    cas% = obj%(o%, 0)
    SELECT CASE cas%
```

-- RO$.BAS Program Listing --

```
          CASE 1 ' AbsPoint
             js = 5
             FOR k = 1 TO 3: xyz(k) = objf(o%, k): NEXT k
          CASE 2   'RelPoint
 5           js = 5
             pt% = CVI(MID$(d$, 1, 2))
             CALL PointX(pt%, xyz()): IF merr THEN EXIT SUB
             FOR k = 1 TO 3
                xyz(k) = xyz(k) + objf(o%, k)
10           NEXT k CASE 3, 4
             CALL Bead(o%, cv%, t): IF merr THEN EXIT SUB
             tlist(0) = t
15           CALL Curve(cv%, tlist(), xyzc()): IF merr THEN EXIT
    SUB
             FOR k = 1 TO 3: xyz(k) = xyzc(0, k): NEXT k CASE 5, 6
20           CALL Magnet(o%, sf%, u, v): IF merr THEN EXIT SUB
             ulist(0) = u
             vlist(0) = v
             CALL Surface(sf%, ulist(), vlist(), xyzs()): IF merr
    THEN EXIT SUB
25           FOR k = 1 TO 3: xyz(k) = xyzs(0, 0, k): NEXT k CASE 7, 8
             CALL Ring(o%, sn%, t): IF merr THEN EXIT SUB
             tlist(0) = t
30           CALL Snake(sn%, tlist(), sf%, uv()): IF merr THEN
    EXIT SUB
             ulist(0) = uv(0, 1)
             vlist(0) =
             CALL Surface(sf%, ulist(), vlist(), xyzs()): IF merr
35  THEN EXIT SUB
             FOR k = 1 TO 3: xyz(k) = xyzs(0, 0, k): NEXT k

CASE ELSE
       END SELECT
40
       END SUB

SUB ReadRep (fspec$, er$, ncr)
       SHARED nent, ecas%(), entnam() AS STRING * 10, readerr%
45     SHARED MaxObj, nobj, obj%(), objf(), obj$(), dep$(),
       objnam() AS STRING * 16
       DIM oi%(0 TO 8), of(1 TO 3)
       f$ = "## \              \ ### ## ##   dep$:"
       ncr = 0
50     f% = FREEFILE
       CALL OpenFile("i", f%, fspec$, 512, readerr%)
       IF readerr% THEN
          BEEP
          er$ = "101. Error opening file " + fspec$
55        GOTO RRExit:
       END IF
       CLOSE #f%
       OPEN "b", f%, fspec$
```

-- RG$.BAS Program Listing --

```
       nobj = 0
       lquit = 0
       er% = 0
 5     DO ' loop over objects
          'IF nobj = 2 THEN STOP
          CALL GetToken(f%, 0, cas$, ncr): 'PRINT cas$; " ";
          cas$ = UCASE$(cas$)
          IF cas$ = "END" THEN EXIT DO
10        i1 = 0
          FOR i = 1 TO nent
             en$ = RTRIM$(entnam(i))
             IF cas$ = UCASE$(en$) THEN
                i1 = i
15              cas% = ecas%(i)
                EXIT FOR
             END IF
          NEXT i
          IF i1 = 0 THEN er$ = "102. Unknown entity " + cas$: GOTO
20     RRExit:
          oi%(0) = cas%
          IF cas% = 0 THEN
             CALL GetToken(f%, -1, t$, ncr): 'PRINT t$
          ELSE
25           t$ = ""
             CALL GetToken(f%, 0, oname$, ncr): 'PRINT oname$
             IF ObjNo%(oname$, entyp%) > 0 THEN
                er$ = "103. Object name " + oname$ + " was
       previously used"
30              GOTO RRExit:
             END IF
             CALL GetToken(f%, 0, a$, ncr): oi%(1) = VAL(a$)
       'color
             CALL GetToken(f%, 0, a$, ncr): oi%(2) = VAL(a$) 'vis
35           esc$ = EntSubClass(cas%)
             SELECT CASE esc$
                CASE "c", "n": kk = 1
                CASE "s": kk = 2
                CASE ELSE: kk = 0
40           END SELECT
             ni = 2
             FOR k = 1 TO kk
                CALL GetToken(f%, 0, a$, ncr)
                ni = ni + 1: oi%(ni) = VAL(a$)
45           NEXT k
             nf = 0
             d$ = ""
             SELECT CASE cas%
                CASE 1
50                 FOR k = 1 TO 3
                      CALL GetToken(f%, 0, a$, ncr)
                      nf = nf + 1: of(k) = VAL(a$)
                   NEXT k 55                 CASE 2
                   CALL GetToken(f%, 0, a$, ncr)
                   CALL StoreSup("p", a$, d$, er%)
                   FOR k = 1 TO 3
```

R65.BAS Program Listing --

```
            CALL GetToken(f%, 0, a$, ncr)
            nf = nf + 1: of(k) = VAL(a$)
         NEXT k CASE 3
         CALL GetToken(f%, 0, a$, ncr)
         CALL StoreSup("c", a$, d$, er%)
         CALL GetToken(f%, 0, a$, ncr)
         nf = nf + 1: of(k) = VAL(a$)

CASE 4
         CALL GetToken(f%, 0, a$, ncr)
         CALL StoreSup("e", a$, d$, er%)
         CALL GetToken(f%, 0, a$, ncr)
         nf = nf + 1: of(k) = VAL(a$)

CASE 5
         CALL GetToken(f%, 0, a$, ncr)
         CALL StoreSup("s", a$, d$, er%)
         FOR k = 1 TO 2
            CALL GetToken(f%, 0, a$, ncr)
            nf = nf + 1: of(k) = VAL(a$)
         NEXT k CASE 6
         CALL GetToken(f%, 0, a$, ncr)
         CALL StoreSup("m", a$, d$, er%)
         FOR k = 1 TO 2
            CALL GetToken(f%, 0, a$, ncr)
            nf = nf + 1: of(k) = VAL(a$)
         NEXT k CASE 7
         CALL GetToken(f%, 0, a$, ncr)
         CALL StoreSup("n", a$, d$, er%)
         CALL GetToken(f%, 0, a$, ncr)
         nf = nf + 1: of(k) = VAL(a$)

CASE 8
         CALL GetToken(f%, 0, a$, ncr)
         CALL StoreSup("r", a$, d$, er%)
         CALL GetToken(f%, 0, a$, ncr)
         nf = nf + 1: of(k) = VAL(a$)

CASE 32
         FOR k = 1 TO 2
            CALL GetToken(f%, 0, a$, ncr)
            CALL StoreSup("p", a$, d$, er%)
         NEXT k CASE 33
         FOR k = 1 TO 3
            CALL GetToken(f%, 0, a$, ncr)
            CALL StoreSup("p", a$, d$, er%)
         NEXT k CASE 36, 37
         CALL GetToken(f%, 0, a$, ncr)
```

RGN.BAS Program Listing --

```
            ni = ni + 1: oi%(ni) = VAL(a$)
            CALL GetToken(f%, 0, a$, ncr)  '{
            ns = 0
            DO
                CALL GetToken(f%, 0, a$, ncr)
                IF a$ = "}" THEN EXIT DO
                ns = ns + 1: CALL StoreSup("p", a$, d$, er%)
            LOOP
            ni = ni + 1: oi%(ni) = ns CASE 40
            CALL GetToken(f%, 0, a$, ncr)
            CALL StoreSup("c", a$, d$, er%)
            FOR k = 1 TO 2
                CALL GetToken(f%, 0, a$, ncr)
                CALL StoreSup("p", a$, d$, er%)
            NEXT k CASE 41
            FOR k = 1 TO 2
                CALL GetToken(f%, 0, a$, ncr)
                CALL StoreSup("e", a$, d$, er%)
            NEXT k CASE 64
            FOR k = 1 TO 2
                CALL GetToken(f%, 0, a$, ncr)
                CALL StoreSup("m", a$, d$, er%)
            NEXT k CASE 66
            FOR k = 1 TO 3
                CALL GetToken(f%, 0, a$, ncr)
                CALL StoreSup("m", a$, d$, er%)
            NEXT k CASE 67, 68
            CALL GetToken(f%, 0, a$, ncr)
            ni = ni + 1: oi%(ni) = VAL(a$)
            CALL GetToken(f%, 0, a$, ncr)  '{
            ns = 0
            DO
                CALL GetToken(f%, 0, a$, ncr)
                IF a$ = "}" THEN EXIT DO
                ns = ns + 1: CALL StoreSup("m", a$, d$, er%)
            LOOP
            ni = ni + 1: oi%(ni) = ns CASE 71
            CALL GetToken(f%, 0, a$, ncr)
            CALL StoreSup("n", a$, d$, er%)
            FOR k = 1 TO 2
                CALL GetToken(f%, 0, a$, ncr)
                CALL StoreSup("m", a$, d$, er%)
            NEXT k CASE 73
            FOR k = 1 TO 2
```

RQ$.BAS Program Listing --

```
            CALL GetToken(f%, 0, a$, ncr)
            CALL StoreSup("r", a$, d$, er%)
         NEXT k CASE 96
         CALL GetToken(f%, 0, a$, ncr)
         CALL StoreSup("c", a$, d$, er%)
         FOR k = 1 TO 2
            CALL GetToken(f%, 0, a$, ncr)
            CALL StoreSup("p", a$, d$, er%)
         NEXT k
         FOR k = 1 TO 2
            CALL GetToken(f%, 0, a$, ncr)
            nf = nf + 1: of(k) = VAL(a$)
         NEXT k CASE 97, 98
         FOR k = 1 TO 2
            CALL GetToken(f%, 0, a$, ncr)
            CALL StoreSup("c", a$, d$, er%)
         NEXT k CASE 102
         CALL GetToken(f%, 0, a$, ncr)
         ni = ni + 1: oi%(ni) = VAL(a$)
         CALL GetToken(f%, 0, a$, ncr)  '{
         ns = 0
         DO
            CALL GetToken(f%, 0, a$, ncr)
            IF a$ = "}" THEN EXIT DO
            ns = ns + 1: CALL StoreSup("c", a$, d$, er%)
         LOOP
         ni = ni + 1: oi%(ni) = ns CASE 110
         FOR k = 1 TO 4
            CALL GetToken(f%, 0, a$, ncr)
            CALL StoreSup("c", a$, d$, er%)
         NEXT k CASE 114
         FOR k = 1 TO 4
            CALL GetToken(f%, 0, a$, ncr)
            ni = ni + 1: oi%(ni) = VAL(a$)
         NEXT k
         CALL GetToken(f%, 0, a$, ncr)  '{
         ns = 0
         DO
            CALL GetToken(f%, 0, a$, ncr)
            IF a$ = "}" THEN EXIT DO
            ns = ns + 1: CALL StoreSup("p", a$, d$, er%)
         LOOP
      '   ni = ni + 1: oi%(ni) = ns ' don't need CASE 120
         CALL GetToken(f%, 0, a$, ncr)
         CALL StoreSup("s", a$, d$, er%)
         FOR k = 1 TO 4
```

-- R@S.BAS Program Listing --

```
              CALL GetToken(f%, 0, a$, ncr)
              CALL StoreSup("p", a$, d$, er%)
          NEXT k 5         CASE 122
              FOR k = 1 TO 4
                  CALL GetToken(f%, 0, a$, ncr)
                  CALL StoreSup("n", a$, d$, er%)
              NEXT k
10
          CASE ELSE END SELECT
       CALL GetToken(f%, 0, a$, ncr) ';
15     END IF
    IF nobj = MaxObj THEN er$ = "112. Too many objects":
GOTO RRExit:
    nobj = nobj + 1 ': LOCATE 3, 2: PRINT "L"; nobj
    obj$(nobj) = t$
20     IF cas% > 0 THEN
          objnam(nobj) = oname$
          dep$(nobj) = d$
          FOR k = 0 TO ni: obj%(nobj, k) = oi%(k): NEXT k
          FOR k = 1 TO nf: objf(nobj, k) = of(k): NEXT k
25        PRINT USING f$; nobj; oname$; oi%(0); oi%(1); oi%(2);
          IF LEN(d$) > 0 THEN
              FOR k = 1 TO LEN(d$) \ 2
                  PRINT USING " ##"; CVI(MID$(d$, 1 + 2 * (k -
1), 2));
30            NEXT k
          END IF
          PRINT
       END IF
LOOP
35  er$ = ""

RRExit:
CLOSE #f%
IF er$ <> "" THEN er$ = "Error reading model file: " + er$
40
END SUB SUB RelCurve (o%, tlist(), xyzc())
' relative curve  26.bbcpp
45  DIM p1(1 TO 3), p2(1 TO 3)
    DIM tl(1 TO 1), xyze(1 TO 1, 1 TO 3)
    SHARED dep$(), merr
    d$ = dep$(o%)
    jd = 1
50  cv% = CVI(MID$(d$, jd, 2))

pt1% = CVI(MID$(d$, jd + 2, 2))
    CALL PointX(pt1%, p1()): IF merr THEN EXIT SUB
    tl(1) = 0
55  CALL Curve(cv%, tl(), xyze()): IF merr THEN EXIT SUB
    FOR k = 1 TO 3: p1(k) = p1(k) - xyze(1, k): NEXT k pt2% = CVI(MID$(d$, jd + 4, 2))
```

RGS.BAS Program Listing --

```
    CALL PointX(pt2%, p2()): IF merr THEN EXIT SUB
    tl(1) = 1
    CALL Curve(cv%, tl(), xyze()): IF merr THEN EXIT SUB
    FOR k = 1 TO 3: p2(k) = p2(k) - xyze(1, k): NEXT k
5
    'tabulate base curve
    CALL Curve(cv%, tlist(), xyzc()): IF merr THEN EXIT SUB i1 = LBOUND(tlist): i9 = UBOUND(tlist)
10  FOR i = i1 TO i9
        t = tlist(i)
        FOR k = 1 TO 3
            xyzc(i, k) = xyzc(i, k) + (1 - t) * p1(k) + t * p2(k)
        NEXT k
15  NEXT i

END SUB

SUB RelSnake (o%, tlist(), surf%, uv())
20  SHARED obj%(), dep$()
    DIM tl(1 TO 1), uv1(1 TO 2), uv2(1 TO 2), uvs(0 TO 1, 1 TO 2)
    d$ = dep$(o%)
    sn% = CVI(MID$(d$, 1, 2))
25  tl(1) = 0
    CALL Snake(sn%, tl(), surf%, uvs()): IF merr THEN EXIT SUB
    mg1% = CVI(MID$(d$, 3, 2))
    CALL Magnet(mg1%, s%, uv1(1), uv1(2)): IF merr THEN EXIT SUB
30  IF s% <> surf% THEN merr = 52: erro% = o%: EXIT SUB
    FOR k = 1 TO 2: uv1(k) = uv1(k) - uvs(1, k): NEXT k
    mg2% = CVI(MID$(d$, 5, 2))
    CALL Magnet(mg2%, s%, uv2(1), uv2(2)): IF merr THEN EXIT SUB
35  IF s% <> surf% THEN merr = 53: erro% = o%: EXIT SUB
    tl(1) = 1
    CALL Snake(sn%, tl(), s%, uvs()): IF merr THEN EXIT SUB
    FOR k = 1 TO 2: uv2(k) = uv2(k) - uvs(1, k): NEXT k
    CALL Snake(sn%, tlist(), s%, uv()): IF merr THEN EXIT SUB
40  i1 = LBOUND(tlist): i9 = UBOUND(tlist)
    FOR i = i1 TO i9
        t = tlist(i)
        FOR k = 1 TO 2
            uv(i, k) = uv(i, k) + (1 - t) * uv1(k) + t * uv2(k)
45      NEXT k
    NEXT i

END SUB

50  SUB RelSurf (o%, ulist(), vlist(), xyz())
    ' relative surface 120.bbspppp
    DIM p(1 TO 3), xyzs(0 TO 1, 0 TO 1, 1 TO 3)
    SHARED dep$(), merr
    d$ = dep$(o%)
55  surf% = CVI(MID$(d$, 1, 2))
    nc = 4
    DIM rc(1 TO nc, 1 TO 3)
    DIM ul(1 TO 1), vl(1 TO 1)
```

RG$.BAS Program Listing --

```
        lp = 0
        IF lp THEN PRINT "corner displacements:"
        jd = 3
        FOR l = 1 TO nc
 5          pt% = CVI(MID$(d$, jd + 2 * (l - 1), 2))
            CALL PointX(pt%, p()): IF merr THEN EXIT SUB
            SELECT CASE l
                CASE 1: ul(l) = 0: vl(l) = 0
                CASE 2: ul(l) = 1: vl(l) = 0
10              CASE 3: ul(l) = 1: vl(l) = 1
                CASE 4: ul(l) = 0: vl(l) = 1
            END SELECT
            CALL Surface(surf%, ul(), vl(), xyzs()): IF merr THEN
        EXIT SUB
15          IF lp THEN PRINT USING " ##"; l;
            FOR k = 1 TO 3
                rc(l, k) = p(k) - xyzs(1, 1, k)
                IF lp THEN PRINT USING "  ###.###"; rc(l, k);
            NEXT k
20          IF lp THEN PRINT
        NEXT l
        CALL Surface(surf%, ulist(), vlist(), xyz()): IF merr THEN
        EXIT SUB
        i1 = LBOUND(ulist): i9 = UBOUND(ulist)
25      j1 = LBOUND(vlist): j9 = UBOUND(vlist)
        FOR i = i1 TO i9
            u = ulist(i)
            FOR j = j1 TO j9
                v = vlist(j)
30              FOR k = 1 TO 3
                    t = (1 - u) * ((1 - v) * rc(1, k) + v * rc(4, k))
                    t = t + u * ((1 - v) * rc(2, k) + v * rc(3, k))
                    xyz(i, j, k) = xyz(i, j, k) + t
                NEXT k
35          NEXT j
        NEXT i
        END SUB SUB RevSurf (o%, ulist(), vlist(), xyz())
40      ' 96.bbcppff
        SHARED obj%(), objf(), dep$(), merr, erro%
        d$ = dep$(o%)
        DIM p1(1 TO 3), p2(1 TO 3), ax(1 TO 3), a(1 TO 3, 1 TO 3)
        DIM p(1 TO 3)
45      cv% = CVI(MID$(d$, 1, 2))
        p1% = CVI(MID$(d$, 3, 2))
        p2% = CVI(MID$(d$, 5, 2))
        angle1 = objf(o%, 1)
        angle2 = objf(o%, 2)
50
        'get points on curve
        i1 = LBOUND(ulist): i9 = UBOUND(ulist)
        REDIM xyzc(i1 TO i9, 1 TO 3)
        CALL Curve(cv%, ulist(), xyzc()): IF merr THEN EXIT SUB
55
        CALL PointX(p1%, p1()): IF merr THEN EXIT SUB
        CALL PointX(p2%, p2()): IF merr THEN EXIT SUB
        'unit axis vector
```

RG%.BAS Program Listing --

```
        t = 0
        FOR k = 1 TO 3
            FOR l = 1 TO 3: a(l, k) = 0: NEXT l: a(k, k) = 1
            ax(k) = p2(k) - p1(k)
  5         t = t + ax(k) ^ 2
        NEXT k
        IF t = 0 THEN merr = 21: erro% = o%: EXIT SUB
        t = SQR(t)
        FOR k = 1 TO 3: ax(k) = ax(k) / t: NEXT k
 10 j1 = LBOUND(vlist): j9 = UBOUND(vlist)
        FOR j = j1 TO j9
            v = vlist(j)
 15         thd = (1 - v) * angle1 + v * angle2
            st = SIN(thd * pi / 180): ct = COS(thd * pi / 180)
            FOR l = 1 TO 3
                FOR k = 1 TO 3: a(l, k) = ax(l) * ax(k) * (1 - ct):
        NEXT k
 20             a(l, l) = a(l, l) + ct
            NEXT l
            t = -ax(3) * st: a(1, 2) = a(1, 2) - t: a(2, 1) = a(2,
        1) + t
            t = -ax(2) * st: a(1, 3) = a(1, 3) + t: a(3, 1) = a(3,
 25     1) - t
            t = -ax(1) * st: a(2, 3) = a(2, 3) - t: a(3, 2) = a(3,
        2) + t
            FOR i = i1 TO i9
                FOR l = 1 TO 3: p(l) = xyzc(i, 1) - p1(l): NEXT l
 30             FOR k = 1 TO 3
                    t = 0
                    FOR l = 1 TO 3: t = t + a(l, k) * p(l): NEXT l
                    xyz(i, j, k) = p1(k) + t
                NEXT k
 35         NEXT i
        NEXT j

END SUB

40     SUB Ring (o%, sn%, t)
        ' point-on-snake   7.nf, 8.rf
        SHARED obj%(), objf(), dep$(), merr, erro%
        d$ = dep$(o%)
        SELECT CASE obj%(o%, 0)
 45         CASE 7
                sn% = CVI(MID$(d$, 1, 2))
                t = objf(o%, 1)
            CASE 8
                rg% = CVI(MID$(d$, 1, 2))
 50             e% = obj%(o%, 0)
                SELECT CASE e%
                    CASE 7, 8
                    CASE ELSE: merr = 1: erro% = o%: EXIT SUB
                END SELECT
 55             CALL Ring(rg%, sn%, t): IF merr THEN EXIT SUB
                t = t + objf(o%, 1)
        END SELECT
```

RGS.BAS Program Listing --

```
       END SUB

SUB Service (a$, v$, n$)
       SELECT CASE a$ 'acceptable entities
 5        CASE "v": v$ = "v": n$ = "relabel"
          CASE "e": v$ = "er": n$ = "bead"
          CASE "m": v$ = "mr": n$ = "magnet"
          CASE "r": v$ = "r": n$ = "ring"
          CASE "p": v$ = "pemr": n$ = "point"
10        CASE "n": v$ = "nmr": n$ = "snake"
          CASE "c": v$ = "lcnpemr": n$ = "curve"
          CASE "s": v$ = "s": n$ = "surface"
          CASE "a": v$ = "a": n$ = "plane"
          CASE "j": v$ = "pemrla": n$ = "mirror"
15        CASE "l": v$ = "l": n$ = "line"
          CASE "k": v$ = "k": n$ = "knotlist"
       END SELECT END SUB
20
       SUB Snake (o%, tlist(), surf%, uv())
       ' tabulate u,v parameters along any kind of snake
       ' tlist() = list of t parameter values
       SHARED obj%(), dep$(), merr, erro%
25
       i1 = LBOUND(tlist): i9 = UBOUND(tlist)

d$ = dep$(o%)
       cas% = obj%(o%, 0)
30     SELECT CASE cas%
          CASE 5, 6, 7, 8' magnets, rings
             CALL Magnet(o%, surf%, u, v): IF merr THEN EXIT SUB
             FOR i = i1 TO i9
                uv(i, 1) = u: uv(i, 2) = v
35           NEXT i CASE 64: CALL LineSnake(o%, tlist(), surf%, uv())
          CASE 66: CALL ArcSnake(o%, tlist(), surf%, uv())
          CASE 67: CALL BSnake(o%, tlist(), surf%, uv())
40        CASE 68: CALL CSnake(o%, tlist(), surf%, uv())
          CASE 73: CALL SubSnake(o%, tlist(), surf%, uv())
          CASE 71: CALL RelSnake(o%, tlist(), surf%, uv())
          CASE ELSE: merr = 1: erro% = o%: EXIT SUB
       END SELECT
45
       END SUB SUB SplineCurve (o%, tlist(), xyzc())
       ' Tabulate points along a B-spline or C-spline curve.
50     ' o% is object index of a B- or C-spline
       ' level 0 returns x; level 1 returns x and dx/dt
       SHARED obj%(), merr, erro%
       cas% = obj%(o%, 0)
       SELECT CASE cas%
55        CASE 36, 37
          CASE ELSE: merr = 1: erro% = o%: EXIT SUB
       END SELECT
       ko = obj%(o%, 4) + 1
```

-- RGB.BAS Program Listing --

```
    nv = obj%(o%, 5)
    IF ko > nv THEN ko = nv
    DIM tk(1 TO nv + ko), cbs(1 TO nv, 1 TO 3)
    REDIM txyz(0, 0)
 5  CALL GetVertices(o%, nv, txyz()): IF merr THEN EXIT SUB
    FOR j = 1 TO nv
        FOR k = 1 TO 3: cbs(j, k) = txyz(j, k): NEXT k
    NEXT j
    SELECT CASE cas%
10      CASE 36
            CALL Knots(ko, nv, tk())
        CASE 37
            CALL CSplineSetup(ko, nv, 1, 3, tk(), cbs())
            IF merr THEN erro% = o%: EXIT SUB
15  END SELECT
    CALL BSplineEval(ko, nv, 1, 3, tk(), cbs(), tlist(), _
    xyzc())
    END SUB 20  SUB StoreSup (ec$, a$, d$, er%)
    ' ec$ = required class e.g."p", "c"
    ' a$ = token
    ' d$ = data string of supports
    ' er% = error code
25  er% = 0
    IF a$ = "}" THEN er% = 1: EXIT SUB
    obno% = ObjNo%(a$, cas%)
    IF obno% = 0 THEN er% = 2: EXIT SUB
    CALL Service(ec$, tmpl$, n$)
30  IF INSTR(tmpl$, ec$) = 0 THEN er% = 3: EXIT SUB
    d$ = d$ + MKI$(obno%)
    END SUB FUNCTION STR16$ (a$)
35  b$ = LTRIM$(a$)
    c$ = SPACE$(16)
    LSET c$ = b$
    STR16$ = c$
    END FUNCTION
40
    SUB StrCurv (o%, nt, c%, ivis, ft%, np)
    ' Tabulates points along a curve into 3dd file.
    ' o% = object no. for curve
    ' nt = no. of polyline segments
45  ' c% = color
    ' ft% = file; np = no. pts.
    SHARED obj$()
    DIM xyzc(0 TO nt, 1 TO 3), tlist(0 TO nt)
    np = 0
50  CALL FillParamList(0, 0, 1, tlist())
    CALL Curve(o%, tlist(), xyzc())
    IF ivis AND 1 THEN
        FOR i = 0 TO nt
            p% = c%: IF i = 0 THEN p% = 0
55          x = xyzc(i, 1): y = xyzc(i, 2): z = xyzc(i, 3)
            GOSUB SCPt:
        NEXT i
    END IF
```

RGS.BAS Program Listing --

```
    IF ivis AND 2 THEN 'ticks
        REDIM tlist(1 TO 9), xyzc(1 TO 9, 1 TO 3)
        CALL FillParamList(0, .1, .9, tlist())
        CALL Curve(o%, tlist(), xyzc()): IF merr THEN EXIT SUB
5       p% = -16 - c%
        FOR i = 1 TO 9
            x = xyzc(i, 1): y = xyzc(i, 2): z = xyzc(i, 3)
            GOSUB SCPt:
        NEXT i
10  END IF
    IF ivis AND 4 THEN 'polyline
        DIM ulist(0), vlist(0), xyzs(0, 0, 1 TO 3)
        cas% = ASC(obj$(o%))
        lcv = (cas% >= 36) AND (cas% <= 39)
15      lsn = (cas% >= 67) AND (cas% <= 70)
        k9 = 3: IF lsn THEN k9 = 2
        IF lcv OR lsn THEN
            REDIM txyz(0, 0)
            CALL GetVertices(o%, nv, txyz()): IF merr THEN EXIT
20  SUB
            IF lcv THEN
                FOR i = 1 TO nv
                    x = txyz(i, 1): y = txyz(i, 2): z = txyz(i, 3)
                    p% = -7 * (i > 1): GOSUB SCPt:
25              NEXT i
            ELSE
                DIM tt(0), uv(0, 1 TO 2)
                REDIM xyzs(0, 0, 1 TO 3)
                CALL Snake(o%, tt(), surf%, uv()): IF merr THEN
30  EXIT SUB
                FOR i = 2 TO nv
                    FOR j = 0 TO 8
                        a = j / 8
                        ulist(0) = (1 - a) * txyz(i - 1, 1) + a *
35  txyz(i, 1)
                        vlist(0) = (1 - a) * txyz(i - 1, 2) + a *
    txyz(i, 2)
                        CALL Surface(surf%, ulist(), vlist(),
    xyzs())
40                      IF merr THEN EXIT SUB
                        x = xyzs(0, 0, 1): y = xyzs(0, 0, 2): z =
    xyzs(0, 0, 3)
                        p% = -7 * (j > 0): GOSUB SCPt:
                    NEXT j
45              NEXT i
            END IF
        END IF
    END IF
    EXIT SUB
50
    SCPt:
    np = np + 1
    PUT #ft%, , p%
    PUT #ft%, , x
55  PUT #ft%, , y
    PUT #ft%, , z
    RETURN
```

RG?.BAS Program Listing --

```
      END SUB

SUB StrSurf (o%, c%, ivis, lnet, ft%, np)
      ' Tabulates points along parametric lines into a 3dd file.
 5    ' o% = object no. for surface
      ' ivis: 1= (u=const)   2= (v=const)   3= both   8= border
      ' c% = color
      ' ft% = file; np = no. of pts.
      SHARED obj%()
10    np = 0
      lerr = 0
      nuo = obj%(o%, 3)
      nvo = obj%(o%, 4)
      DIM xyz(0 TO nuo, 0 TO nvo, 1 TO 3), p(1 TO 3)
15    DIM ulist(0 TO nuo), vlist(0 TO nvo)
      CALL FillParamList(0, 0, 1, ulist())
      CALL FillParamList(0, 0, 1, vlist())
      CALL Surface(o%, ulist(), vlist(), xyz())

20    IF (ivis AND 1) THEN 'longitudinals, u=const.
          FOR i = 0 TO nuo
              GOSUB SSuconst:
          NEXT i
      END IF
25    IF (ivis AND 2) THEN 'transversals, v=const.
          FOR j = 0 TO nvo
              GOSUB SSvconst:
          NEXT j
      END IF
30    IF (ivis AND 8) THEN ' boundary
          IF (ivis AND 1) = 0 THEN
              FOR i = 0 TO nuo STEP nuo
                  GOSUB SSuconst:
              NEXT i
35        END IF
          IF (ivis AND 2) = 0 THEN
              FOR j = 0 TO nvo STEP nvo
                  GOSUB SSvconst:
              NEXT j
40        END IF
      END IF
      IF (ivis AND 16) AND lnet THEN 'net
          REDIM xyzp(0, 0, 3)
          CALL BSurfVertices(o%, ncu, ncv, xyzp()): IF merr THEN
45    EXIT SUB
          FOR i = 1 TO ncu
              FOR j = 1 TO ncv
                  p% = -7 * (j > 1)
                  x = xyzp(i, j, 1): y = xyzp(i, j, 2): z = xyzp(i,
50    j, 3)
                  GOSUB SSPt:
              NEXT j
          NEXT i
          FOR j = 1 TO ncv
55            FOR i = 1 TO ncu
                  p% = -7 * (i > 1)
                  x = xyzp(i, j, 1): y = xyzp(i, j, 2): z = xyzp(i,
      j, 3)
```

-- RG$.BAS Program Listing --

```
            GOSUB SSPt:
        NEXT i
      NEXT j
    END IF
5
    EXIT SUB

SSuconst: ' a single u=const line
    FOR j = 0 TO nvo
10      p% = -(j > 0) * c%
        x = xyz(i, j, 1): y = xyz(i, j, 2): z = xyz(i, j, 3)
        GOSUB SSPt:
    NEXT j
    RETURN
15
    SSvconst: ' a single v=const line
    FOR i = 0 TO nuo
        p% = -(i > 0) * c%
        x = xyz(i, j, 1): y = xyz(i, j, 2): z = xyz(i, j, 3)
20      GOSUB SSPt:
    NEXT i
    RETURN SSPt:
25  np = np + 1
    PUT #ft%, , p%
    PUT #ft%, , x
    PUT #ft%, , y
    PUT #ft%, , z
30  RETURN

END SUB

SUB SubCurve (o%, tlist(), xyzc())
35  '41.bee
    SHARED dep$(), merr, erro%
    d$ = dep$(o%)
    bd1% = CVI(MID$(d$, 1, 2))
    CALL Bead(bd1%, cv1%, u1): IF merr THEN EXIT SUB
40  bd2% = CVI(MID$(d$, 3, 2))
    CALL Bead(bd2%, cv2%, u2): IF merr THEN EXIT SUB
    IF cv2% <> cv1% THEN merr = 40: erro% = o%: EXIT SUB
    i1 = LBOUND(tlist): i9 = UBOUND(tlist)
    DIM vlist(i1 TO i9)
45  FOR i = i1 TO i9
        t = tlist(i)
        vlist(i) = (1 - t) * u1 + t * u2
    NEXT i
    CALL Curve(cv1%, vlist(), xyzc()): IF merr THEN EXIT SUB
50  END SUB SUB SubSnake (o%, tlist(), surf%, uv())
    ' subsnake, 73.brr
    SHARED dep$()
55  d$ = dep$(o%)
    rg1% = CVI(MID$(d$, 1, 2))
    CALL Ring(rg1%, s1%, u1): IF merr THEN EXIT SUB
    rg2% = CVI(MID$(d$, 3, 2))
```

RGS.BAS Program Listing --

```
     CALL Ring(rg2%, s2%, u2): IF merr THEN EXIT SUB
     IF s2% <> s1% THEN merr = 41: erro% = o%: EXIT SUB
     i1 = LBOUND(tlist): i9 = UBOUND(tlist)
     DIM vlist(i1 TO i9)
5    FOR i = i1 TO i9
        t = tlist(i)
        vlist(i) = (1 - t) * u1 + t * u2
     NEXT i
     CALL Snake(s1%, vlist(), surf%, uv()): IF merr THEN EXIT
10   SUB

END SUB

SUB SubSurf (o%, plist(), qlist(), sf%, uv())
15   ' subsurface, bounded by 4 snakes   122.bbnnnn
     DIM d(0 TO 1), pt(1 TO 2)
     SHARED dep$(), merr, erro%
     d$ = dep$(o%)
     i1 = LBOUND(plist): i9 = UBOUND(plist)
20   j1 = LBOUND(qlist): j9 = UBOUND(qlist)
     IF i1 < j1 THEN ij1 = i1 ELSE ij1 = j1
     IF i9 > j9 THEN ij9 = i9 ELSE ij9 = j9
     lp = 0
     n = 2: DIM uvs(1 TO n, 1 TO 2), tlist(1 TO n)
25   ns = 4
     DIM side%(1 TO ns) ' object no.
     DIM ior(1 TO ns) ' orientation
     DIM uvside(1 TO ns, ij1 TO ij9, 1 TO 2)'sides
     DIM uvk(1 TO ns, 1 TO 2)
30   ' sort out side orientations
     jd = 1
     FOR l = 1 TO ns
        ior(l) = 0
        s% = CVI(MID$(d$, jd + 2 * (l - 1), 2))
35      side%(l) = s%
        CALL FillParamList(0, 0, 1, tlist())
        CALL Snake(s%, tlist(), surf%, uvs()): IF merr THEN EXIT
     SUB
        IF l = 1 THEN
40         sf% = surf%
        ELSE
           IF surf% <> sf% THEN merr = 42: erro% = o%: EXIT SUB
           FOR n = 0 TO 1
              d(n) = 0
45            FOR k = 1 TO 2: d(n) = d(n) + (uvs(n + 1, k) -
     pt(k)) ^ 2: NEXT k
           NEXT n
           IF d(1) < d(0) THEN ior(l) = -1
        END IF
50      FOR k = 1 TO 2: pt(k) = uvs(2 + ior(l), k): NEXT k
     NEXT l
     ' tabulate points along edge snakes
     FOR l = 1 TO ns: FOR k = 1 TO 2: uvk(l, k) = 0: NEXT k:
     NEXT l
55   FOR l = 1 TO ns
        lrev = 0
        IF ior(l) THEN lrev = NOT lrev
        IF l > 2 THEN lrev = NOT lrev
```

RGb.BAS Program Listing --

```
        IF 1 AND 1 THEN
            REDIM uvs(i1 TO i9, 1 TO 2)
            REDIM tlist(i1 TO i9)
            ij1 = i1: ij9 = i9
5           IF lrev THEN
                FOR i = i1 TO i9: tlist(i) = 1 - plist(i): NEXT i
            ELSE
                FOR i = i1 TO i9: tlist(i) = plist(i): NEXT i
            END IF
10      ELSE
            REDIM uvs(j1 TO j9, 1 TO 2)
            REDIM tlist(j1 TO j9)
            ij1 = j1: ij9 = j9
            IF lrev THEN
15              FOR j = j1 TO j9: tlist(j) = 1 - qlist(j): NEXT j
            ELSE
                FOR j = j1 TO j9: tlist(j) = qlist(j): NEXT j
            END IF
        END IF
20      CALL Snake(side%(l), tlist(), surf%, uvs()): IF merr
    THEN EXIT SUB
        FOR ij = ij1 TO ij9
            IF lp THEN PRINT USING "ij=### "; ij;
            FOR k = 1 TO 2
25              uvside(l, ij, k) = uvs(ij, k)
                IF lp THEN PRINT USING " ###.### "; uvside(l, ij,
    k);
            NEXT k
            IF lp THEN PRINT
30      NEXT ij
        ' corners
        REDIM tlist(1 TO 3), uvs(1 TO 3, 1 TO 2)
        CALL FillParamList(0, 0, 1, tlist())
        CALL Snake(side%(l), tlist(), surf%, uvs()): IF merr
35  THEN EXIT SUB
        FOR k = 1 TO 2
            uvk(l, k) = uvk(l, k) + uvs(1 - 2 * ior(l), k) / 2
            l1 = l MOD ns + 1
            uvk(l1, k) = uvk(l1, k) + uvs(3 + 2 * ior(l), k) / 2
40      NEXT k
        IF lp THEN INPUT a$
    NEXT l
    ' now tabulate surface coords.
    FOR i = i1 TO i9
45      p = plist(i)
        FOR j = j1 TO j9
            q = qlist(j)
            IF lp THEN PRINT USING "p=##.###   q=##.### "; p; q;
            FOR k = 1 TO 2
50              t = (1 - q) * uvside(1, i, k) + q * uvside(3, i,
    k)
                t = t + (1 - p) * uvside(4, j, k) + p * uvside(2,
    j, k)
                t = t - (1 - q) * ((1 - p) * uvk(1, k) + p *
55  uvk(2, k))
                t = t - q * ((1 - p) * uvk(4, k) + p * uvk(3, k))
                uv(i, j, k) = t
                IF lp THEN PRINT USING " ###.###"; t;
```

RG$\flat$.BAS Program Listing --

```
            NEXT k
            IF lp THEN PRINT
         NEXT j
         IF lp THEN INPUT a$
5    NEXT i
     '...
     END SUB

SUB Surface (o%, ulist(), vlist(), xyz())
10   ' tabulate points on a parametric surface
     ' o% is the object no. for a surface
     ' ulist, vlist specify desired points
     SHARED obj%(), lusetbl, merr
     DIM xyzs(0 TO 1, 0 TO 1, 1 TO 3)
15   i1 = LBOUND(ulist): i9 = UBOUND(ulist)
     j1 = LBOUND(vlist): j9 = UBOUND(vlist)
     cas% = obj%(o%, 0)
     SELECT CASE cas%
         CASE 96: CALL RevSurf(o%, ulist(), vlist(), xyz())
20       CASE 97: CALL TranslSurf(o%, ulist(), vlist(), xyz())
         CASE 98, 102: CALL LoftSurf(o%, ulist(), vlist(), xyz())
         CASE 110: CALL BlendSurf(o%, ulist(), vlist(), xyz())
         CASE 114: CALL BSplineSurf(o%, ulist(), vlist(), xyz())
         CASE 120: CALL RelSurf(o%, ulist(), vlist(), xyz())
25       CASE 122 'subsurface
             DIM uv(i1 TO i9, j1 TO j9, 1 TO 2)
             CALL SubSurf(o%, ulist(), vlist(), sf%, uv()): IF
     merr THEN EXIT SUB
             DIM ul(1 TO 1), vl(1 TO 1)
30           FOR j = j1 TO j9
                 FOR i = i1 TO i9
                     ul(1) = uv(i, j, 1)
                     vl(1) = uv(i, j, 2)
                     CALL Surface(sf%, ul(), vl(), xyzs()): IF merr
35   THEN EXIT SUB
                     FOR k = 1 TO 3: xyz(i, j, k) = xyzs(1, 1, k):
     NEXT k
                 NEXT i
             NEXT j
40   END SELECT
     END SUB SUB TranslSurf (o%, ulist(), vlist(), xyz())
     ' fills a table for a surface of translation x(u,v) = xu(u)
45   + xv(v) - xv(0)
     ' o$ = string spec for surface
     ' nu, nv = no. of segments. ' u=const are images of curve 2
     ' xyz(i,j,k): i= u direction, j= v direction; k = x,y,z
     SHARED dep$(), merr
50   d$ = dep$(o%)
     i1 = LBOUND(ulist): i9 = UBOUND(ulist)
     j1 = LBOUND(vlist): j9 = UBOUND(vlist)
     DIM xyzu(i1 TO i9, 1 TO 3)
     DIM xyzv(j1 TO j9, 1 TO 3)
55   DIM xyzv0(1 TO 1, 1 TO 3)' point on curve 2 with v=0
     DIM tlist(1 TO 1)
     eu% = CVI(MID$(d$, 1, 2)) ' genatrix
     ev% = CVI(MID$(d$, 3, 2))
```

-- RG4.BAS Program Listing --

```
    CALL Curve(eu%, ulist(), xyzu()): IF merr THEN EXIT SUB
    CALL Curve(ev%, vlist(), xyzv()): IF merr THEN EXIT SUB
    tlist(1) = 0
    CALL Curve(ev%, tlist(), xyzv0()): IF merr THEN EXIT SUB
5   f$ = "i,j = ## ##   ###.### ###.### ###.###"
    FOR i = i1 TO i9
       FOR j = j1 TO j9
          FOR k = 1 TO 3
             xyz(i, j, k) = xyzu(i, k) + xyzv(j, k) - xyzv0(1,
10  k)
          NEXT k
          IF lp THEN
             PRINT USING f$; i; j; xyz(i, j, 1); xyz(i, j, 2);
    xyz(i, j, 3)
15           INPUT a$
          END IF
       NEXT j
    NEXT i
    END SUB
20
    SUB UpdChain (upd%())
    'in- one object index in upd%(1)
    'out- object plus all dependents, in order; count in
    upd%(0)
25  SHARED nobj, dep$()
    o1% = upd%(1)
    upd$ = MKI$(o1%)
    FOR o% = o1% + 1 TO nobj
       o$ = MKI$(o%)
30     d$ = dep$(o%)
       lhit = 0
       FOR j = 1 TO LEN(d$) \ 2
          s$ = MID$(d$, 1 + 2 * (j - 1), 2)
          FOR k = 1 TO LEN(upd$) \ 2
35           c$ = MID$(upd$, 1 + 2 * (k - 1), 2)
             IF c$ = s$ THEN
                upd$ = upd$ + o$
                lhit = -1
                EXIT FOR
40           END IF
          NEXT k
          IF lhit THEN EXIT FOR
       NEXT j
    NEXT o%
45
    nd = LEN(upd$) \ 2
    REDIM upd%(0 TO nd)
    FOR i = 1 TO nd: upd%(i) = CVI(MID$(upd$, 1 + 2 * (i - 1),
    2)): NEXT i
50  upd%(0) = nd
    END SUB
```

TABLE III

Summary of entity definitions.

| Entity | Name | Color | Visibility | t-divisions | u, v-divisions | Variable data |
|---|---|---|---|---|---|---|
| AbsPoint | x | x | x | | | x, y, z |
| RelPoint | x | x | x | | | dx, dy, dz |
| AbsBead | x | x | x | | | curve, t |
| RelBead | x | x | x | | | bead, dt |
| AbsMagnet | x | x | x | | | surface, u, v |
| RelMagnet | x | x | x | | | magnet, du, dv |
| AbsRing | x | x | x | | | snake, t |
| RelRing | x | x | x | | | ring, dt |
| Line | x | x | x | x | | point1, point2 |
| Arc | x | x | x | x | | point1, point2, points |
| BCurve | x | x | x | x | | type, { point } |
| CCurve | x | x | x | x | | { point } |
| SubCurve | x | x | x | x | | curve*, bead1, bead2 |
| RelCurve | x | x | x | x | | curve, point1, point2 |
| LineSnake | x | x | x | x | | magnet1, magnet2 |
| ArcSnake | x | x | x | x | | magnet1, magnet2, magnet3 |
| BSnake | x | x | x | x | | type, { magnet } |
| CSnake | x | x | x | x | | { magnet } |
| SubSnake | x | x | x | x | | snake*, fing1, ring2 |
| RelSnake | x | x | x | x | | snake, magnet1, magnet2 |
| RuledSurf | x | x | x | | x | curve1, curve2 |
| TranSurf | x | x | x | | x | curve1, curve2 |
| RevSurf | x | x | x | | x | curve, point1, point2, angle1, angle2 |
| BlendSurf | x | x | x | | x | curve1, curve2, curve3, curve4 |
| CLoftSurf | x | x | x | | x | { curve } |
| BSurf | x | x | x | | x | typeu, typev, N, M, { point } |
| SubSurf | x | x | x | | x | surface*, snake1, snake2, snake3, snake4 |
| RelSurf | x | x | x | | x | surface, point1, point2, point3, point4 |

Key: x data item is required
*data item is redundant and could be omitted
{ ... }variable-length list of objects of specified class

I claim:

1. A method of computer aided design of geometric models constructed from a multiplicity of geometric elements such as points, curves and surfaces in a design space of two or more dimensions, said method comprising:

defining and supporting by computer implemented steps set of geometric entities for use in constructing said geometric models, each of said geometric entities being an abstract geometric object type that is adapted to be actualized into one or more geometric objects, each of said geometric entities comprising data fields and requiring for its actualization into a corresponding geometric object filling specified data fields with data items of valid data types, wherein each corresponding geometric object is stored in a computer accessible memory as a corresponding data structure, each of said geometric entities representing a specific procedure for constructing one or more of said geometric objects from the values in said data fields;

said geometric entities including one or more point class entities, one or more curve class entities, and one or more surface class entities, wherein each of said point class entities is adapted to be actualized into one or more point class objects, each of said point class objects designating a zero-dimensional point in said design space, wherein each of said curve class entities is adapted to be actualized into one or more curve class objects, each of said curve class objects designating a one-dimensional continuous point set in said design space, wherein each of said surface class entities is adapted to be actualized into one or more surface class objects, each of said surface class objects designating a two-dimensional continuous point set in said design space;

identifying at least some of said geometric objects by corresponding unique object identifiers;

defining and supporting by computer implemented steps a plurality of relational entities among said set of geometric entities, each of said relational entities being adapted to be actualized into one or more corresponding relational objects, wherein each corresponding relational object is stored in said computer accessible memory as a corresponding data structure, wherein each of said relational entities and said corresponding relational objects has one or more object data fields, each of said object data fields being a data field whose valid data type is an object identifier of another geometric object, so as to enable logical specification of one or more relational objects having a dependency relationship upon one or more other geometric objects whose object identifiers are specified within the object data fields of said one or more relational objects;

wherein at least one of said relational entities is one of said curve class entities and has two or more data fields whose valid data type is an object identifier of a point class object;

wherein at least one of said relational entities is one of said surface class entities and has two or more data fields whose said valid data types include an object identifier of a point class object or a curve class object; and defining and supporting by computer implemented steps a set of subroutines for evaluating the plurality of geometric objects, there being a corresponding subroutine for each of said abstract geometric object types, wherein those subroutines which evaluate relational objects are programmed to make calls to an appropriate one or more subroutines among the set of said subroutines to evaluate the geometric objects on which that relational object depends.

2. The method of claim 1 further comprising defining and supporting by computer implemented steps a set of primary routines which evaluates point, curve, and surface class objects to generate absolute geometric information therefrom, at least some of said primary routines being programmed to call appropriate ones of said sets of subroutines and primary routines.

3. The method of claim 2 further comprising defining and supporting by computer implemented steps a lookup table which stores absolute object data, wherein the subroutines of said set of subroutines are programmed to store in the lookup table absolute object data for a geometric object when evaluating that geometric object.

4. The method of claim 3 wherein at least some of the primary routines of said set of primary routines are programmed to access the lookup table when evaluating a geometric object and check for previously computed absolute object data for that geometric object as an alternative to computing absolute object data for that geometric object.

5. The method of claim 4 further comprising defining and supporting by computer implemented steps a set of interpolation routines which generate required values for a geometric object by interpolating from the computed absolute object data found in the lookup table.

* * * * *

UNITED STATES PATENT AND TRADEMARK OFFICE
CERTIFICATE OF CORRECTION

PATENT NO.  : 5,627,949
DATED       : May 6, 1997
INVENTOR(S) : John S. Letcher, Jr.

It is certified that error appears in the above-identified patent and that said Letters Patent is hereby corrected as shown below:

Col. 5, l. 47, "'2'" should be --'A2'--.

Col. 6, l. 32, "recursire" should be --recursive--.

Col. 8, l. 62, insert --34-- after "Bead".

Col. 9, l. 26, "D-spline" should be --B-spline--.

Col. 9, l. 53, "(CRelCurve)" should be --(RelCurve)--.

Col. 21, l. 21, delete "1"; insert --{-- before "MCA" and insert --}-- after "MCC".

Col. 21, l. 29, "MCBVL" should be --MCBV1--.

Col. 108, l. 12, "points" should be --point3--.

Col. 108, l. 21, "fing1" should be --ring1--.

Signed and Sealed this

Eighth Day of June, 1999

Q. TODD DICKINSON

Attest:

Attesting Officer

Acting Commissioner of Patents and Trademarks